United States Patent
Allen et al.

(10) Patent No.: US 9,304,671 B2
(45) Date of Patent: Apr. 5, 2016

(54) PRINTING APPARATUS AND CONTROLLER THEREFOR

(75) Inventors: David Allen, Albany, CA (US); Steven M. Calde, Sherwood, OR (US); Chia-Kai Hsu, San Jose, CA (US); Nelson Hsu, New York, NY (US); Vladimir Buzuev, Castro Valley, CA (US); Wayne Greenwood, Lahonda, CA (US)

(73) Assignee: SANFORD, L.P., Downers Grove, IL (US)

(*) Notice: Subject to any disclaimer, the term of this patent is extended or adjusted under 35 U.S.C. 154(b) by 79 days.

(21) Appl. No.: 12/767,499

(22) Filed: Apr. 26, 2010

(65) Prior Publication Data

US 2010/0328714 A1 Dec. 30, 2010

Related U.S. Application Data

(60) Provisional application No. 61/172,590, filed on Apr. 24, 2009.

(51) Int. Cl.
*G06F 3/12* (2006.01)
*G06F 3/0484* (2013.01)
(Continued)

(52) U.S. Cl.
CPC .......... *G06F 3/04847* (2013.01); *G06F 3/0488* (2013.01); *G06F 3/1204* (2013.01);
(Continued)

(58) Field of Classification Search
CPC .............. G06K 15/022; G06K 15/024; G06K 2215/0097; G06F 3/1243; G06F 17/248; G06F 17/212; G06F 3/04847; G06F 3/1205; G06F 3/1284; G06F 3/1204; G06F 3/0488; G06F 17/211; G06F 17/24; G06F 3/1256; G06F 3/1208
USPC ................................................ 358/1.11–1.15
See application file for complete search history.

(56) References Cited

U.S. PATENT DOCUMENTS

| 5,761,655 A | 6/1998 | Hoffman |
| 6,317,570 B1 | 11/2001 | Uchida et al. |

(Continued)

FOREIGN PATENT DOCUMENTS

| EP | 1 139 604 A2 | 10/2001 |
| EP | 1 205 816 A1 | 5/2002 |

(Continued)

OTHER PUBLICATIONS

INPIT English translation of JP2007-334649.*

(Continued)

*Primary Examiner* — Kent Yip
(74) *Attorney, Agent, or Firm* — Marshall, Gerstein & Borun LLP

(57) ABSTRACT

A computer program embodied on a computer readable medium, said computer program configured to control a controller to: output, to a display driver, data for causing the display driver to drive a display of a printing apparatus to display, in a first area of the display, a plurality of images including a first image, wherein the plurality of images are representative of a plurality of respective different types of label data field, and to display a second image representative of the appearance of a label medium occupying a second area of the display that is different from the first area; and in response to receiving, from a selector, information comprising data representative of an operation of the selector by a user to select the first image and data representative of a position within the second area, output, to the display driver, data for causing the display driver to drive the display to display a revised version of the second image representative of the appearance of the label medium; wherein the revised version of the second image comprises a label data field of the type of label data field of which the first image is representative, and wherein the label data field comprised in the revised version of the second image is located at a location determined in dependence on said position within the second area.

14 Claims, 36 Drawing Sheets

(51) Int. Cl.
*G06F 3/0488* (2013.01)
*G06F 17/21* (2006.01)
*G06F 17/24* (2006.01)

(52) U.S. Cl.
CPC ............ *G06F3/1205* (2013.01); *G06F 3/1243* (2013.01); *G06F 3/1284* (2013.01); *G06F 17/211* (2013.01); *G06F 17/24* (2013.01); *G06F 3/1208* (2013.01); *G06F 3/1256* (2013.01)

(56) References Cited

U.S. PATENT DOCUMENTS

| | | | |
|---|---|---|---|
| 2002/0174148 | A1 | 11/2002 | Seidman |
| 2002/0186406 | A1 | 12/2002 | Phillips et al. |
| 2003/0086114 | A1 | 5/2003 | Cherry et al. |
| 2003/0202204 | A1 | 10/2003 | Terrill et al. |
| 2004/0046992 | A1 | 3/2004 | Mori et al. |
| 2004/0254799 | A1 | 12/2004 | Zebooker |
| 2005/0077361 | A1 | 4/2005 | Sakai et al. |
| 2005/0206658 | A1 | 9/2005 | Fagans |
| 2005/0278625 | A1 | 12/2005 | Wessling et al. |
| 2006/0048069 | A1* | 3/2006 | Igeta ............................ 715/769 |
| 2006/0119890 | A1 | 6/2006 | Nakajima |
| 2007/0016924 | A1* | 1/2007 | Ishida et al. .................... 725/38 |
| 2007/0061719 | A1 | 3/2007 | Law |
| 2007/0273712 | A1 | 11/2007 | O'Mullan et al. |
| 2008/0074697 | A1* | 3/2008 | Sawada et al. ............... 358/1.15 |

FOREIGN PATENT DOCUMENTS

| | | |
|---|---|---|
| EP | 1 351 470 A2 | 10/2003 |
| EP | 1743773 A1 | 1/2007 |
| GB | 2 390 193 A | 12/2003 |
| JP | 2007334649 A | 12/2007 |
| WO | WO-0130581 A1 | 5/2001 |

OTHER PUBLICATIONS

Invitation to Pay Additional Fees, and Where Applicable, Protest Fees (5 pages).
Communication Relating to the Results of the Partial International Search (2 pages).
International Search Report and Written Opinion for Application No. PCT/US2010/032340, dated Oct. 1, 2010.
European Communication pursuant to Article 94(3) from European Patent Application No. 10161057.4, dated Feb. 27, 2013.
Japanese Office Action for Application No. 2012-507458 dated Feb. 4. 2014 (with translation).

* cited by examiner

PRINTING APPARATUS AND CONTROLLER THEREFOR

REFERENCE TO RELATED APPLICATIONS

This application claims the benefit of the filing date of U.S. Provisional Application No. 61/172,590, filed Apr. 24, 2009, and the disclosure of which is incorporated herein by reference.

FIELD OF THE INVENTION

The present disclosure relates to a printing apparatus and in particular but not exclusively to a printing apparatus for printing an image onto a label. It also relates to a controller suitable for use in a printing apparatus, to a method of operating such a controller, and to a computer program embodied on a computer readable medium for controlling such a controller to implement the method.

BACKGROUND OF THE INVENTION

Known tape printing apparatus are disclosed in EP-A-322918 and EP-A-322919 (Brother Kogyo Kabushiki Kaisha) and EP-A-267890 (Varitronic). The printers each include a cassette receiving bay for receiving a cassette or tape holding case. In EP-A-267890, the tape holding case houses an ink ribbon and a substrate tape, the latter comprising an upper image receiving layer secured to a backing layer by an adhesive. In EP-A-322918 and EP-A-322919, the tape holding case houses an ink ribbon, a transparent image receiving tape and a double sided adhesive tape which is secured at one of its adhesive coated sides to the image tape after printing and which has a backing layer peelable from its other adhesive coated side. With both these apparatus, the image transfer medium (ink ribbon) and the image receiving tape (substrate) are in the same cassette.

It has also been proposed by the present applicants in, for example, EP-A-578372 to house the ink ribbon and the substrate tape in separate cassettes.

In all of these cases, the image receiving tape passes in overlap with the ink ribbon to a print zone consisting of a fixed print head and a platen against which the print head can be pressed to cause an image to transfer from the ink ribbon to the image receiving tape. There are many ways of doing this, including dry lettering or dry film impression, but the most usual way currently is by thermal printing where the print head is heated and the heat causes ink from the ink ribbon to be transferred to the image receiving tape.

In other known tape printing apparatuses, so-called direct thermal tapes are used, in which an image is created directly onto the direct thermal tape without the interposition of an ink ribbon cassette. Elements of a print head are heated, and the heat causes chemicals within the direct thermal tape to react and produce an image in or on the tape.

The image receiving tape may be in the form of a continuous tape. An image is printed and the tape is then cut by the label printer to the appropriate length. It is also known that the image receiving tape may comprise a backing layer on which there is a plurality of discrete or die cut labels.

The printing apparatuses may be hand held or desktop stand-alone printers. Alternatively each printing apparatus may comprise a printer connected to a personal computer (PC), or the like.

Known hand held or stand-alone printing apparatuses have displays which an apparatus (such as a controller, processor, chip, or chip set) can cause to display information to help a user create a label for printing. Similarly, known printers for connection to a PC receive print data defining an image to be printed onto a label from the PC. In that case, the PC can include a display that such an apparatus (which is usually also part of the PC) can cause to display information to help a user create a label for printing by way of the print head of the printer connected to the PC.

A problem associated with these known printing apparatuses is that, although the displays can be used to add and manipulate data fields for inclusion in a label to be printed, several steps are required to be performed by a user before the data field is located at a desired position relative to an image representative of the label. Several steps are also required to alter the display to show a particular portion of a label being created.

It is possible using these known devices to create labels of different types, the different types of labels having different dimensions or shapes. It is also known to arrange data on labels according to different predetermined layouts or templates. However, it can often be difficult for a user to easily find a desired template to use when creating a label, and/or for a user to select a desired label type suitable for a particular duty.

Similarly, although labels, once designed, can be saved in memory in known printers and PCs, it can be difficult for a user to easily find a particular saved or previously printed label e.g. to allow them to then reprint the saved or previously printed label.

Moreover, when ordering stock of label supplies, it is often not easy for a user or consumer to identify and successfully order a desired type of label supply. Although different types of labels and label supplies can have different respective identifying codes to distinguish them, errors of transcription can occur leading to the user ordering the wrong labels. Furthermore, some suppliers of labels are known to offer labels of relatively poor quality. Poor quality labels may accept ink in an inferior way compared to better quality labels, leading to poor print quality. They may even cause a printer to jam or otherwise malfunction. Usually a user will not know of the quality of a label they have ordered until they have received and used it.

Furthermore, addresses printed onto mail or onto labels adhered to mail often take a format which is not readily comprehendible by the postal organisation(s) which will have to deliver them. This can lead to delay in such mail being delivered, and in the worse cases could lead to the mail being delivered to an address other than that intended.

When looking for technical support or other information relating to a printer that a user is currently using, it can be difficult to find the printer's exact product name or reference code which is needed to identify e.g. the page of the manufacturer's website relevant to that printer. Furthermore, if the user needs to write down the name or code before viewing the website and using the information written down, errors of transcription can also occur, leaving the user unable to find the correct page on the website for the printer concerned.

If several printers are connected to a user's computer, when the user wishes to print using one of the printers, it can be difficult to identify which of several printers listed on the screen is the desired printer.

It is an aim of some embodiments of the present invention to address one or more of the described problems.

SUMMARY OF THE INVENTION

A first aspect of the present disclosure may provide a computer program embodied on a computer readable medium, said computer program configured to control a controller to: output, to a display driver, data for causing the display driver to drive a display of a printing apparatus to display, in a first area of the display, a plurality of images including a first image, wherein the plurality of images are representative of a plurality of respective different types of label data field, and to display a second image representative of the appearance of a label medium occupying a second area of the display that is different from the first area; and in response to receiving, from a selector, information comprising data representative of an operation of the selector by a user to select the first image and data representative of a position within the second area, output, to the display driver, data for causing the display driver to drive the display to display a revised version of the second image representative of the appearance of the label medium; wherein the revised version of the second image comprises a label data field of the type of label data field of which the first image is representative, and wherein the label data field comprised in the revised version of the second image is located at a location determined in dependence on said position within the second area.

Preferably the label data field comprised in the revised version of the second image occupies a region that includes said position within the second area. The label data field comprised in the revised version of the second image may have an edge or a corner that occupies said position within the second area.

The first image may occupy a first region within the first area. The data representative of operation of the selector by the user to select the first image may comprise data representative of a first position within the first region.

Optionally the information comprises data representative of operation of the selector by the user to perform a drag and drop operation from said first position within the first region to said position within the second area.

The label data field may comprise at least one of: a text data field, a barcode data field and an image data field.

The printing apparatus may comprise a printer connected to a computer.

A second aspect of the present disclosure may provide an apparatus comprising: a controller configured: to output, to a display driver, data for causing the display driver to drive a display of a printing apparatus to display, in a first area of the display, a plurality of images including a first image, wherein the plurality of images are representative of a plurality of respective different types of label data field, and to display a second image representative of the appearance of a label medium occupying a second area of the display that is different from the first area; and in response to receiving, from a selector, information comprising data representative of an operation of the selector by a user to select the first image and data representative of a position within the second area, to output, to the display driver, data for causing the display driver to drive the display to display a revised version of the second image representative of the appearance of the label medium; wherein the revised version of the second image comprises a label data field of the type of label data field of which the first image is representative, and wherein the label data field comprised in the revised version of the second image is located at a location determined in dependence on said position within the second area.

A third aspect of the present disclosure may provide a method, comprising: outputting, from a controller to a display driver, data for causing the display driver to drive a display of a printing apparatus to display, in a first area of the display, a plurality of images including a first image, wherein the plurality of images are representative of a plurality of respective different types of label data field, and to display a second image representative of the appearance of a label medium occupying a second area of the display that is different from the first area; and in response to receiving, at the controller from a selector, information comprising data representative of an operation of the selector by a user to select the first image and data representative of a position within the second area, outputting, from the controller to the display driver, data for causing the display driver to drive the display to display a revised version of the second image representative of the appearance of the label medium; wherein the revised version of the second image comprises a label data field of the type of label data field of which the first image is representative, and wherein the label data field comprised in the revised version of the second image is located at a location determined in dependence on said position within the second area.

Preferably the label data field comprised in the revised version of the second image occupies a region that includes said position within the second area. The label data field comprised in the revised version of the second image may have an edge or a corner that occupies said position within the second area. The first image may occupy a first region within the first area. The data representative of operation of the selector by the user to select the first image may comprise data representative of a first position within the first region. Optionally the information comprises data representative of operation of the selector by the user to perform a drag and drop operation from said first position within the first region to said position within the second area. The label data field may comprise at least one of: a text data field, a barcode data field and an image data field. The printing apparatus may comprise a printer connected to a computer.

Another aspect of the present disclosure may provide a computer program embodied on a computer readable medium, said computer program configured to control a controller to: output, to a display driver, data for causing the display driver to drive a display of a printing apparatus to display, in a first area of the display, a plurality of first images representative of the appearance of a plurality of respective labels that have previously been edited by a user using the printing apparatus, and to display, in a second area of the display that is different from the first area, a label design workspace; and in response to receiving, from a selector, information representative of an operation of the selector by a user to select one of the respective labels, output, to the display driver, data for causing the display driver to drive the display to display a revised version of the label design workspace; wherein the revised version of the label design workspace comprises a second image representative of the appearance of the label selected.

The plurality of first images may be displayed in an order determined in dependence on the time since each of the respective labels was last edited.

Each of the first images may be representative of the appearance of a respective label that is saved as a file in a memory location. The plurality of first images may be displayed in an order determined in dependence on the time since each of the respective labels was saved.

Optionally, each of the first images is representative of the appearance of a respective label that has been printed using a print head of the printing apparatus. The plurality of first images may be displayed in an order determined in dependence on the time since each of the respective labels was printed.

The printing apparatus may comprise a printer connected to a computer.

Another aspect of the present disclosure may provide an apparatus, comprising: a controller configured: to output, to a display driver, data for causing the display driver to drive a display of a printing apparatus to display, in a first area of the display, a plurality of first images representative of the appearance of a plurality of respective labels that have previously been edited by a user using the printing apparatus, and to display, in a second area of the display that is different from the first area, a label design workspace; and in response to receiving, from a selector, information representative of an operation of the selector by a user to select one of the respective labels, to output, to the display driver, data for causing the display driver to drive the display to display a revised version of the label design workspace; wherein the revised version of the label design workspace comprises a second image representative of the appearance of the label selected.

Another aspect of the present disclosure may provide a method, comprising: outputting, from a controller to a display driver, data for causing the display driver to drive a display of a printing apparatus to display, in a first area of the display, a plurality of first images representative of the appearance of a plurality of respective labels that have previously been edited by a user using the printing apparatus, and to display, in a second area of the display that is different from the first area, a label design workspace; and in response to receiving, at the controller from a selector, information representative of an operation of the selector by a user to select one of the respective labels, outputting, from the controller to the display driver, data for causing the display driver to drive the display to display a revised version of the label design workspace; wherein the revised version of the label design workspace comprises a second image representative of the appearance of the label selected.

The plurality of first images may be displayed in an order determined in dependence on the time since each of the respective labels was last edited. Each of the first images may be representative of the appearance of a respective label that is saved as a file in a memory location. The plurality of first images may be displayed in an order determined in dependence on the time since each of the respective labels was saved. Optionally, each of the first images is representative of the appearance of a respective label that has been printed using a print head of the printing apparatus. The plurality of first images may be displayed in an order determined in dependence on the time since each of the respective labels was printed. The printing apparatus may comprise a printer connected to a computer.

A further aspect of the present disclosure may provide a computer program embodied on a computer readable medium, said computer program configured to control a controller to: output, to a display driver, data for causing the display driver to drive a display of a printing apparatus to display, in a first area of the display, a plurality of first images representative of the appearance of a plurality of respective labels, and to display, in a second area of the display that is different from the first area, a second image representative of the appearance of a label comprising second label data, wherein one of the first images is representative of the appearance of a label comprising first label data arranged according to a first template, and wherein the first label data comprises at least some of the label data comprised in the second label data; and in response to receiving, from a selector, information representative of an operation of the selector by a user to select said one of the first images, output, to the display driver, data for causing the display driver to drive the display to display a third image in place of the second image; wherein the third image is representative of the appearance of a label comprising the first label data arranged according to the first template.

The second label data is preferably arranged according to a second template that is different from the first template.

The first label data may comprise the same label data as the second label data. The first label data may comprise label data in addition to the second label data.

The first label data may be arranged in one or more types of label data field. The second label data may be arranged in one or more types of label data field. At least some of the first label data may be arranged in a first type of label data field, and at least some of the second label data may be arranged in the same way in the same first type of label data field.

At least some of the first label data may be arranged in a first type of label data field, and none of the second label data may be arranged in said first type of label data field.

At least some of the second label data may be arranged in a second type of label data field, and none of the first label data may be arranged in said second type of label data field.

Preferably the plurality of first images are representative of the appearance of labels with label data arranged according to respective templates that have previously been applied to labels edited using the printing apparatus.

The plurality of first images may be displayed in an order determined in dependence on the time since each of the respective templates was last applied to a label edited using the printing apparatus.

The plurality of first images may be displayed in an order determined in dependence on the frequency of use during a period of each of the respective templates.

The plurality of first images may be representative of the appearance of labels with label data arranged according to respective templates that have previously been applied to labels printed using a print head of the printing apparatus. The plurality of first images may be displayed in an order determined in dependence on the time since each of the labels to which the respective templates have previously been applied was printed.

The plurality of first images are optionally representative of the appearance of labels with label data arranged according to different templates.

The plurality of first images may be representative of the appearance of labels with different dimensions.

One or both of the first label data and the second label data may comprise at least one of a text data field, a barcode data field or an image data field. The printing apparatus may comprise a printer connected to a computer.

A further aspect of the present disclosure may provide an apparatus, comprising: a controller configured: to output, to a display driver, data for causing the display driver to drive a display of a printing apparatus to display, in a first area of the display, a plurality of first images representative of the appearance of a plurality of respective labels, and to display, in a second area of the display that is different from the first area, a second image representative of the appearance of a label comprising second label data, wherein one of the first images is representative of the appearance of a label comprising first label data arranged according to a first template, and wherein the first label data comprises at least some of the label data comprised in the second label data; and in response to receiving, from a selector, information representative of an operation of the selector by a user to select said one of the first images, to output, to the display driver, data for causing the display driver to drive the display to display a third image in place of the second image; wherein the third image is representative of the appearance of a label comprising the first label data arranged according to the first template.

A further aspect of the present disclosure may provide a method, comprising: outputting, from a controller to a display driver, data for causing the display driver to drive a display of a printing apparatus to display, in a first area of the display, a plurality of first images representative of the appearance of a plurality of respective labels, and to display, in a second area of the display that is different from the first area, a second image representative of the appearance of a label comprising second label data, wherein one of the first images is representative of the appearance of a label comprising first label data arranged according to a first template, and wherein the first label data comprises at least some of the label data comprised in the second label data; and in response to receiving, from a selector, information representative of an operation of the selector by a user to select said one of the first images, outputting, to the display driver, data for causing the display driver to drive the display to display a third image in place of the second image; wherein the third image is representative of the appearance of a label comprising the first label data arranged according to the first template.

The second label data is preferably arranged according to a second template that is different from the first template. The first label data may comprise the same label data as the second label data. The first label data may comprise label data in addition to the second label data. The first label data may be arranged in one or more types of label data field. The second label data may be arranged in one or more types of label data field. At least some of the first label data may be arranged in a first type of label data field, and at least some of the second label data may be arranged in the same way in the same first type of label data field. At least some of the first label data may be arranged in a first type of label data field, and none of the second label data may be arranged in said first type of label data field. At least some of the second label data may be arranged in a second type of label data field, and none of the first label data may be arranged in said second type of label data field.

Preferably the plurality of first images are representative of the appearance of labels with label data arranged according to respective templates that have previously been applied to labels edited using the printing apparatus. The plurality of first images may be displayed in an order determined in dependence on the time since each of the respective templates was last applied to a label edited using the printing apparatus. The plurality of first images may be displayed in an order determined in dependence on the frequency of use during a period of each of the respective templates.

The plurality of first images may be representative of the appearance of labels with label data arranged according to respective templates that have previously been applied to labels printed using a print head of the printing apparatus. The plurality of first images may be displayed in an order determined in dependence on the time since each of the labels to which the respective templates have previously been applied was printed.

The plurality of first images are optionally representative of the appearance of labels with label data arranged according to different templates. The plurality of first images may be representative of the appearance of labels with different dimensions. One or both of the first label data and the second label data may comprise at least one of a text data field, a barcode data field or an image data field. The printing apparatus may comprise a printer connected to a computer.

A further aspect of the present disclosure may provide a computer program embodied on a computer readable medium, said computer program configured to control a controller to: output, to a display driver, data for causing the display driver to drive a display of a printing apparatus to display a user interface for designing labels, wherein the user interface comprises images representative of the appearance of a plurality of respective label media, and at least one link to an associated webpage, wherein each link of said at least one link is associated with a respective one of said label media; and in response to receiving, from a selector, information representative of an operation of the selector by a user to select one link of said at least one link, output, to the display driver, data for causing the display driver to drive the display to display the webpage with which said one link is associated, via which webpage the user is able to obtain a supply of the label media with which said one link is associated.

Preferably the computer program is configured to control the controller to display plural links to an associated webpage, wherein each of said plural links may be associated with a different one of said plurality of respective label media.

The computer program may be configured to control the controller to display a plurality of links associated with a first label media of said plurality of respective label media, wherein each of said plurality of links may be associated with a respective one of a plurality of stock keeping units associated with said first label media.

Each of the plurality of stock keeping units may be associated with at least one of a different quantity, colour or material of said first label media.

The user interface may comprise an image identifying a selectable part of the user interface, which selectable part is associated with the first label media; wherein the computer program is configured to control the controller to display said plurality of links associated with said first label media in response to receiving, from the selector, information representative of an operation of the selector by the user to select the selectable part.

One of said plurality of links may be a link to a webpage that is different from a webpage that one other link of said plurality of links is a link to.

One of said plurality of links may be a link to a common webpage that one other link of said plurality of links is a link to. Said one of said plurality of links and said one other link of said plurality of links may be links to different respective locations in the common webpage.

The printing apparatus may comprise a printer connected to a computer.

A further aspect of the present disclosure may provide an apparatus, comprising: a controller configured: to output, to a display driver, data for causing the display driver to drive a display of a printing apparatus to display a user interface for designing labels, wherein the user interface comprises images representative of the appearance of a plurality of respective label media, and at least one link to an associated webpage, wherein each link of said at least one link is associated with a respective one of said label media; and in response to receiving, from a selector, information representative of an operation of the selector by a user to select one link of said at least one link, to output, to the display driver, data for causing the display driver to drive the display to display the webpage with which said one link is associated, via which webpage the user is able to obtain a supply of the label media with which said one link is associated.

A further aspect of the present disclosure may provide a method, comprising: outputting, from a controller to a display driver, data for causing the display driver to drive a display of a printing apparatus to display a user interface for designing labels, wherein the user interface comprises images representative of the appearance of a plurality of respective label media, and at least one link to an associated webpage, wherein each link of said at least one link is associated with a respective one of said label media; and in response to receiving, at the controller from a selector, information representative of an operation of the selector by a user to select one link of said at least one link, outputting, from the controller to the display driver, data for causing the display driver to drive the display to display the webpage with which said one link is associated, via which webpage the user is able to obtain a supply of the label media with which said one link is associated.

Preferably the method comprises outputting, from the controller to the display driver, data for causing the display driver to drive the display to display plural links to an associated webpage, wherein each of said plural links may be associated with a different one of said plurality of respective label media. The method may comprise outputting, from the controller to the display driver, data for causing the display driver to drive the display to display a plurality of links associated with a first label media of said plurality of respective label media, wherein each of said plurality of links may be associated with a respective one of a plurality of stock keeping units associated with said first label media. Each of the plurality of stock keeping units may be associated with at least one of a different quantity, colour or material of said first label media.

The user interface may comprise an image identifying a selectable part of the user interface, which selectable part is associated with the first label media; wherein the method comprises outputting, from the controller to the display driver, data for causing the display driver to drive the display to display said plurality of links associated with said first label media in response to receiving, from the selector, information representative of an operation of the selector by the user to select the selectable part.

One of said plurality of links may be a link to a webpage that is different from a webpage that one other link of said plurality of links is a link to. One of said plurality of links may be a link to a common webpage that one other link of said plurality of links is a link to. Said one of said plurality of links and said one other link of said plurality of links may be links to different respective locations in the common webpage. The printing apparatus may comprise a printer connected to a computer.

A further aspect of the present disclosure may provide a computer program embodied on a computer readable medium, said computer program configured to control a controller to: output, to a display driver, data for causing the display driver to drive a display of a printing apparatus to display data associated with plural addresses; receive, from a selector, information representative of at least two operations of the selector by a user to select at least two addresses of the plural addresses, wherein each of the operations comprises an operation to select a respective address of the at least two addresses; cause information associated with said at least two addresses to be sent to a server; receive revision data from the server; and output, to the display driver, data for causing the display driver to drive the display to display plural status indications, in dependence on the revision data, wherein each of the status indications is associated with a respective address of the at least two addresses.

The data associated with plural addresses is preferably displayed on the display in a user interface for designing labels.

One status indication of said plural status indications may comprise a revised version of the respective address with which said one status indication is associated.

Each respective status indication of at least one of the plural status indications may comprise one of an indication that the server recognises the address with which the respective status indication is associated, or an indication that the server does not recognise the address with which the respective status indication is associated.

The revision data may comprise a ZIP code for at least one address of the at least two addresses. The revision data may comprise the revised version of the respective address with which said one status indication is associated.

The computer program may be configured to control the controller to output, to the display driver, data for causing the display driver to drive the display to display one or more further versions of the respective address with which said one status indication is associated, in addition to said revised version, in dependence on the revision data. The computer program may be configured to control the controller to receive, from the selector, information representative of an operation of the selector by the user to select said revised version.

The revised version of the respective address with which said one status indication is associated may comprise new data not comprised in the respective address with which said one status indication is associated. The new data may comprise a ZIP code.

The revision data may comprise data associated with an address format. One status indication of said plural status indications may comprise a revised version of the address with which said one status indication is associated that is formatted according to the address format.

The computer program may be configured to control the controller to receive, from a data input device of the printing apparatus, information representative of an operation of the data input device by the user to edit said revised version of the respective address with which said one status indication is associated, to create an edited revised version of the respective address with which said one status indication is associated.

The computer program may be configured to control the controller to cause information associated with said edited revised version of the respective address with which said one status indication is associated to be sent to the server; receive further revision data from the server; and output, to the display driver, data for causing the display driver to drive the display to display a further status indication associated with said respective address with which said one status indication is associated, in dependence on the further revision data. The further status indication may comprise a further revised version of the respective address with which said one status indication is associated.

The computer program may be configured to control the controller to store in memory the revised version of the respective address with which said one status indication is associated.

The data associated with plural addresses may comprise either at least a portion of each of the plural addresses or plural names of addressees associated with the respective plural addresses.

The information associated with said at least two addresses may comprise either at least a portion of each of said at least two addresses or respective unique identifiers associated with said at least two addresses.

The printing apparatus may comprise a printer connected to a computer.

A further aspect of the present disclosure may provide an apparatus, comprising: a controller configured: to output, to a display driver, data for causing the display driver to drive a display of a printing apparatus to display data associated with plural addresses; to receive, from a selector, information representative of at least two operations of the selector by a user to select at least two addresses of the plural addresses, wherein each of the operations comprises an operation to select a respective address of the at least two addresses; to cause information associated with said at least two addresses to be sent to a server; to receive revision data from the server; and to output, to the display driver, data for causing the display driver to drive the display to display plural status indications, in dependence on the revision data, wherein each of the status indications is associated with a respective address of the at least two addresses.

A further aspect of the present disclosure may provide a method, comprising: outputting, from a controller to a display driver, data for causing the display driver to drive a display of a printing apparatus to display data associated with plural addresses; receiving, from a selector, information representative of at least two operations of the selector by a user to select at least two addresses of the plural addresses, wherein each of the operations comprises an operation to select a respective address of the at least two addresses; causing information associated with said at least two addresses to be sent to a server; receiving, at the controller, revision data from the server; and outputting, from the controller to the display driver, data for causing the display driver to drive the display to display plural status indications, in dependence on the revision data, wherein each of the status indications is associated with a respective address of the at least two addresses.

The data associated with plural addresses is preferably displayed on the display in a user interface for designing labels. One status indication of said plural status indications may comprise a revised version of the respective address with which said one status indication is associated.

Each respective status indication of at least one of the plural status indications may comprise one of an indication that the server recognises the address with which the respective status indication is associated, or an indication that the server does not recognise the address with which the respective status indication is associated. The revision data may comprise a ZIP code for at least one address of the at least two addresses. The revision data may comprise the revised version of the respective address with which said one status indication is associated.

The method may comprise outputting, from the controller to the display driver, data for causing the display driver to drive the display to display one or more further versions of the respective address with which said one status indication is associated, in addition to said revised version, in dependence on the revision data. The method may comprise receiving, at the controller from the selector, information representative of an operation of the selector by the user to select said revised version.

The revised version of the respective address with which said one status indication is associated may comprise new data not comprised in the respective address with which said one status indication is associated. The new data may comprise a ZIP code. The revision data may comprise data associated with an address format. One status indication of said plural status indications may comprise a revised version of the address with which said one status indication is associated that is formatted according to the address format.

The method may comprise receiving, at the controller from a data input device of the printing apparatus, information representative of an operation of the data input device by the user to edit said revised version of the respective address with which said one status indication is associated, to create an edited revised version of the respective address with which said one status indication is associated.

The method may comprise causing information associated with said edited revised version of the respective address with which said one status indication is associated to be sent to the server; receiving further revision data from the server; and outputting, to the display driver, data for causing the display driver to drive the display to display a further status indication associated with said respective address with which said one status indication is associated, in dependence on the further revision data. The further status indication may comprise a further revised version of the respective address with which said one status indication is associated.

The method may comprise causing the revised version of the respective address with which said one status indication is associated to be stored in memory.

The data associated with plural addresses may comprise either at least a portion of each of the plural addresses or plural names of addressees associated with the respective plural addresses. The information associated with said at least two addresses may comprise either at least a portion of each of said at least two addresses or respective unique identifiers associated with said at least two addresses. The printing apparatus may comprise a printer connected to a computer.

Another aspect of the present disclosure may provide a computer program embodied on a computer readable medium, said computer program configured to control a controller of a computer to: receive information indicative of a type of label printer connected to the computer; cause data indicative of the type of label printer connected to the computer to be sent to a server; receive data from the server; and output, to a display driver, data for causing the display driver to drive a display of the computer to display printer information associated with the type of label printer connected to the computer in a webpage in a user interface for designing labels, in dependence on the data received from the server.

Plural different types of label printer may be connected to the computer. The computer program may be configured to control the controller to cause data indicative of at least two different types of the plural different types of label printer connected to the computer to be sent to the server. The computer program may be configured to control the controller to receive data associated with each of said at least two different types of label printer. The computer program may be configured to control the controller to receive information representative of an operation of the selector by the user to select an identifier representative of one of the at least two different types of label printer; and output, to the display driver, data for causing the display driver to drive the display to display, in the webpage, printer information associated with the type of label printer represented by the identifier. The identifier may be an entry in a drop down list displayed in the webpage.

The computer program may be configured to control the controller to cause the data indicative of the type of label printer to be sent to the server in response to receiving, from a selector, information representative of an operation of the selector by a user of the computer to select a link comprised in the user interface displayed on the display.

When plural different types of label printer are connected to the computer, the computer program may be configured to control the controller to: receive information representative of an operation of the selector by the user to select one of the plural different types of label printer; cause data indicative of said one of the plural different types of label printer selected to be sent to the server; receive second data from the server; and output, to the display driver, data for causing the display driver to drive the display to display, in the webpage, printer information associated with said one of the plural different types of label printer selected, in dependence on the second data received from the server.

The computer program may be configured to control the controller to cause data indicative of at least one of a country and a language to be sent to the server.

The printer information may comprise at least one of: technical support information for the type of label printer connected to the computer, information relating to a supply of label media that is usable in the type of label printer connected to the computer, tips for using the label printer connected to the computer, news or special offers relating to the label printer connected to the computer, and contact details.

Another aspect of the present disclosure may provide an apparatus, comprising: a controller of a computer, the controller being configured: to receive information indicative of a type of label printer connected to the computer; to cause data indicative of the type of label printer connected to the computer to be sent to a server; to receive data from the server; and to output, to a display driver, data for causing a display driver to drive a display of the computer to display printer information associated with the type of label printer connected to the computer in a webpage in a user interface for designing labels, in dependence on the data received from the server.

Another aspect of the present disclosure may provide a method, comprising: receiving, at a controller of a computer, information indicative of a type of label printer connected to the computer; causing data indicative of the type of label printer connected to the computer to be sent to a server; receiving data from the server; and outputting, from the controller to the display driver, data for causing a display driver to drive a display of the computer to display printer information associated with the type of label printer connected to the computer in a webpage in a user interface for designing labels, in dependence on the data received from the server.

Plural different types of label printer may be connected to the computer. The method may comprise the controller causing data indicative of at least two different types of the plural different types of label printer connected to the computer to be sent to the server. The method may comprise the controller receiving data associated with each of said at least two different types of label printer. The method may comprise the controller receiving information representative of an operation of the selector by the user to select an identifier representative of one of the at least two different types of label printer; and outputting, to the display driver, data for causing the display driver to drive the display to display, in the webpage, printer information associated with the type of label printer represented by the identifier. The identifier may be an entry in a drop down list displayed in the webpage.

The method may comprise the controller causing the data indicative of the type of label printer to be sent to the server in response to receiving, from a selector, information representative of an operation of the selector by a user of the computer to select a link comprised in the user interface displayed on the display.

When plural different types of label printer are connected to the computer, the method may comprise the controller: receiving information representative of an operation of the selector by the user to select one of the plural different types of label printer; causing data indicative of said one of the plural different types of label printer selected to be sent to the server; receiving second data from the server; and outputting, to the display driver, data for causing the display driver to drive the display to display, in the webpage, printer information associated with said one of the plural different types of label printer selected, in dependence on the second data received from the server.

The method may comprise the controller causing data indicative of at least one of a country and a language to be sent to the server. The printer information may comprise at least one of: technical support information for the type of label printer connected to the computer, information relating to a supply of label media that is usable in the type of label printer connected to the computer, tips for using the label printer connected to the computer, news or special offers relating to the label printer connected to the computer, and contact details.

Another aspect of the present disclosure may provide a computer program embodied on a computer readable medium, said computer program configured to control a controller of a computer to: output, to a display driver, data for causing the display driver to drive a display of the computer to display plural images representative of the appearance of respective plural label printers connected to the computer, wherein each image of the plural images is visually distinct from each other image of the plural images; receive, from a selector, information representative of an operation of the selector by a user to select one of the plural images; and setting a label printer of the plural label printers as being for use in subsequent printing onto a label medium, of which label printer said one of the plural images selected is representative.

Preferably the plural images are displayed in a user interface for designing labels. The plural images may comprise only images representative of the appearance of respective label printers that are capable of printing based on printing instructions generated by the software application for designing labels.

The user interface may comprise an image representative of the appearance of a label medium, wherein the computer program may be configured to control the controller to output, to the display driver, data for causing the display driver to drive the display to display an indication of which of the plural label printers are capable of printing onto the label medium.

The computer program may be configured to control the controller to: in response to receiving, from a selector, information representative of an operation of the selector by the user to select a second label medium that is different from the label medium; output, to the display driver, data for causing the display driver to drive the display to display an indication of which of the plural label printers are capable of printing onto the second label medium.

The user interface may comprise an image representative of the appearance of a label medium, wherein the computer program may be configured to control the controller to output, to the display driver, data for causing the display driver to drive the display to display an indication of which of the plural label printers are incapable of printing onto the label medium.

The computer program may be configured to control the controller to: in response to receiving, from a selector, information representative of an operation of the selector by the user to select a second label medium that is different from the label medium; output, to the display driver, data for causing the display driver to drive the display to display an indication of which of the plural label printers are incapable of printing onto the second label medium.

The user interface may comprise an image representative of the appearance of a label medium, wherein said plural images comprise only images representative of the appearance of respective label printers that are capable of printing onto said label medium.

The computer program may be configured to control the controller to: in response to receiving, from a selector, information representative of an operation of the selector by the user to select a second label medium that is different from the label medium; output, to the display driver, data for causing the display driver to drive the display to display a plurality of images representative of the appearance of respective plural label printers, wherein said plurality of images comprises only images representative of the appearance of respective label printers that are capable of printing onto the second label medium.

A first image of the plural images may be representative of a first label printer of the plural label printers, which first label printer has two printing mechanisms. Said first image may occupy a first area of the display and said computer program may be configured to control the controller to: receive, from the selector, data representative of an operation of the selector by the user to select a position within the first area; and select one of the two printing mechanisms for use in the subsequent printing in dependence on the position selected.

The first image may include a first indication of a first one of the two printing mechanisms, and said computer program may be configured to control the controller to select said first one of the two printing mechanisms for use in the subsequent printing, when the controller receives from the selector information representative of an operation of the selector by the user to select said first image.

A second image of the plural images may include a second indication of a second one of the two printing mechanisms, and said computer program may be configured to control the controller to select said second one of the two printing mechanisms for use in the subsequent printing, when the controller receives from the selector information representative of an operation of the selector by the user to select said second image.

A first one of the two printing mechanisms may comprise a first print head and a second one of the two printing mechanisms comprises a second print head.

A first one of the two printing mechanisms may comprise a first source of label media and a second one of the two printing mechanisms may comprise a second source of label media.

Another aspect of the present disclosure may provide an apparatus comprising a controller of a computer, the controller being configured: to output, to a display driver, data for causing the display driver to drive a display of the computer to display plural images representative of the appearance of respective plural label printers connected to the computer, wherein each image of the plural images is visually distinct from each other image of the plural images; to receive, from a selector, information representative of an operation of the selector by a user to select one of the plural images; and to set a label printer of the plural label printers as being for use in subsequent printing onto a label medium, of which label printer said one of the plural images selected is representative.

Another aspect of the present disclosure may provide a method, comprising: outputting, from a controller of a computer to a display driver, data for causing the display driver to drive a display of the computer to display plural images representative of the appearance of respective plural label printers connected to the computer, wherein each image of the plural images is visually distinct from each other image of the plural images; receiving, at the controller from a selector, information representative of an operation of the selector by a user to select one of the plural images; and setting a label printer of the plural label printers as being for use in subsequent printing onto a label medium, of which label printer said one of the plural images selected is representative.

Preferably the plural images are displayed in a user interface for designing labels. The plural images may comprise only images representative of the appearance of respective label printers that are capable of printing based on printing instructions generated by the software application for designing labels.

The user interface may comprise an image representative of the appearance of a label medium, wherein the method comprises the controller outputting, to the display driver, data for causing the display driver to drive the display to display an indication of which of the plural label printers are capable of printing onto the label medium.

The method may comprise the controller: in response to receiving, from a selector, information representative of an operation of the selector by the user to select a second label medium that is different from the label medium; outputting, to the display driver, data for causing the display driver to drive the display to display an indication of which of the plural label printers are capable of printing onto the second label medium.

The user interface may comprise an image representative of the appearance of a label medium, wherein the method comprises the controller outputting, to the display driver, data for causing the display driver to drive the display to display an indication of which of the plural label printers are incapable of printing onto the label medium.

The method may comprise the controller: in response to receiving, from a selector, information representative of an operation of the selector by the user to select a second label medium that is different from the label medium; outputting, to the display driver, data for causing the display driver to drive the display to display an indication of which of the plural label printers are incapable of printing onto the second label medium.

The user interface may comprise an image representative of the appearance of a label medium, wherein said plural images comprise only images representative of the appearance of respective label printers that are capable of printing onto said label medium.

The method may comprise the controller: in response to receiving, from a selector, information representative of an operation of the selector by the user to select a second label medium that is different from the label medium; outputting, to the display driver, data for causing the display driver to drive the display to display a plurality of images representative of the appearance of respective plural label printers, wherein said plurality of images comprises only images representative of the appearance of respective label printers that are capable of printing onto the second label medium.

A first image of the plural images may be representative of a first label printer of the plural label printers, which first label printer has two printing mechanisms. Said first image may occupy a first area of the display and said computer program may be configured to control the controller to: receive, from the selector, data representative of an operation of the selector by the user to select a position within the first area; and select one of the two printing mechanisms for use in the subsequent printing in dependence on the position selected.

The first image may include a first indication of a first one of the two printing mechanisms, and the method may comprise the controller selecting said first one of the two printing mechanisms for use in the subsequent printing, when the controller receives from the selector information representative of an operation of the selector by the user to select said first image. A second image of the plural images may include a second indication of a second one of the two printing mechanisms, and the method may comprise the controller selecting said second one of the two printing mechanisms for use in the subsequent printing, when the controller receives from the selector information representative of an operation of the selector by the user to select said second image.

A first one of the two printing mechanisms may comprise a first print head and a second one of the two printing mechanisms comprises a second print head. A first one of the two printing mechanisms may comprise a first source of label media and a second one of the two printing mechanisms may comprise a second source of label media.

A further aspect of the present disclosure may provide a computer program embodied on a computer readable medium, said computer program configured to control a controller to: output, to a display driver, data for causing the display driver to drive a display of a printing apparatus to display a user interface for designing labels, wherein the user interface comprises a first image representative of the appearance of a label medium and an image representative of a slide bar, wherein the slide bar comprises a slider at a first position on a track; and in response to receiving, from a selector, information representative of an operation of the selector by a user to select a second position on the track, which second position is different from the first position; output, to the display driver, data for causing the display driver to drive the display to display a second image representative of the appearance of the label medium, wherein the second image representative of the appearance of the label medium has a size dependent on the location of the second position on the track.

The information is preferably representative of an operation of the selector by the user to perform a drag and drop operation from the first position on the track to the second position on the track. The information may comprise data representative of a series of other positions between the first position and the second position.

The computer program may be configured to control the controller to output, to the display driver, data for causing the display driver to drive the display to display successively a series of images representative of the appearance of the label medium, and wherein each image of said series of images is associated with a respective one of said series of other positions between the first position and the second position, and wherein each image of said series of images has a size dependent on the distance between the first position and said respective one of said series of other positions with which said image of said series of images is associated.

The second image representative of the appearance of the label medium may be larger than the first image representative of the appearance of a label medium. The computer program may be configured to control the controller to: in response to receiving, from the selector, information representative of an operation of the selector by the user to select a third position on the track, which third position is different from each of the first position and second position; output, to the display driver, data for causing the display driver to drive the display to display a third image representative of the appearance of the label medium, wherein the third image representative of the appearance of the label medium is smaller than the first image representative of the appearance of a label medium. Preferably the first position on the track is located between the second position on the track and the third position on the track. The printing apparatus may comprise a printer connected to a computer.

A further aspect of the present disclosure may provide an apparatus comprising: a controller configured: to output, to a display driver, data for causing the display driver to drive a display of a printing apparatus to display a user interface for designing labels, wherein the user interface comprises a first image representative of the appearance of a label medium and an image representative of a slide bar, wherein the slide bar comprises a slider at a first position on a track; and in response to receiving, from a selector, information representative of an operation of the selector by a user to select a second position on the track, which second position is different from the first position; to output, to the display driver, data for causing the display driver to drive the display to display a second image representative of the appearance of the label medium, wherein the second image representative of the appearance of the label medium has a size dependent on the location of the second position on the track.

A further aspect of the present disclosure may provide a method, comprising: outputting, from a controller to a display driver, data for causing the display driver to drive a display of a printing apparatus to display a user interface for designing labels, wherein the user interface comprises a first image representative of the appearance of a label medium and an image representative of a slide bar, wherein the slide bar comprises a slider at a first position on a track; and in response to receiving, at the controller from a selector, information representative of an operation of the selector by a user to select a second position on the track, which second position is different from the first position; outputting, from the controller to the display driver, data for causing the display driver to drive the display to display a second image representative of the appearance of the label medium, wherein the second image representative of the appearance of the label medium has a size dependent on the location of the second position on the track.

The information is preferably representative of an operation of the selector by the user to perform a drag and drop operation from the first position on the track to the second position on the track. The information may comprise data representative of a series of other positions between the first position and the second position.

The method may comprise outputting, from the controller to the display driver, data for causing the display driver to drive the display to display successively a series of images representative of the appearance of the label medium, and wherein each image of said series of images is associated with a respective one of said series of other positions between the first position and the second position, and wherein each image of said series of images has a size dependent on the distance between the first position and said respective one of said series of other positions with which said image of said series of images is associated.

The second image representative of the appearance of the label medium may be larger than the first image representative of the appearance of a label medium. The method may comprise, in response to receiving at the controller from the selector information representative of an operation of the selector by the user to select a third position on the track, which third position is different from each of the first position and second position; outputting, to the display driver, data for causing the display driver to drive the display to display a third image representative of the appearance of the label medium, wherein the third image representative of the appearance of the label medium is smaller than the first image representative of the appearance of a label medium. Preferably the first position on the track is located between the second position on the track and the third position on the track. The printing apparatus may comprise a printer connected to a computer.

BRIEF DESCRIPTION OF THE DRAWINGS

For a better understanding of the present disclosure and as to how the same may be carried into effect, reference will now be made by way of example to the accompanying drawings in which:

FIG. 5 is a representation of the contents of another display shown on display of a printing apparatus embodying the present invention;

FIG. 32 is a representation of the contents of a further display shown on display of a printing apparatus embodying the present invention;

DETAILED DESCRIPTION OF THE INVENTION

Figure 1:
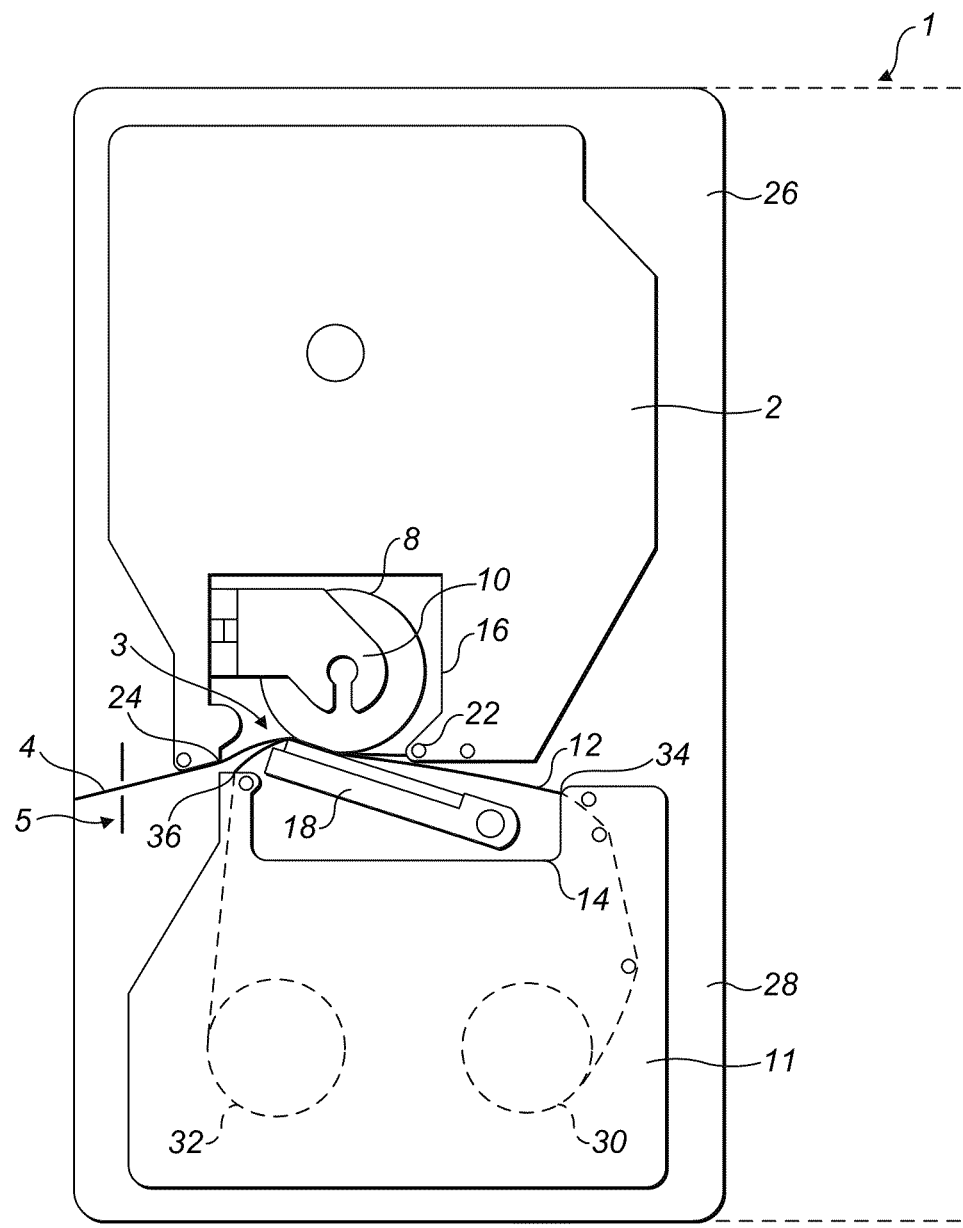
FIG. 1 is a plan view of a first label printing device using a two cassette set system.

Some embodiments may provide a controller of a display, which controller can be operated by a user to insert a label data field at a desired location in an image representative of the appearance of a label being created. This can be by way of, after selecting a type of desired label data field, sending to the controller of the display information representative of the desired location to make the controller cause the display to display the label data field at the desired location in the image. Thus, a minimum number of steps are required to be performed by the user before the data field is located at the desired location in the label being designed. The user can thus also accurately position the data field at the desired location.

Some embodiments may be such that a user is able to alter a display of a printer to show a particular desired portion of a label being created. In particular, some embodiments provide the user with the option of "zooming in" to an image representative of the appearance of the label being edited or created, in order to help them more accurately position label data. Some embodiments provide the user with the option of "zooming out" of an image of the label being edited or created, to provide them with a display showing all of, or a greater portion of, the label. This is helpful for the user since it can give them an indication of the overall layout of the label. Such zooming in or out may be achieved by the user dragging a slider along a track of a slide bar shown on a display.

Some embodiments may be such that one or more images representative of the appearance of respective labels with label data arranged according to respective templates are displayed on a display. A user can therefore easily find a desired template to use when creating a label. The label data may comprise at least some of the same label data that is comprised in a current label being edited in a label design workspace. The user is therefore provided with a visualisation of what the current label would look like were the respective template(s) to be applied to the label data of the current label, rather than having to estimate what the current label would look like based on e.g. a reference number or file name associated with the template(s). By selecting one of the images, at least some of the label data of the label being edited can be quickly and easily reformatted according to the template indicated by the selected image.

In some embodiments, one or more images representative of the appearance of different label types are displayed on a display. The images may show respective outlines, shapes or colours of the different label types, which may have different shapes and/or dimensions. A user can therefore easily visualise different label types and select a desired label type suitable for a particular duty.

Some embodiments may provide that one or more images representative of the appearance of labels that have been previously printed, or saved to memory, are displayed on a display. This makes it easier for a user to find a particular saved or previously-printed label, so that they can easily produce the same label again without having to re-enter label data. In some embodiments the user can select one of the images and then choose to edit or reprint it.

Some embodiments may be such that an image representative of the appearance of a label medium, and also supply-reordering information associated with the label medium, are displayed on a display. The supply-reordering information may comprise a link, such as a hyperlink, to a source from which a user is able to order the label medium with which the link is associated. This helps the user to order the correct type of label medium, since no information such as a stock reference number needs to transcribed to order the label medium. Instead, they are provided with a visualisation of the label medium and can be directed (e.g. by the application running on their printer or PC) to a reputable source of the desired label stock, which source can provide authorised and high quality label media.

Some embodiments may be such that the format and/or content of addresses entered into a printing apparatus for printing onto a label is revised by the printing apparatus to place the addresses in an optimum state for recognition by the postal organisation(s) that will be responsible for delivering the mail to which the label will be adhered. This makes it easier for the postal organisation(s) to determine the address to which the mail is to be delivered, and thus the user can be more confident that the mail will be correctly delivered.

Some embodiments may be such that a display of a computer is controlled to display information relating to the type of label printer (or printers) connected to the computer. This may be achieved, for example, by way of the computer receiving identification about the connected printer(s) from the printer(s) itself, or by way of otherwise telling the computer (e.g. by installing a printer driver at the computer) what type of printer(s) is/are connected. Thus the user does not themselves need to know or determine the type(s) of printer connected to the computer in order to find the information relating to that type of label printer.

Some embodiments control a display such that it shows a visually-distinct representation of the appearance of each of the printers connected to the device comprising the display, such as a computer. When a user of the device wishes to print to a particular one of the printers, they can easily identify which of several printers shown on the screen is the desired printer by comparing the image on the screen with the appearance of the printer in reality. The user has means for selecting one of the images on the screen, thus ensuring that the desired printer is used.

FIG. 1 shows in plan view a first label printing device which has two cassettes arranged therein. Typically, this label printing device 1 is a handheld or small desktop device which is powered by batteries at least part of the time. Alternatively the label printing device may be mains powered. The upper cassette is located in a first cassette receiving portion 26 and contains a supply of image receiving tape 4 which passes through a print zone 3 of the tape printing device 1 to an outlet 5 of the tape printing device 1. The image receiving tape 4 comprises an upper layer for receiving a printed image on its upper surface and has its other surface coated with an adhesive layer to which is secured a releasable backing layer. The upper cassette 2 has a recess for accommodating a platen 8 of the tape printing device 1, and guide portions 22 and 24 for guiding the tape through a print zone 3. The platen 8 is mounted for rotation within a cage moulding 10. Alternatively the platen could be mounted for rotation on a pin.

The lower cassette 11 is located in the second cassette receiving portion 28 and contains a thermal transfer ribbon 12 which extends from the supply spool 30 to a take-up spool 32 within the cassette 11. The thermal transfer ribbon 12 extends through the print zone 3 in overlap with the image receiving tape 4. The cassette 11 has recess 14 for receiving a print head 18 of the label printing device 1 and guide portions 34 and 36 for guiding the thermal transfer ribbon 12 through the print zone 3. Print head 18 is moveable between an operative position shown in FIG. 1, in which it is in contact with the platen 8 and holds the thermal transfer ribbon 12 and the image receiving tape 4 in overlap between a print head 18 and the platen 8, and an inoperative position in which it is moved away from the platen 8 to release thermal transfer ribbon 12 and image receiving tape 4. In the operative position, the platen 8 is rotated to cause the image receiving tape 12 to be driven past print head 18 and the print head 18 is controlled to print an image on the image receiving tape 4 by thermal transfer of ink from the ribbon 12. Each of plural printing elements on the print head 18 is activatable separately and is activated in accordance with the desired image to be printed. The label printing device 1 has a lid (which is not shown) which is hinged along the rear of the cassette receiving portions 26 and 28 and which covers both cassettes when in place.

A DC motor 207 (see FIG. 3) continuously drives the platen 8. The platen is arranged to drive the image receiving tape 4 through the print zone 3 by the actuation of its own rotation. In other embodiments, transport of the image receiving tape across the print head can be done by other means, such as by a separate driven roller of the printer or of the cassette, or by a pair of cooperating rollers positioned on opposite sides of the tape, or by other means.

The image is printed by the print head 18 on the image receiving tape on a column by column basis with the columns being adjacent one another in the direction of movement of the tape 4.

Figure 2:
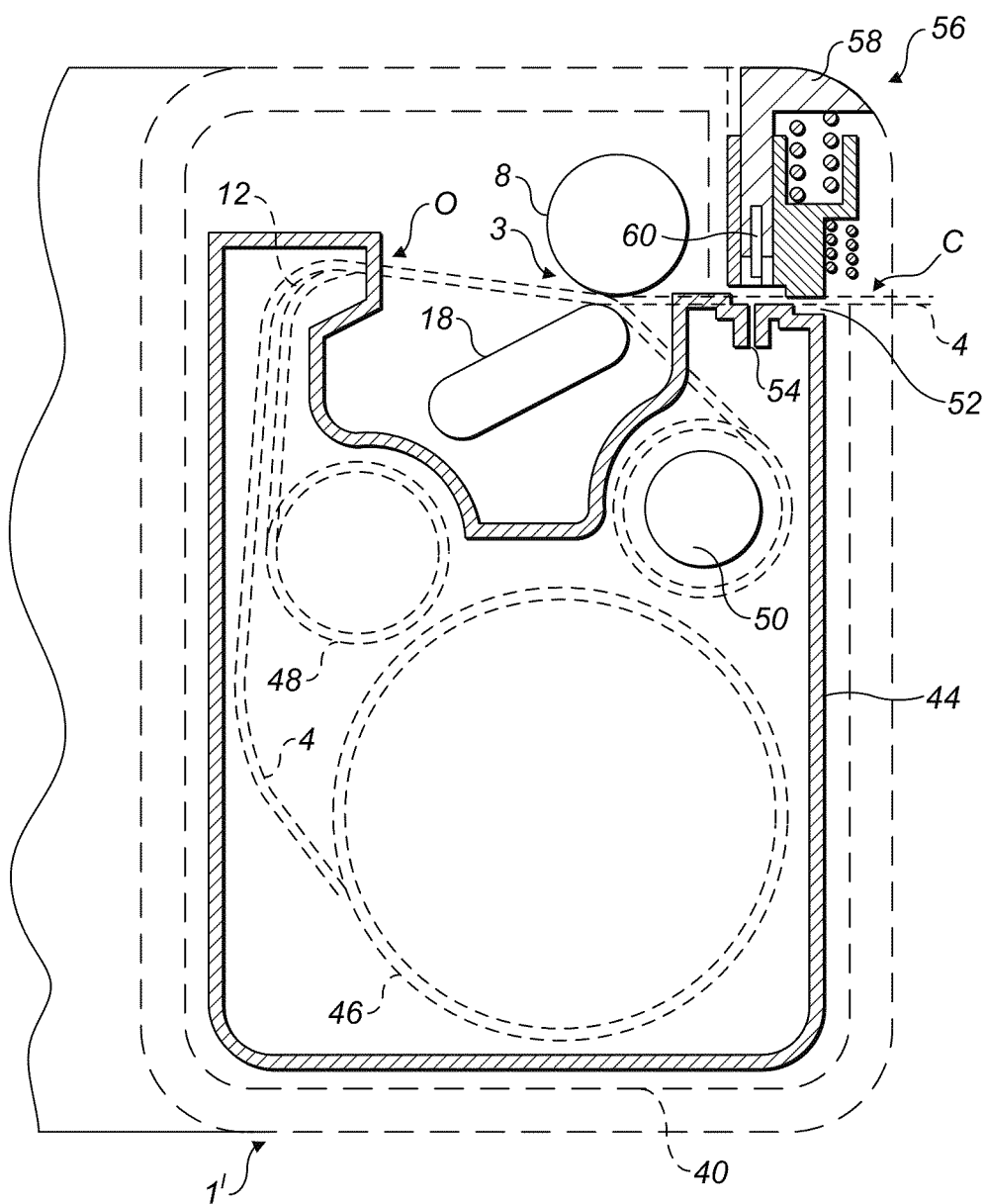
FIG. 2 is plan view of the second label printing device using a one cassette set system.

FIG. 2 illustrates in plan view a cassette bay of a second printing device 1' which uses a one cassette system. Like reference numerals are used for those parts which are also shown in FIG. 1. The cassette bay is shown by the dotted line 40. The cassette bay 40 includes a thermal print head 18 and a platen 8 which cooperate to define a print zone 3.

The print head 18 is pivotable about a pivot point so that it can be brought into contact with the platen 8 for printing and moved away from the platen 8 to enable the cassette to be removed and replaced, as in the first embodiment. A cassette inserted into the cassette bay 40 is denoted generally by reference numeral 44. The cassette 44 holds a supply spool 46 of image receiving tape 4. The image receiving tape 4 is guided by a guide mechanism (which is not shown) through the cassette 44, out of the cassette 44 through an outlet O past the print zone 3 to a cutting location C. The same cassette 44 also has an ink ribbon supply spool 48 and an ink ribbon take up spool 50. The ink ribbon 12 is guided from the ink ribbon supply spool 48 through the print zone 3 and taken up on the ink ribbon take up spool 50. As with the first embodiment, the image receiving tape 4 passes in overlap with the ink ribbon 12 through the print zone 3 with its image receiving layer in contact with the ink ribbon 12. The platen of this second embodiment is also driven by a motor 207. The motor rotates to drive continuously the image receiving tape through the pint zone 3 during printing. In either of the embodiments, it is possible that the tape be driven in a step wise manner by a stepper motor.

An image is printed on the tape, and then fed out from the print zone to the cutting location C which is provided at a location in a portion of the wall of the cassette 44 which is close to the print zone 3. The portion of the wall on the cassette 44 where the cutting location C is defined is denoted by reference 52. A slot 54 is defined in the wall portion 52 and the image receiving tape 4 is fed past the print zone 3 to the cutting location C where it is supported by facing wall portions on either side of the slot 54.

The second label printing device 1' includes a cutting mechanism 56 including a cutter support member 58 which carries a blade 60. The blade 60 cuts the image receiving tape 4 and then enters the slot 54. In other embodiments the slot is not present. It should be appreciated that the first embodiment will usually also include a cutting mechanism.

These example label printing devices 1 and 1' may be a stand-alone printing apparatus including the controller of the present disclosure to receive inputs from a user and to alter what is displayed on a display of the printing apparatus. Alternatively, the label printing devices 1 and 1' may be printers that are connectable or connected to a computer, and it is the computer which includes the controller of the present disclosure to receive inputs from a user and to alter what is displayed on a display of the label printing devices or of the computer.

Figure 3:
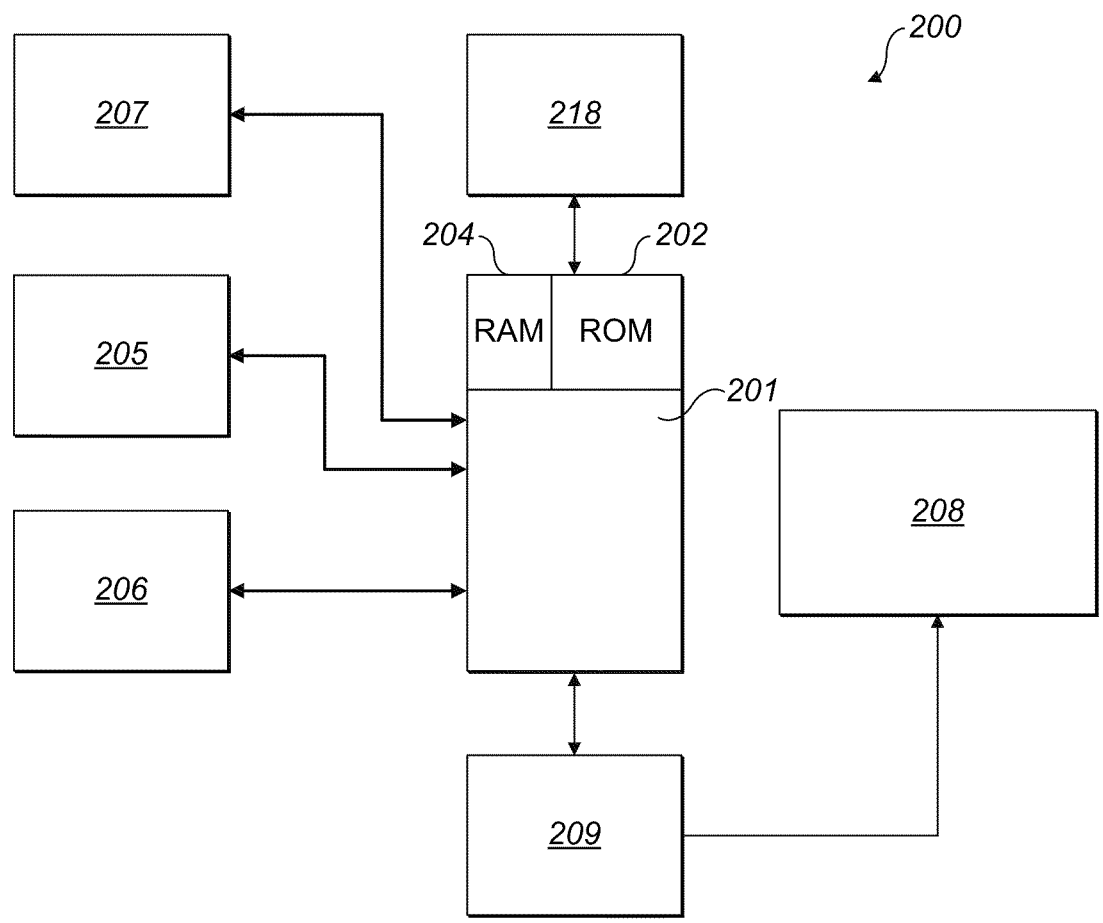
FIG. 3 is a diagrammatic sketch showing the control circuitry in an embodiment of the printing apparatus of the present invention.

Basic circuitry 200 for controlling a stand-alone version of the tape printing device 1 of FIG. 1 or the tape printing device 1' of FIG. 2 is shown in FIG. 3. There is a microprocessor chip 201 (i.e. a controller or control means), a non-volatile memory 202, which is for example a read only memory (ROM) or a flash type of memory, and volatile memory (e.g. random access memory capacity indicated diagrammatically by RAM) 204. The microprocessor chip 201 is connected to receive label data input to it from a data input device 206 such as a keyboard. The microprocessor chip 201 may also be connected to receive signals (i.e. information/data) from a selector 205 operable by a user. The selector comprises some form of means, such as a mouse, touchscreen sensor, digital pen or tracker ball, for enabling a user to send commands to the microprocessor chip 201. Thus, the selector 205 could be some form of input means or selection means. The microprocessor chip 201 outputs data to drive a display 208 via a display driver chip 209 to display a label to be printed (or a part thereof) and/or a message for the user. The display driver alternatively may form part of the microprocessor chip. Additionally, the microprocessor chip 201 also outputs data to drive the print head 218 so that the label data is printed onto the image receiving tape to form a label. Finally, the microprocessor chip 201 also controls the motor 207 for driving the platen. The microprocessor chip 201 may also control the cutting mechanism to allow a length of tape to be cut off. In alternative embodiments at least part of the cutting mechanism may be manually operated.

FIG. 3 illustrates an embodiment where all these components shown in FIG. 3 are included in a stand-alone printing apparatus. Alternative arrangements, in which printing apparatuses embodying the present disclosure comprise a printer connected to a PC, are described below with reference to FIGS. 26 and 27.

In other embodiments, the printing apparatus does not include an ink ribbon and the print head creates an image directly onto direct thermal tape. In those embodiments similar circuitry 200 can be provided.

Figure 4:
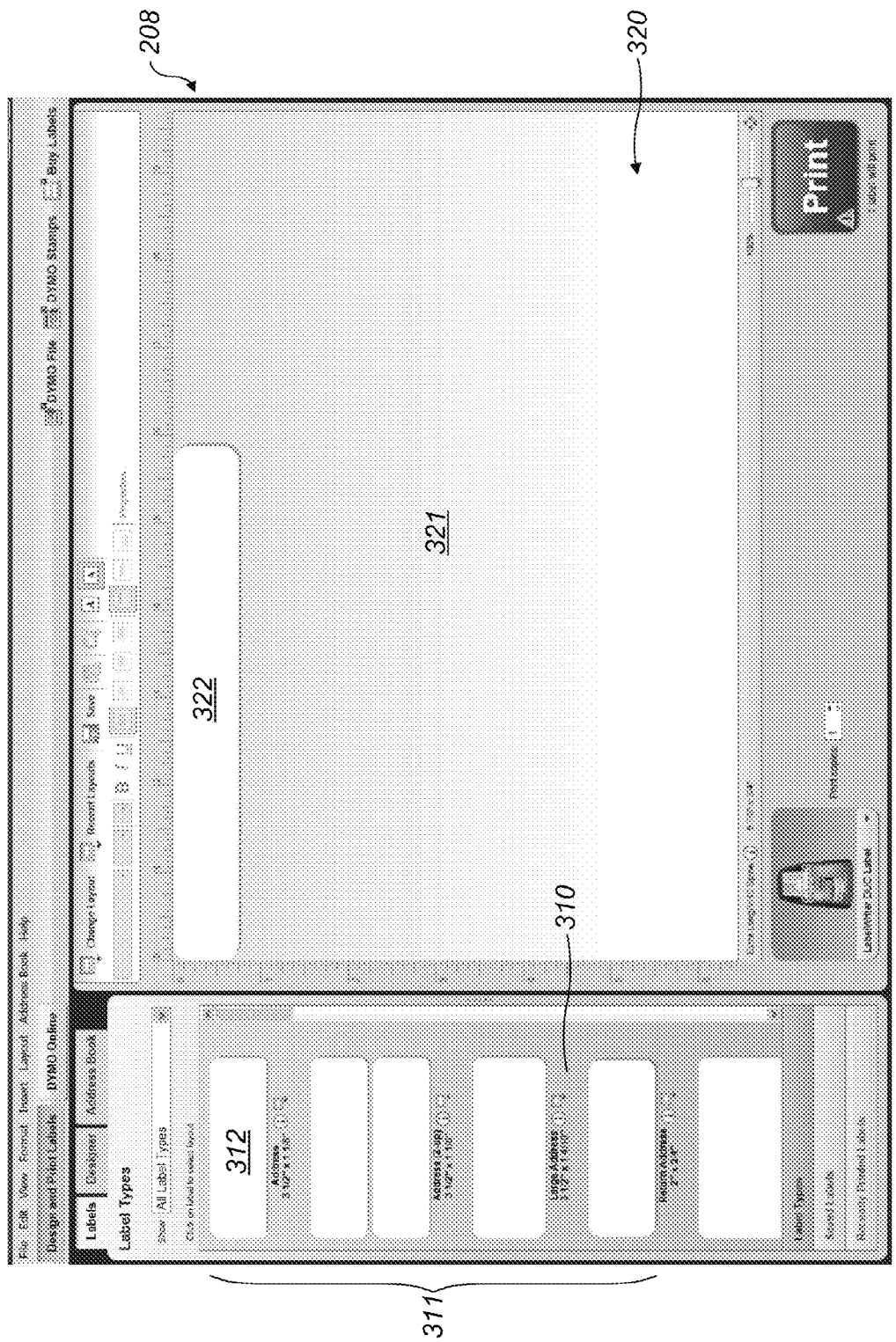
FIG. 4 is a representation of the contents of a display shown on display of a printing apparatus embodying the present invention.

FIG. 4 shows a display 208 of a printing apparatus embodying one embodiment of the present invention. In this embodiment, the display 208 is a monitor of a personal computer (PC) connected to a printer and the circuitry 200 described above is included in the personal computer. However, as discussed above, in other embodiments the printing apparatus is a stand-alone printer and the display 208 and circuitry 200 are included within the stand-alone printer. Such a stand-alone printer may be a portable and, possibly, handheld printer.

The display 208 is driven to display a user interface (such as a graphical user interface, or GUI) for designing labels. The user interface may be a user interface of software for running on a personal computer (such as a software application), or a user interface of software that runs in a stand-alone printer. The user interface comprises several images 311 representative of the appearance of plural respective labels in a first area 310 of the display 208. The images 311 shown in this first area 310 are representative of different types of labels that a user may apply print data to, and/or manipulate label data for, using the printing apparatus. The different types of labels in this example comprise labels of different dimensions. In other embodiments, the labels may differ in other respects or characteristics, such as the type of material that the different labels are made of. The display 208 also displays a label design workspace 321 in a second area 320 of the display 208. In this embodiment, the second area 320 is different from the first area 310. The label design workspace 321 is an area of the display within which a user can add and/or delete and/or manipulate label data for inclusion in a label to be printed. Such label data includes, but is not limited to, text (including numbers, letters, and other text characters such as punctuation marks and text symbols), images, shapes, symbols and 1D and 2D barcodes.

Figure 5:
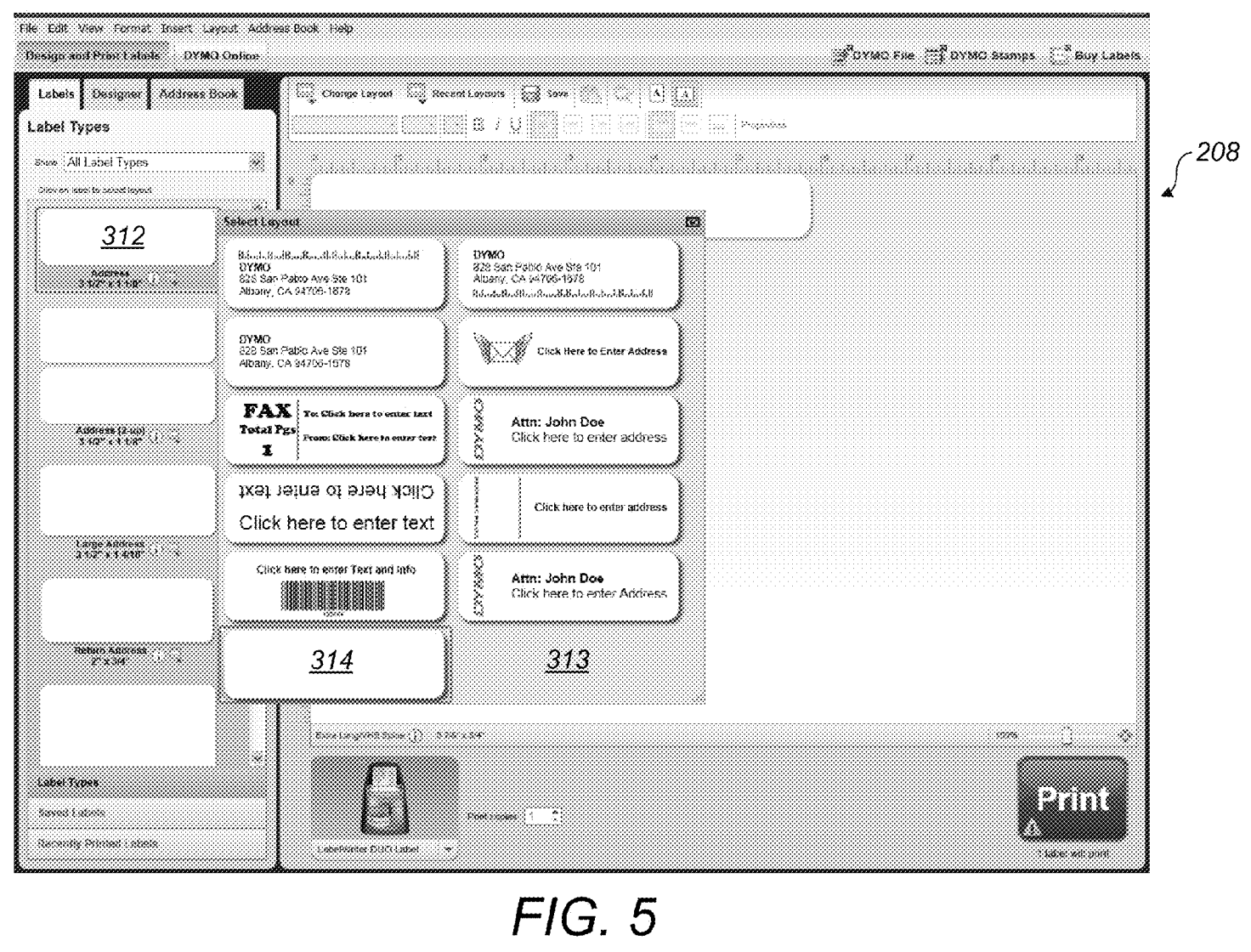

In FIG. 4, a representation of the appearance of a video cassette label 322 is shown in the label design workspace 321. When a user wishes to create an alternative type of label, they use an input device (such as a mouse, tracker ball, digital pen, touchscreen, or other selector 205 or "selection means" or "input means") to move a cursor (not shown) on the display 208 to select (e.g. "click on") a label whose appearance is represented by one of the images 311 shown in the first area 310. By clicking on a first image 312 of the plural images 311 shown in the first area 310, the display 208 is driven by the display driver 209 (or, in other embodiments, the controller 201 itself) to display in a separate window plural label layouts 313 that are applicable to the first image 312 and selectable by the user, as shown in FIG. 5. In alternative embodiments, the plural label layouts 313 may be displayed in the first area 310 previously discussed.

The first image 312 corresponds to the appearance of an address label of the dimensions 3½"×1⅛", although in other embodiments a different type of label with different dimensions is selected. Some of the label layouts 313 include a predetermined arrangement of predefined label data, such as barcodes, images, and text including names and addresses. Although the user could select one of the label layouts including such predefined label data, in this scenario the user chooses to select a blank label 314, which excludes predefined label data.

Figure 6:
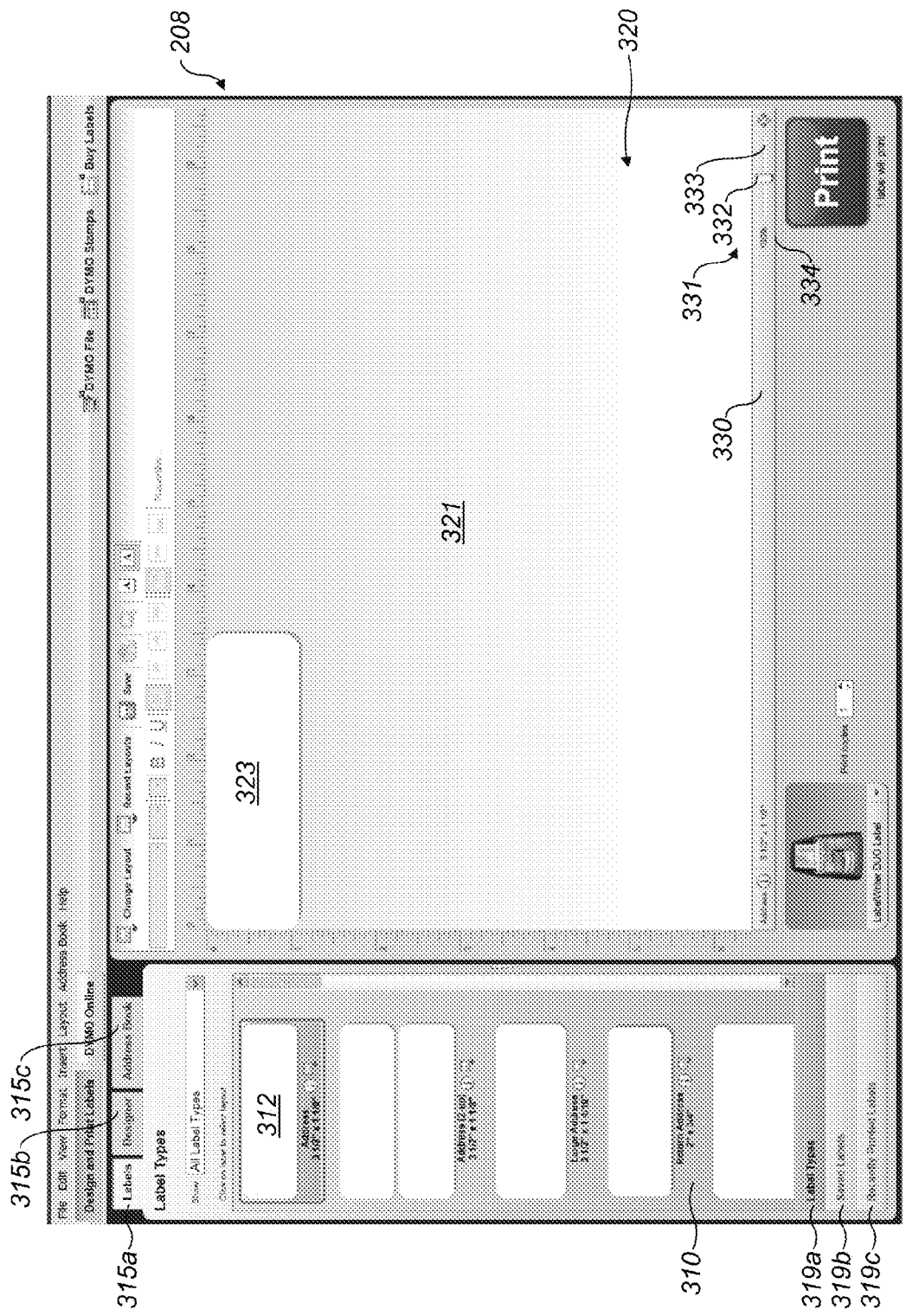
FIG. 6 is a representation of the contents of a further display shown on display of a printing apparatus embodying the present invention.

By using their input device (i.e. selector 205), the user selects (e.g. "clicks on") the blank label 314. This selecting of the blank label 314 causes information (i.e. data or some form of signal), representative of an operation or activation of the selector 205 by the user to select the label 314, to be sent from the selector 205 to the controller 201. In dependence on receiving this information (or data or signal), the controller 201 outputs data to the display driver 209 for causing the driver 209 to drive the display 208 to display in the label design workspace 321 in the second area 320 a second image 323 representative of the appearance of the selected label that was represented by the first image 312, as shown in FIG. 6.

In the illustrated embodiment, when a user selects the label whose appearance is represented by the first image 312 in the first area 310, they are presented with the plural label layouts 313. In alternative embodiments, the plural label layouts 313 are not displayed. Instead, the selecting of the label whose appearance is represented by the first image 312 causes information, representative of an operation of the selector 205 by the user to select the label, to be sent from the selector 205 to the controller 201. In dependence on receiving this information, the controller 201 outputs to the driver 209 data for causing the driver 209 to drive the display 208 to display in the label design workspace 321 in the second area 320 a second image 323 representative of the appearance of the selected label that was represented by the first image 312, again as shown in FIG. 6.

In the illustrated embodiment, the topmost one of the images 311 is a first image 312 which is representative of the label type that has been most recently used. Thus, the user would not necessarily need to scroll through all possible label types when looking for a label type that they have recently used. In other embodiments the images 311 may be presented in a different order in the first area 310, such as by frequency of use of the different label types over a period of time.

Another aspect of the present disclosure will now be described with reference to FIGS. 6 and 7. FIG. 6 shows a display 208 displaying an image 323 representative of the appearance of a label medium in an area 320 of the display 208, which label medium is being edited in the label design workspace 321. Shown in a further area 330 of the display 208 is a slide bar 331, comprising a slider 332 at a first position on a track 333.

As indicated by characters 334 adjacent the slide bar 331, the image 323 is shown on the display in FIG. 6 at "100%" zoom. Some embodiments of the present disclosure provide the user with the option of "zooming in" to the image 323 of the appearance of the label medium being edited in the label design workspace 321, in order to enlarge the image 323 to help them more accurately position label data within a label being edited or created.

Figure 7:
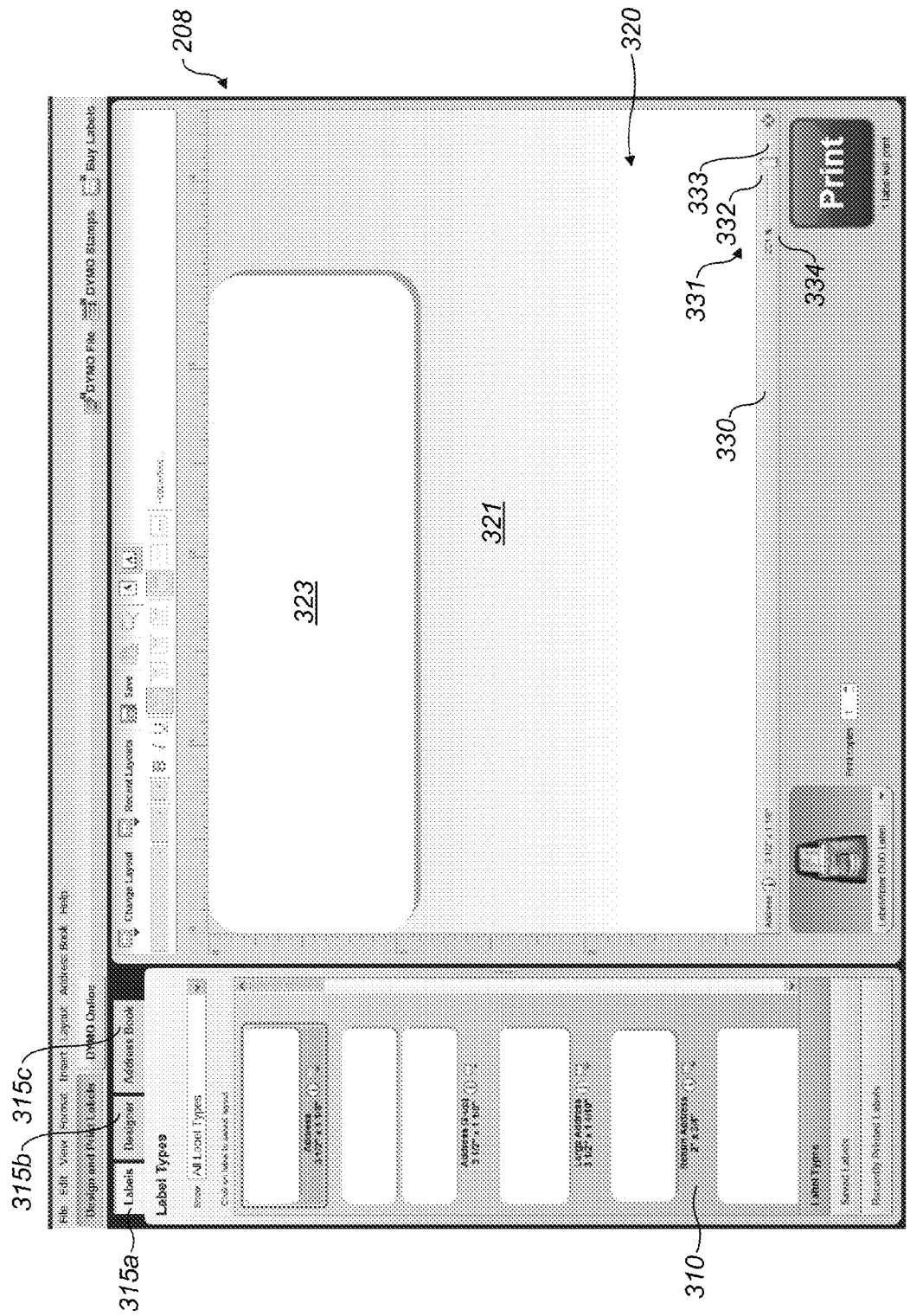
FIG. 7 is a representation of the contents of a further display shown on display of a printing apparatus embodying the present invention.
Figure 41:
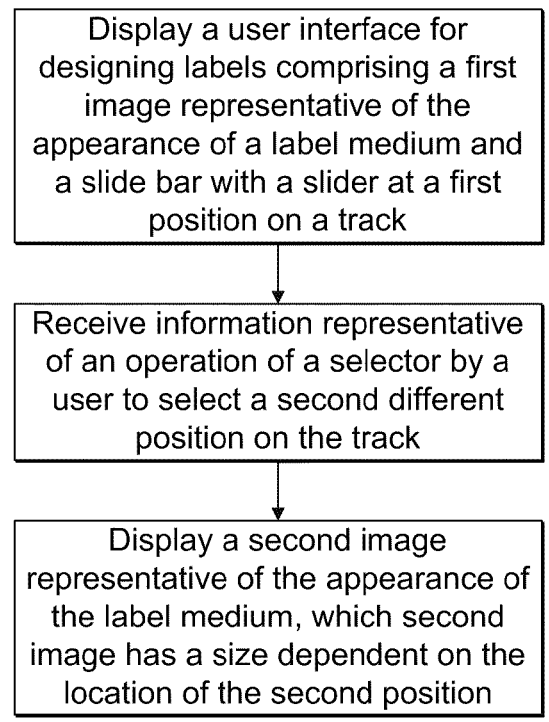
FIG. 41 shows a flow diagram illustrating the steps of a further method performed by a controller of a printing apparatus embodying the present invention.

By selecting a second position on the track 333 to the right of the slider 332 of the slide bar 331 in FIG. 6, the display 208 is caused to refresh and display an enlarged version of the image 323 in the area 320 of the display 208, as shown in FIG. 7. The slider 332 also moves to the selected second point on the track 333. As indicated by characters 334 adjacent the slide bar 331 in FIG. 7, the image 323 is shown on the display in FIG. 7 at "221%" zoom, i.e. 2.21 times larger than in FIG. 6. With reference to the controller 201 shown in FIG. 3, the controller is arranged to output to the driver 209 data for causing the driver 209 to drive the display 208 to show the enlarged version of the image 323 representative of the appearance of the label medium (in place of the original image of the label medium), in response to receiving from the user's input device (again, which could be a mouse, tracker ball, digital pen, touchscreen, or other selector 205) information representative of an operation of the selector 205 by the user to move the slider 332 to the second position on the track 333, wherein the second position is to the right of the initial first position of the slider 332 shown in FIG. 6. This process is also illustrated in the flow chart of FIG. 41.

Of course, the user could have selected a different point along the track 333 to the right of the slider 332 of the slide bar 331 in FIG. 6 to select a different degree of "zooming in", and thus a different degree of enlargement of the image 323. In this embodiment, selecting the right-most point of the linear track 333 of the slide bar 331 provides a maximum zoom of 400% (not shown). In other embodiments, the maximum available zoom may be larger or smaller than this figure.

In a similar manner, embodiments of the present disclosure also provide the user with the option of "zooming out" of the image 323 of the label medium being edited in the label design workspace 321, in order to help them see more, or all, of the label being edited or created.

Starting with the image 323 shown in the area 320 of the display 208 shown in FIG. 6, by selecting a third point on the track 333 to the left of the slider 332 of the slide bar 331 in FIG. 6, the display is caused to refresh and displays a smaller version of the image 323 in the area 320 of the display 208 (not shown). Again, the slider 332 also moves to the selected third point on the track 333. The characters 334 adjacent the slide bar 331 may then indicate that the image 323 is shown on the display at, say, "50%" zoom. The controller 201 is configured to output data to the driver 209 to cause the driver 209 to drive the display 208 to display the smaller version of the image 323 representative of the appearance of the label medium, in response to receiving from the user's input device information representative of the user operating the selector 205 to move the slider 332 from the initial first position on the track 333 shown in FIG. 6, to the third position of the slider 332. The third position is different from each of the first and second positions, and indeed in this embodiment the initial first position of the slider 332 on the linear track 333 is located between the second and third positions.

Of course, the user could have selected a different point along the track 333 to the left of the slider 332 of the slide bar 331 in FIG. 6 to select a different degree of "zooming out", and thus a different degree of reduction of the image 323. In this embodiment, selecting the left-most point of the linear track 333 of the slide bar 331 provides a minimum zoom of 25% (not shown). In other embodiments, the minimum available zoom may be larger or smaller than this figure.

In some embodiments the track 333 may not be linear, but may instead be curved or otherwise non-linear. The slider 332 is positionable at different positions between the left-most point of the track 333 and the right-most point of the track 333. In this embodiment, the distance between the position of the slider 332 and the left-most point on the track 333 is proportional to the degree of zoom applied to an image displayed with a degree of zoom represented by the slider 332 being at the left-most position. In other embodiments, this distance may not be proportional. Instead, the degree of zoom applied to an image which is displayed with a degree of zoom represented by the slider 332 being at the left-most position may increase exponentially as the slider 332 is moved rightwards along the track 333.

In an alternative embodiment, selecting the slider 332 with the user's input device (a mouse, tracker, digital pen, touchscreen, or any other selector 205) and moving the slider 332 to the left or to the right while keeping the slider selected, will respectively zoom out or zoom in to image 323 while the user sees image 323 decreasing or increasing. In other words, the information received at the controller 201 from the selector 205 is representative of an operation of the selector 205 by the user to perform a drag and drop operation by dragging from the initial position of the slider 332 on the track 333 to a different position on the track. In some embodiments, the information comprises data representative of a series of other positions between the initial position and the different position. The controller 201 then outputs, to the driver 209, data for causing the driver 209 to drive the display 208 to display successively a series of images representative of the appearance of the label medium, each of which images being associated with a respective one of said series of other positions. Each image of the series of images may therefore have a size (or zoom factor) dependent on the distance between the initial position and the respective one of the series of other positions with which the image of the series of images is associated. In any case, because the user can see image 323 successively decreasing or increasing in real time while he's moving the slider 332 to the left or the right, this allows the user to select the desired amount of zoom action very accurately.

Figure 8:
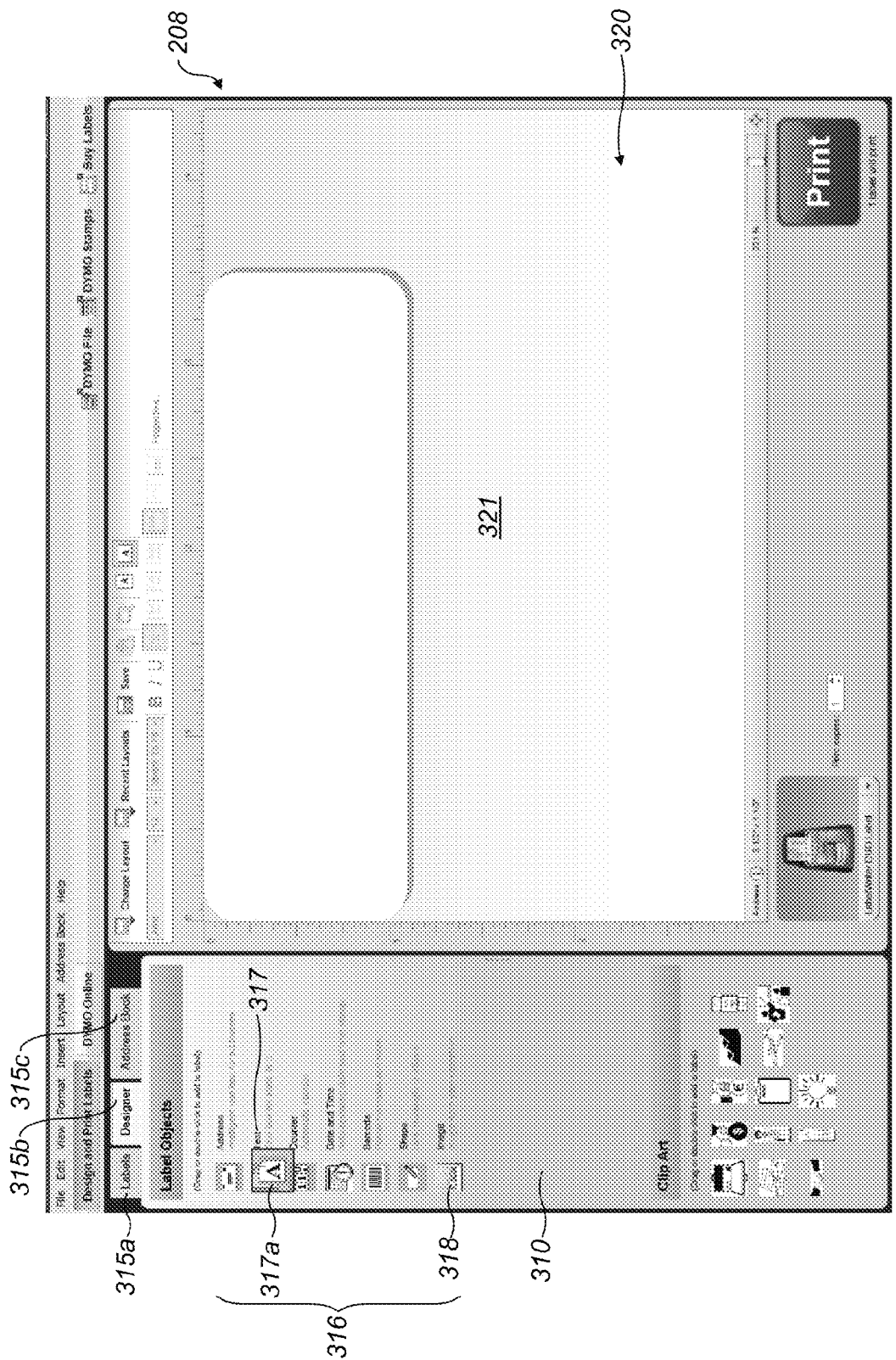
FIG. 8 is a representation of the contents of a further display shown on display of a printing apparatus embodying the present invention.

With the image 323 of the label displayed in the label design workspace 321 in the second area 320, as shown in FIG. 7, the user can add label data in data fields, prior to printing the label. Embodiments of the present disclosure provide the feature that the user can easily add such data fields to a desired location, using for example a "drag and drop" procedure. So, the user selects the "Designer" tab 315b at the top of the first area 310 using a selector 205, which causes the controller 201 to output data to the driver 209 to cause the display 208 to display plural images 316 representative of plural respective different types of data field in the first area 310, as shown in FIG. 8. Again, the first area 310 is different from the second area 320.

As shown in FIG. 8, the user can then operate the selector 205 to select a "text" data field. In this embodiment, this is achieved by locating a cursor controlled by the selector 205 at a first position within the bounds of the image 317 representative of the text data field occupying a first region of the first area 310, and activating an actuator of the selector 205 to maintain the selection of the image 317. So, if the selector 205 is a mouse the actuator could be a button, and the activating of the actuator could comprise the user clicking and holding the button while positioning the cursor controlled by the mouse at a first position within the image 317 to maintain selection of the image 317. Alternatively, if the user was using, say, a touchscreen display, the actuator would be a touch sensitive portion of the touchscreen display. The user would touch and maintain pressure on the part of the touch sensitive portion of the touchscreen display corresponding to a first position within the image 317 in the first region to maintain selection of the image 317. Activation of the actuator in this way causes a further image 317a representative of the text data field to be displayed at the position of the cursor while moving (not shown).

Figure 9:
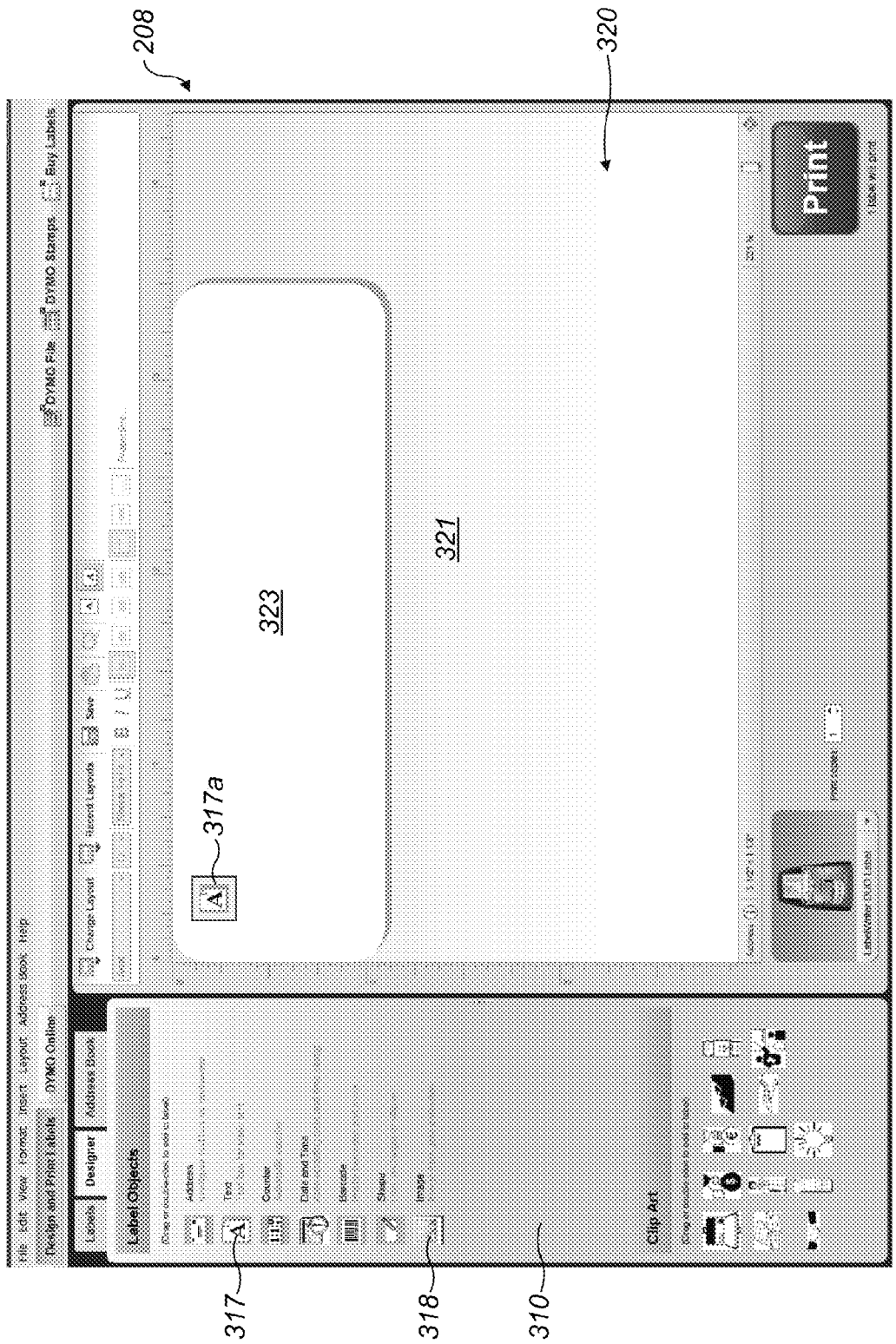
FIG. 9 is a representation of the contents of a further display shown on display of a printing apparatus embodying the present invention.
Figure 10:
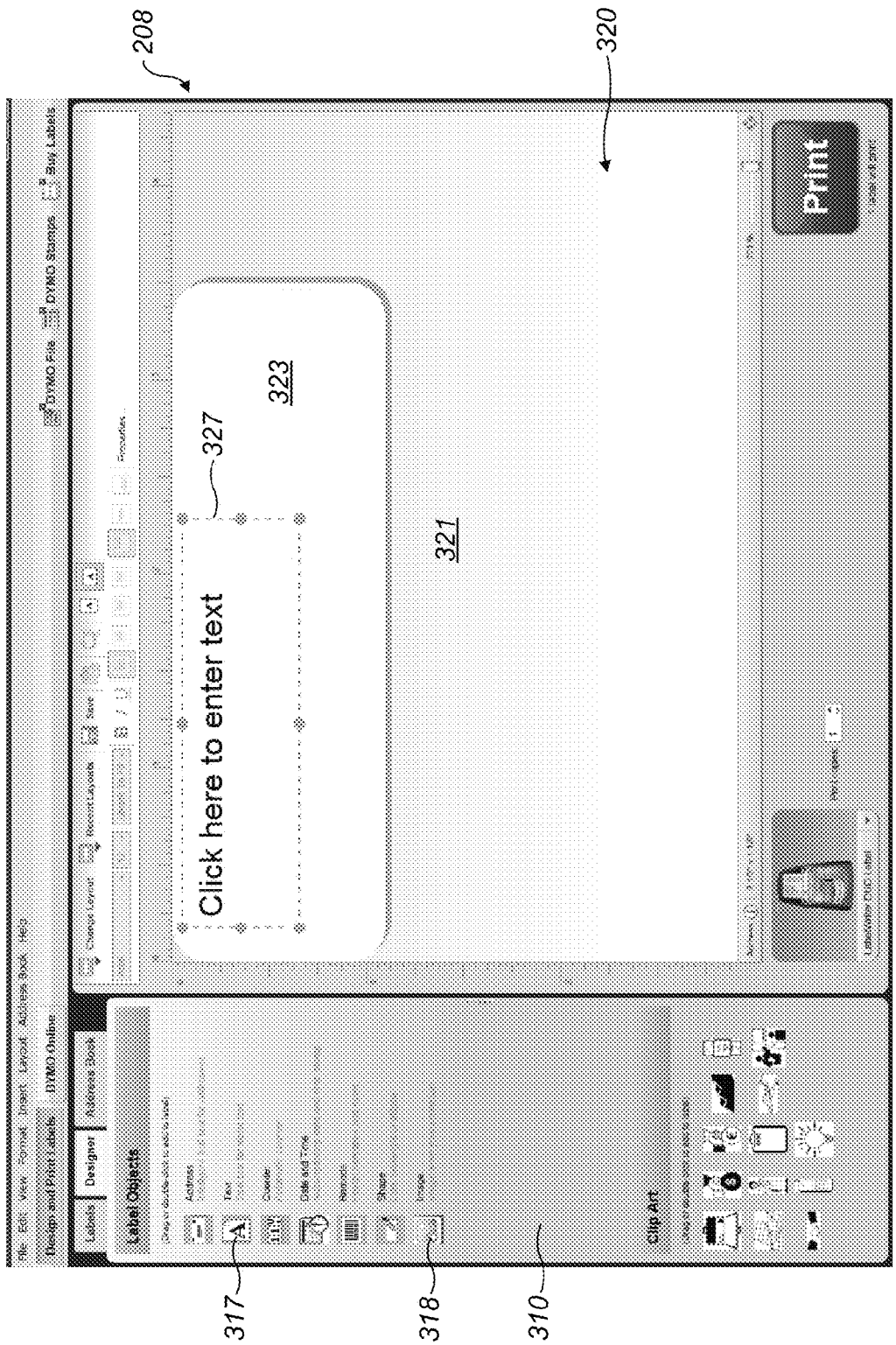
FIG. 10 is a representation of the contents of a further display shown on display of a printing apparatus embodying the present invention.

While maintaining activation of the actuator, the user operates the selector 205 to drag the cursor and further image 317a from the first area 310 into the label medium 323 occupying an area in the label design workspace 321 in the second area 320, as shown in FIG. 9. By deactivating the actuator of the selector 205 when the cursor and further image 317a are at a position overlying part of the image 323 representative of the appearance of the label medium, the image 323 representative of the appearance of the label medium is revised such as to include an empty text data field 327 at a position determined by the location of the cursor and further image 317a when the actuator is deactivated, as shown in FIG. 10. In other embodiments, the further image 317a is not displayed.

In terms of signalling between the selector 205 and the controller 201, information comprising data representative of the operation of the selector 205 by the user to select the image 317 (such as data representative of a first position in the first region in the first area 310) and data representative of a position within the bounds of the image 323 representative of the label medium is sent from the selector 205 to the controller 201. The controller 201 then outputs data to the driver 209 to cause the driver to drive the display 208 to display a text data field 327 at a location determined in dependence on the location of the position within the bounds of the image 323.

In some embodiments, the data field included in the revised image 323 occupies a region that includes the position within the bounds of the image 323. The data field may have an edge or a corner that occupies the position within the bounds of the image 323. In other embodiments, the data field added to the image 323 may occupy a space that does not include the position within the bounds of the image 323, but is nevertheless determined in dependence on the location of the position within the bounds of the image 323.

Data fields other than text data fields, such as barcode data fields, image data fields, counter data fields, shape data fields, date and/or time data fields, and address data fields, can also be added within the image 323 of the label in this way.

Thus, by this method the user can accurately position selected data fields within the image 323 of the label being created or edited.

In other embodiments the user does not operate the selector 205 to necessarily drag the cursor (and optionally the further image 317a) from the first area 310 into the label design workspace 321 in the second area 320. Instead, the user could operate the selector 205 to send to the controller 201 information comprising data representative of an operation of the selector 205 by the user to select the image 317 representative of the text data field (preferably by selecting a location within the bounds of the image 317) and data representative of the user operating the selector 205 to select a position within the bounds of the image 323 representative of the label medium, to cause the controller 201 to output data to the driver 209 to cause the driver 209 to drive the display 208 to display a data field 327 at a location determined in dependence on said position within the bounds of the image 323. This could be achieved, for example, by the user "clicking" on the image 317 and then clicking on the position within the image 323.

Figure 34:
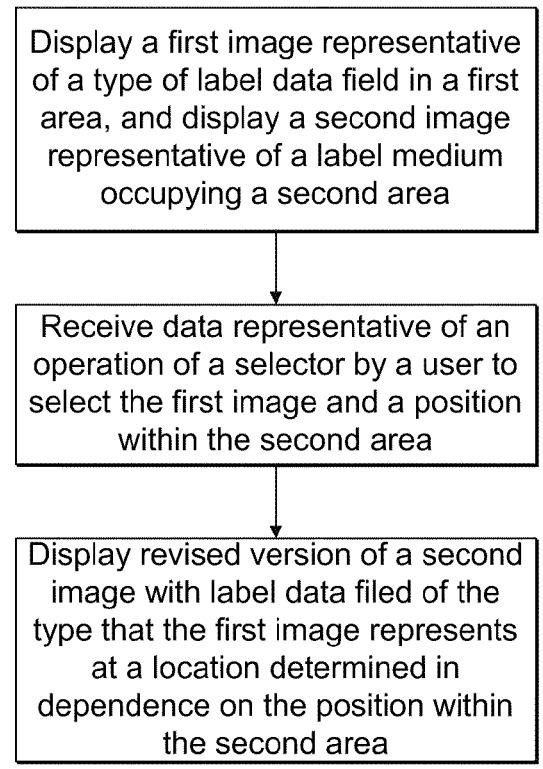
FIG. 34 shows a flow diagram illustrating the steps of a method performed by a controller of a printing apparatus embodying the present invention.

In any case, the controller ultimately causes the display to alter the image 323 representative of the appearance of the label medium by adding to it a label data field 327 of the type of label data field of which the first image 317 is representative. The label data field 327 added to the image 323 representative of the appearance of the label medium may occupy a second region of the display 208 that includes the position within the image 323. This process is further illustrated in the flow diagram of FIG. 34.

In other embodiments the user operates the selector 205 to send to the controller 201 information comprising data representative of an operation of the selector 205 by the user to select twice in quick succession (i.e. "double click") the first image 317, to cause the controller 201 to output data to the driver 209 to cause the driver to drive the display 208 to display a revised version of the image 323 that includes the data field 327 occupying a second region of the display 208. Again, the controller ultimately causes the display 208 to alter the image 323 representative of the appearance of the label medium by adding to it a label data field 327 of the type of label data field of which the first image 317 is representative.

Figure 11:
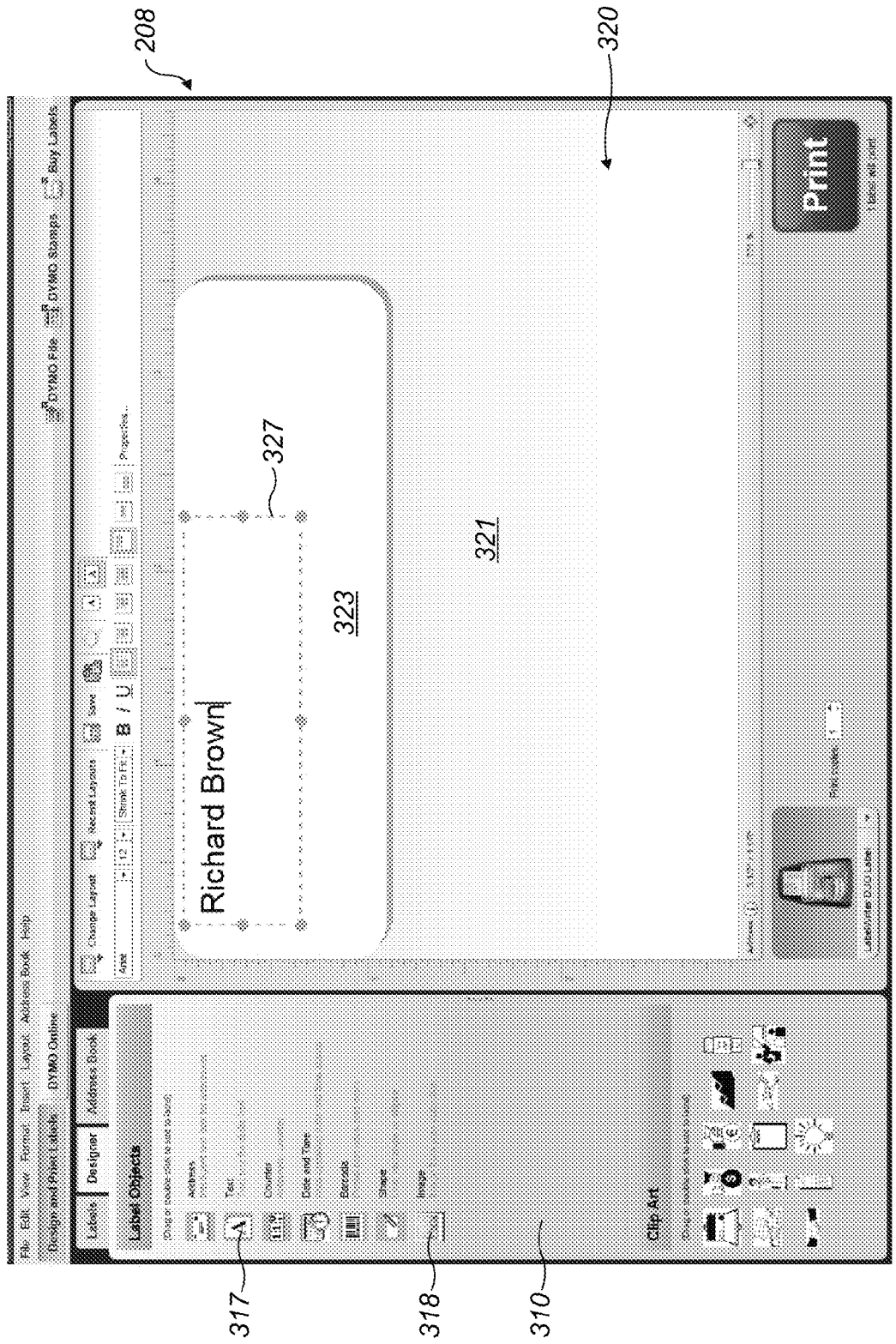
FIG. 11 is a representation of the contents of a further display shown on display of a printing apparatus embodying the present invention.

The data field 327 shown in FIG. 10 includes a prompt to the user to enter text in the data field. By using the actuator of the selector 205, the user can click/select the data field, and populate the data field with text spelling "Richard Brown" by operating, say, a keyboard or other data input apparatus 206, as shown in FIG. 11.

Figure 12:
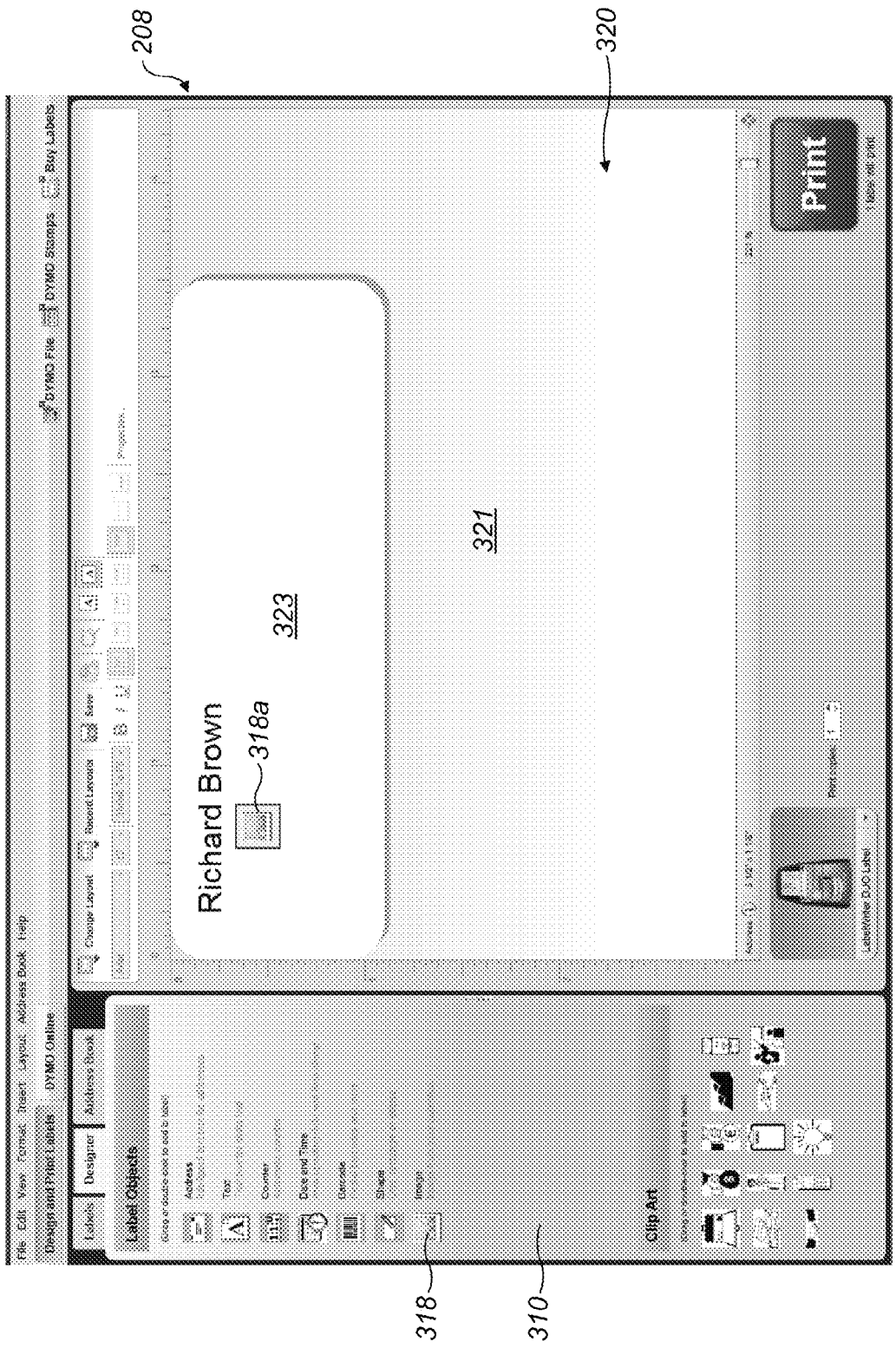
FIG. 12 is a representation of the contents of a further display shown on display of a printing apparatus embodying the present invention.
Figure 13:
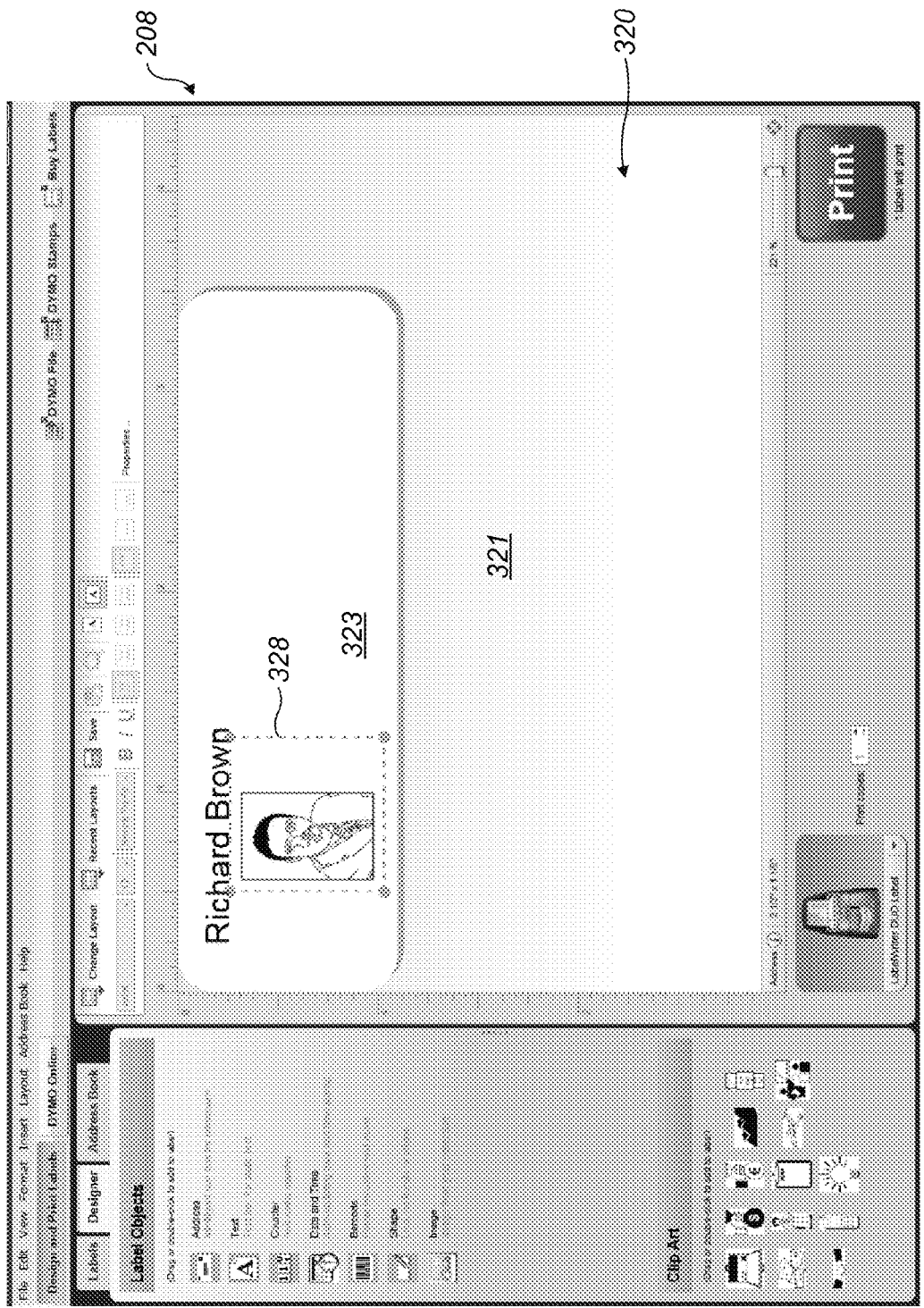
FIG. 13 is a representation of the contents of a further display shown on display of a printing apparatus embodying the present invention.

In an embodiment the user can add an image to the image 323 of the label to be printed, by selecting the image 318 representative of an "image" data field in the first area 310, and operating the selector to drag the cursor and a further image 318a from the first area 310 into the label design workspace 321 in the second area 320, as shown in FIG. 12. By deactivating the actuator of the selector when the cursor and further image 318a are overlying part of the image 323 representative of the appearance of the label, an empty image data field (not shown) is displayed in the label image 323 at the position of the cursor and further image 318a. The user can then use a browsing facility of the apparatus to cause a picture image 328 from memory to be added to the image 323 representative of the label to be printed, as shown in FIG. 13. Again, as described above, in other embodiments the user does not operate the selector 205 to necessarily drag the cursor and further image 318a from the first area 310 into the label design workspace 321 in the second area 320. In some embodiments the further image 318a is not displayed.

The user could operate the selector 205 to send to the controller 201 information comprising data representative of an operation of the selector 205 by the user to select twice in quick succession (i.e. "double click") the image 318 representative of the "image" data field in the first area 310, to cause the display 208 to display the picture image 328. Again, the controller would ultimately cause the display 208 to alter the image 323 representative of the appearance of the label medium by adding to it a label data field of the type of which the image 318 is representative.

Figure 14:
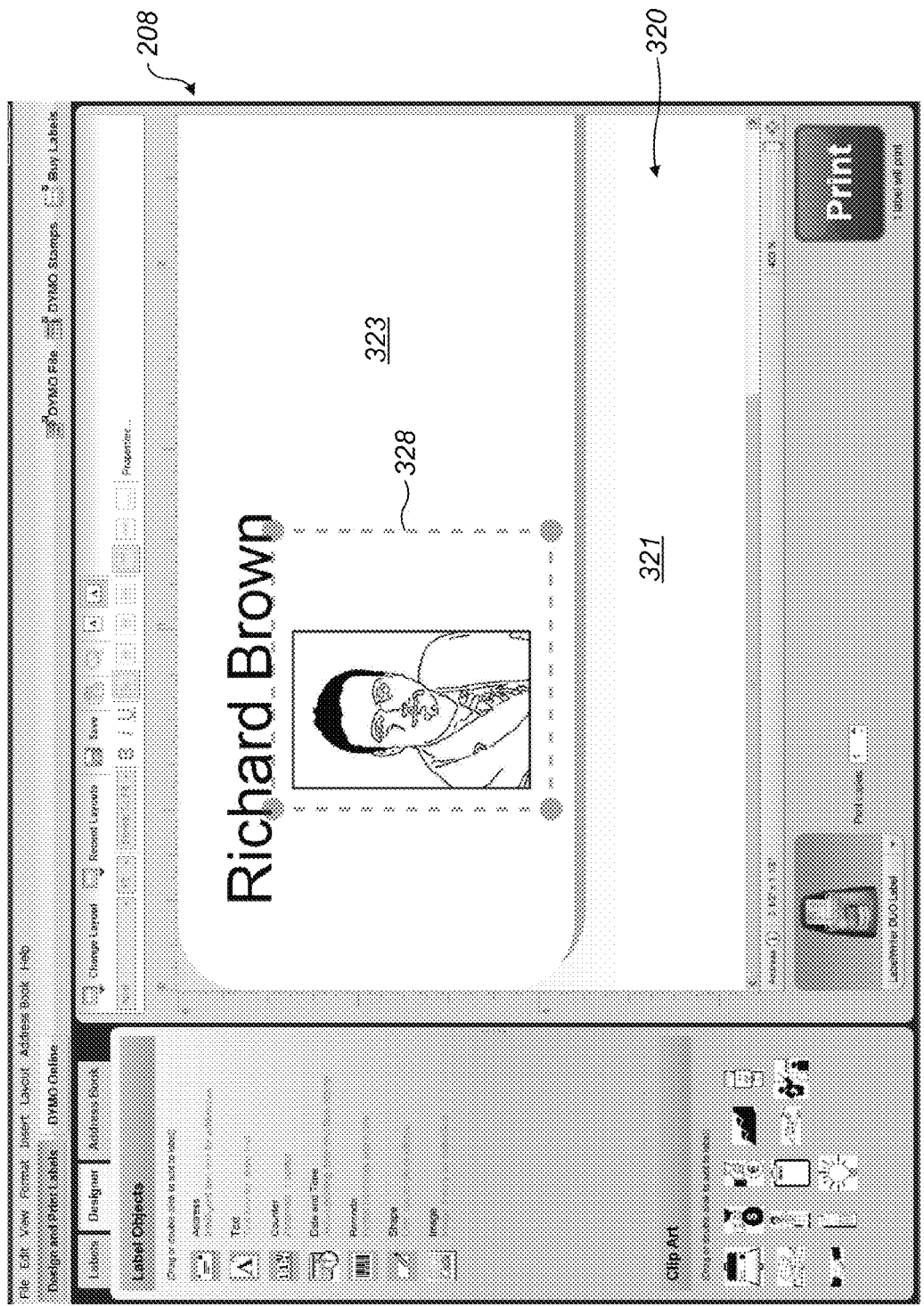
FIG. 14 is a representation of the contents of a further display shown on display of a printing apparatus embodying the present invention.
Figure 15:
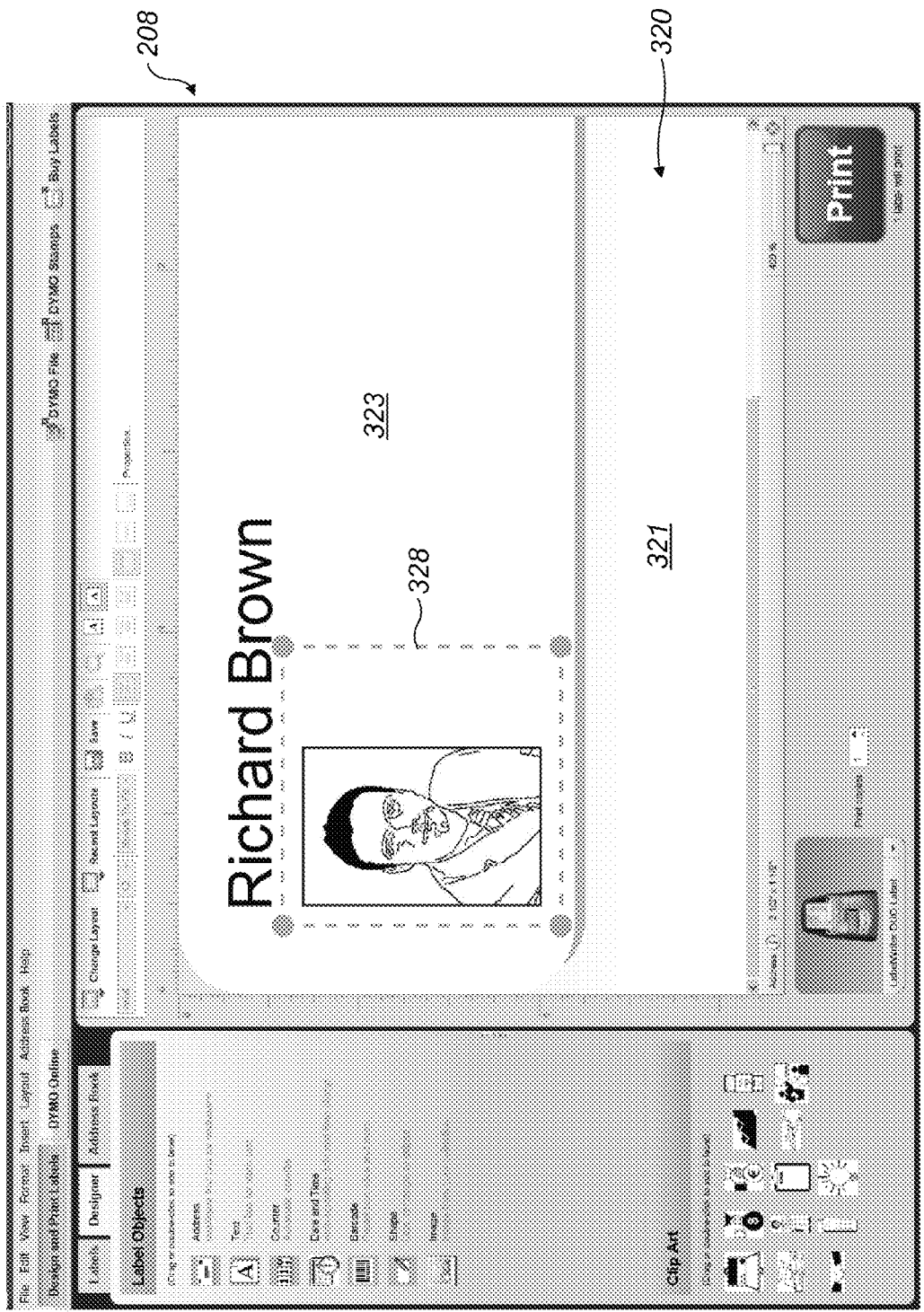
FIG. 15 is a representation of the contents of a further display shown on display of a printing apparatus embodying the present invention.

The user can more accurately position the picture image 328 relative to the previously-added text, or indeed the outline of the image 323 of the label, by zooming in to the label (as described above) to be presented with the display in FIG. 14. In FIG. 14 it can be noted that maximum zoom (of 400%) has been instructed. By activating the actuator of the selector 205 while the cursor (not shown) is located within the bounds of the picture image 328, the user can drag the picture image 328 to another position relative to the rest of the image 323 representative of the label, as shown in FIG. 15.

Figure 16:
FIG. 16 is a representation of the contents of a further display shown on display of a printing apparatus embodying the present invention.

The user may then add and/or delete further label data fields to the image 323 representative of the label to be printed until they are happy that the label is ready to print, as shown in FIG. 16. In FIG. 16 it can be seen that a "shape" data field populated with a vertical line, and an "address" data field populated with an address, have been added to the image 323 representative of the appearance of the label medium.

The printing apparatus can be instructed to print the label by the user operating their selector 205 and/or actuator to click on the print button 335 at the bottom-right of the display 208. The controller 201 then causes print data, representative of the label data for inclusion in the label to be printed, to be sent to the print head 218, 18 of the printing apparatus, and printing elements of the print head 218, 18 are selectively heated to create the desired label.

In some embodiments the printing apparatus includes a cutter or cutting means which can be operated to cut the printed label from a supply of blank labels. In some embodiments the cutter is operated automatically by the printing apparatus without intervention of the user. In other embodiments the user can operate a button or lever or similar to cut the printed label from the supply. In still further embodiments, the printed label may be created using an individual blank label, and so the printed label is not attached to any further supply of blank labels. In those embodiments no cutter or cutting means may be provided.

Figure 17:
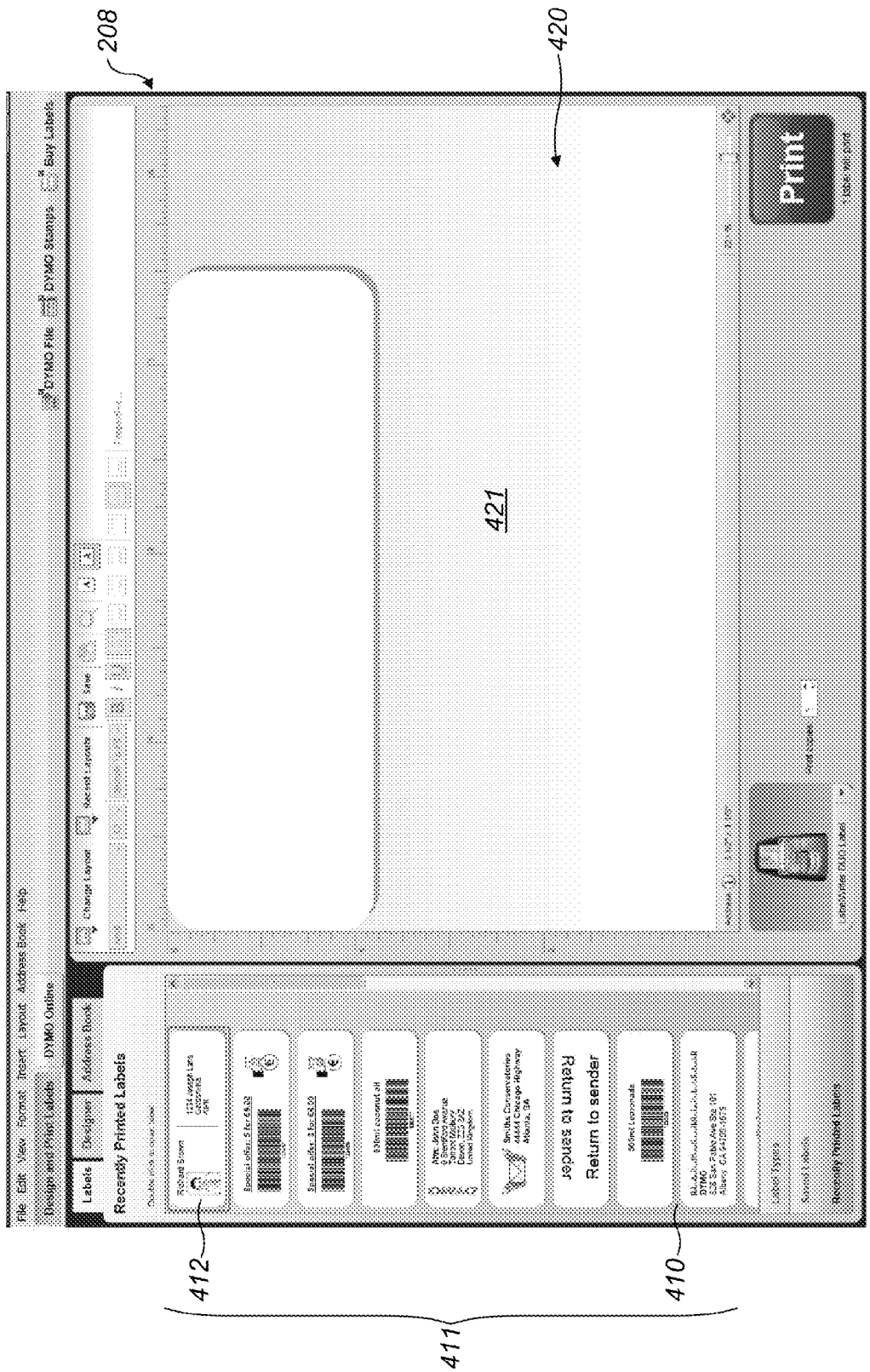
FIG. 17 is a representation of the contents of a further display shown on display of a printing apparatus embodying the present invention.

Once the label has been printed, the user can design other label(s). If they later want to print again the label created and printed during the process illustrated in part with reference to FIG. 4 to 16, they can select, using the selector 205, the "Labels" tab 315a shown at the top of the first area 310 in FIG. 6, and then select the "Recently Printed Labels" tab 319c at the bottom of the first area 310. This causes the controller 201 of the printing apparatus to send data to the driver 209 to cause the driver 209 to drive the display 208 to display, in the first area 410, images 411 representative of the appearance of labels that have been previously created or edited using the apparatus and printed using the print head of the apparatus, as shown in FIG. 17. A label design workspace 421 is shown in a second area 420 of the display. In the embodiment, the images 411 are presented in an order in dependence on the time since each of the labels was printed, so the topmost one of the images 411 is a first image 412 which is representative of the appearance of the label that has been most recently printed. In other embodiments the images 411 may be presented in a different order in the first area 410, such as time since each of the labels was edited.

Figure 18:
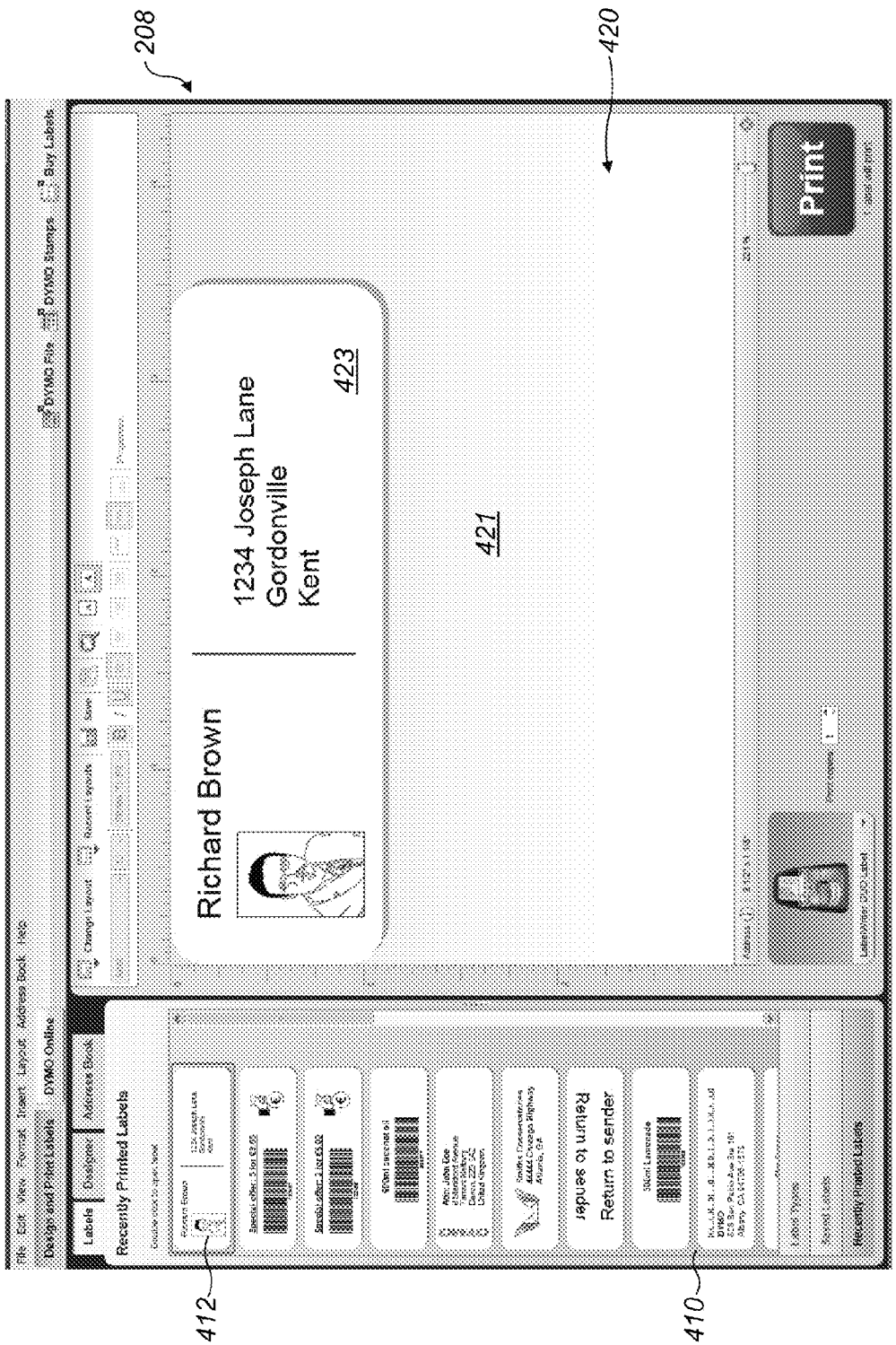
FIG. 18 is a representation of the contents of a further display shown on display of a printing apparatus embodying the present invention.
Figure 35:
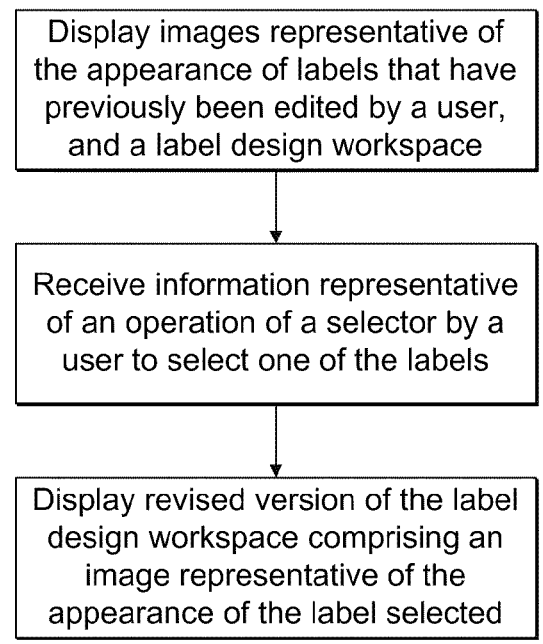
FIG. 35 shows a flow diagram illustrating the steps of a further method performed by a controller of a printing apparatus embodying the present invention.

The controller 201, in response to receiving from the selector 205 information representative of an operation of the selector 205 by the user to select the label represented by the first image 412, causes the display 208 to display a second image 423 representative of the appearance of the label selected in a revised version of the label design workspace 421 in the second area 420, as shown in FIG. 18. The information may be, for example, representative of a single click or a double click of a button (actuator) of a mouse, when the selector 205 is a mouse and the mouse has been used to locate a cursor on the screen at a position corresponding to the first image 412 of the label to be selected. This process is further illustrated in the flow diagram of FIG. 35.

Thus, by this method the user can easily create a label with the same appearance and layout of label data as one previously printed, to maintain consistency of printed labels.

A user may want to save a label for future use, without first printing it. For example, the user may create the image 523 of a label shown in the second area 520 in FIG. 19. The user can then save data defining the image 523 representative of the appearance of the label to a position in memory, such as a position in the read only memory shown in FIG. 3. To do this, the user clicks on the "Save" icon 524 displayed on the display above the second area 520 in FIG. 19, in a manner that is well known in the art. In alternative embodiments, the data defining the image 523 can be saved in other memory in the printing apparatus, or in memory external to the printing apparatus, such as a smart card, chip card, memory card or the like. The user can then create and work on an alternative label, such as that shown in FIG. 20.

Figure 19:
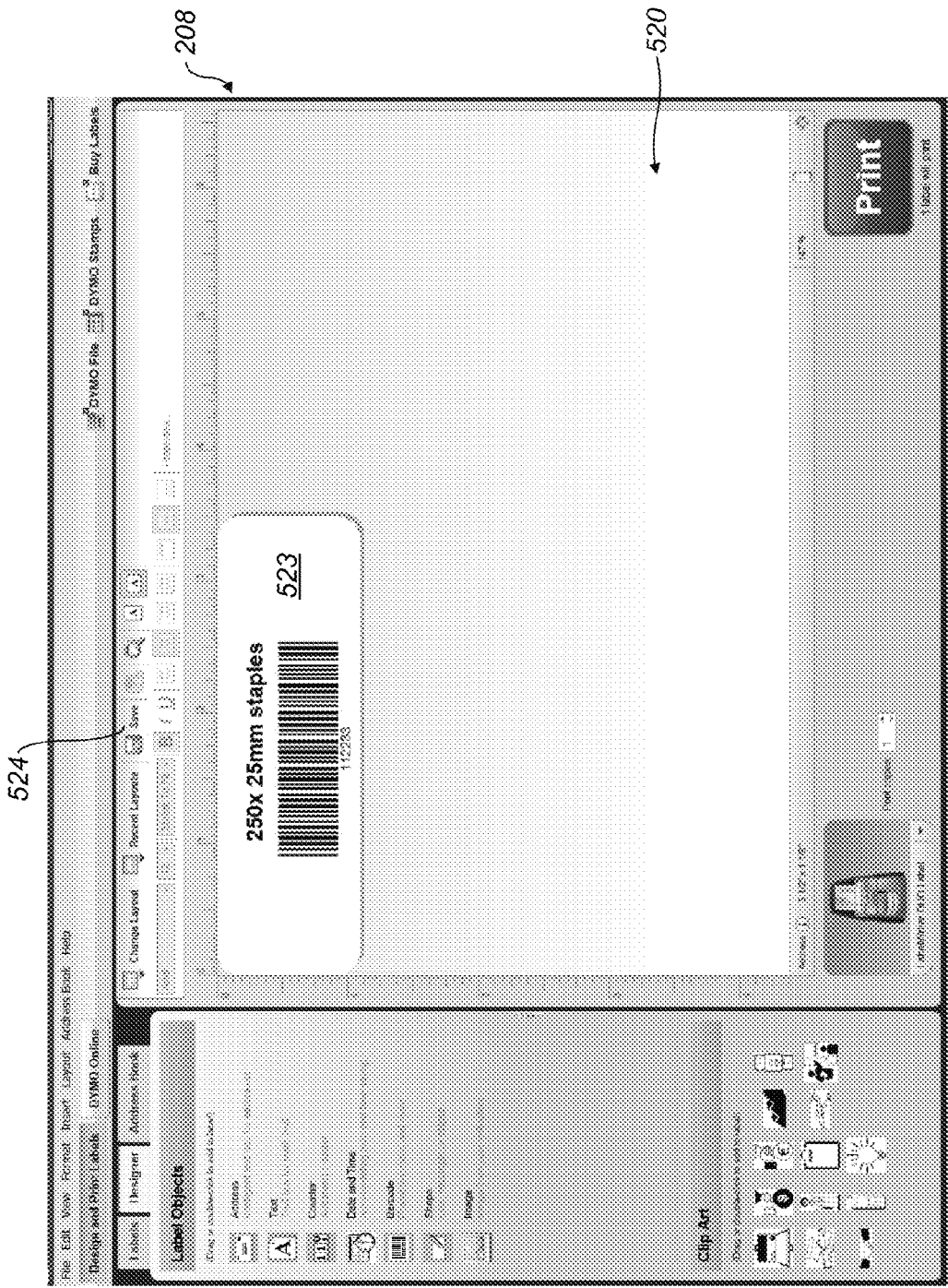
FIG. 19 is a representation of the contents of a further display shown on display of a printing apparatus embodying the present invention.
Figure 20:
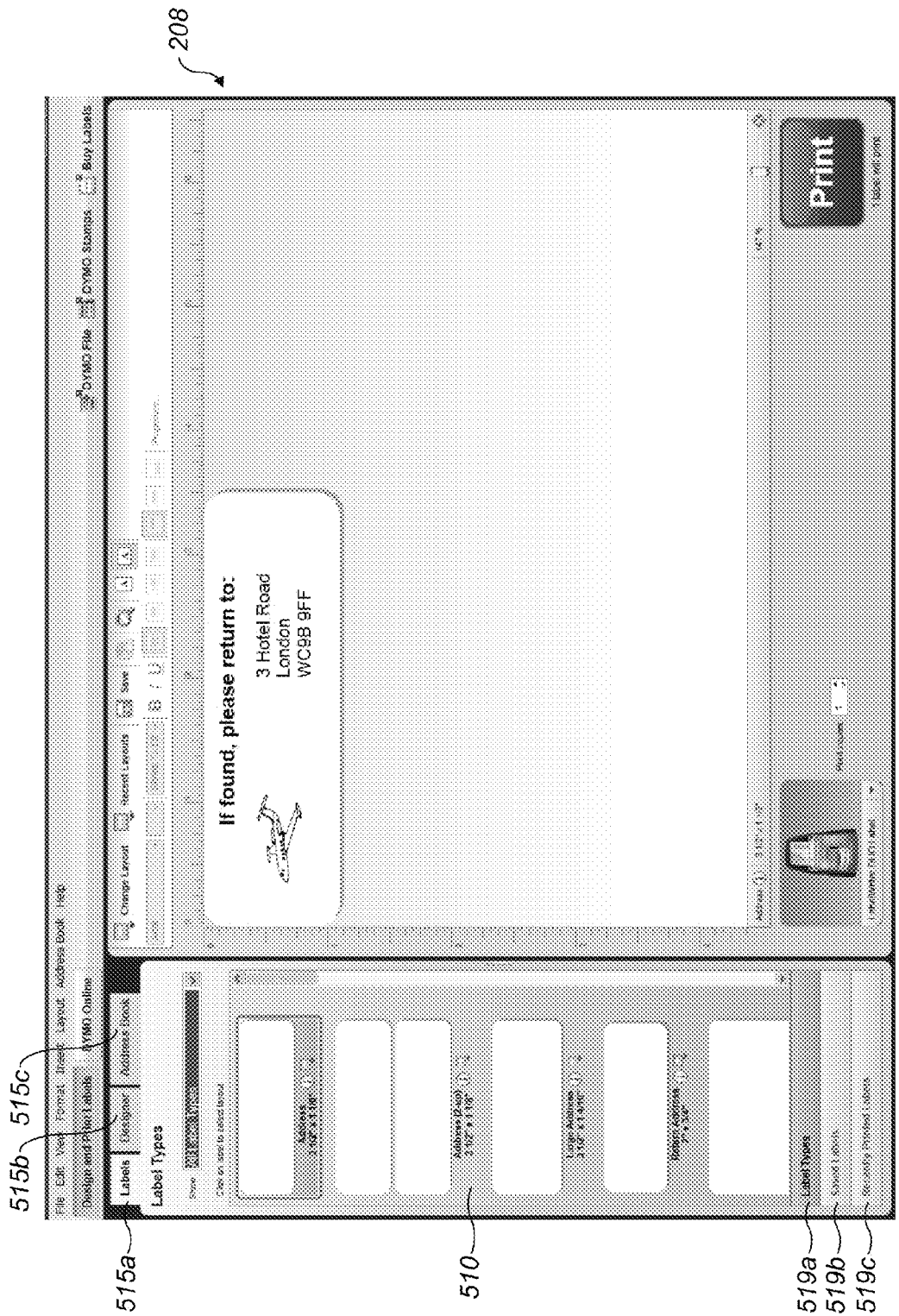
FIG. 20 is a representation of the contents of a further display shown on display of a printing apparatus embodying the present invention.
Figure 21:
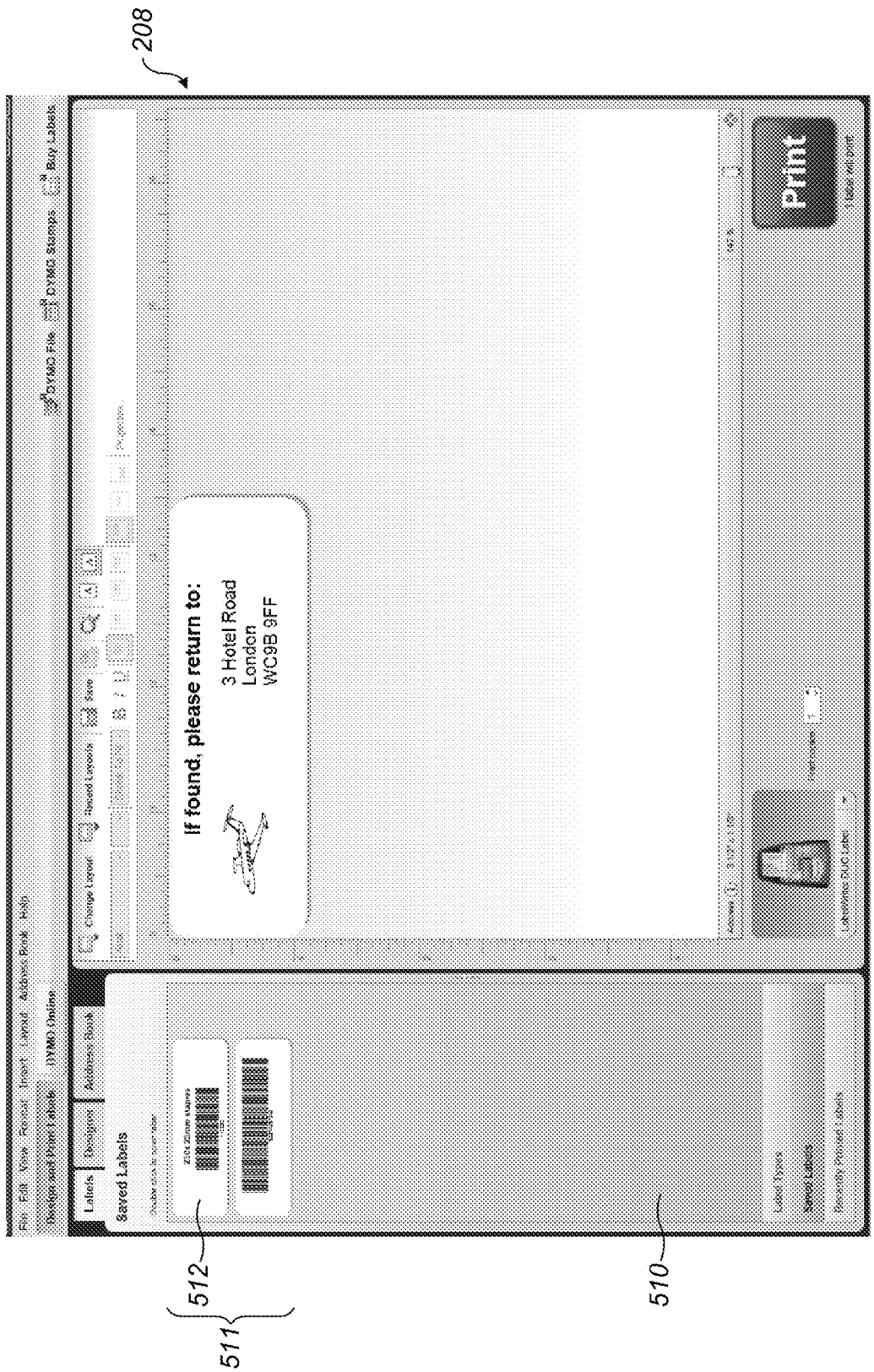
FIG. 21 is a representation of the contents of a further display shown on display of a printing apparatus embodying the present invention.

If the user later wants to view and/or edit and/or print the label shown in FIG. 19, which is now stored in the memory, they can select, using the selector 205, the "Labels" tab 515a shown at the top of the first area 510 in FIG. 20, and then select the "Saved Labels" tab 519b at the bottom of the first area 510. This causes the controller 201 of the printing apparatus to output data to the display driver 209 to cause the display driver 209 to drive the display 208 to display in the first area 510 images 511 representative of the appearance of labels that have been saved as a file in memory, or otherwise stored in memory, as shown in FIG. 21. In the embodiment, the top image of the images 511 is a first image 512 which is representative of the appearance of the label created and saved during the procedure discussed above with reference to FIG. 19. In other embodiments the images 511 may be presented in a different order in the first area 510, or the image 512 may be the only image displayed in the first area 510. The plurality of images 511 may be displayed in an order determined in dependence on the time since each of the respective labels was saved or edited.

Figure 22:
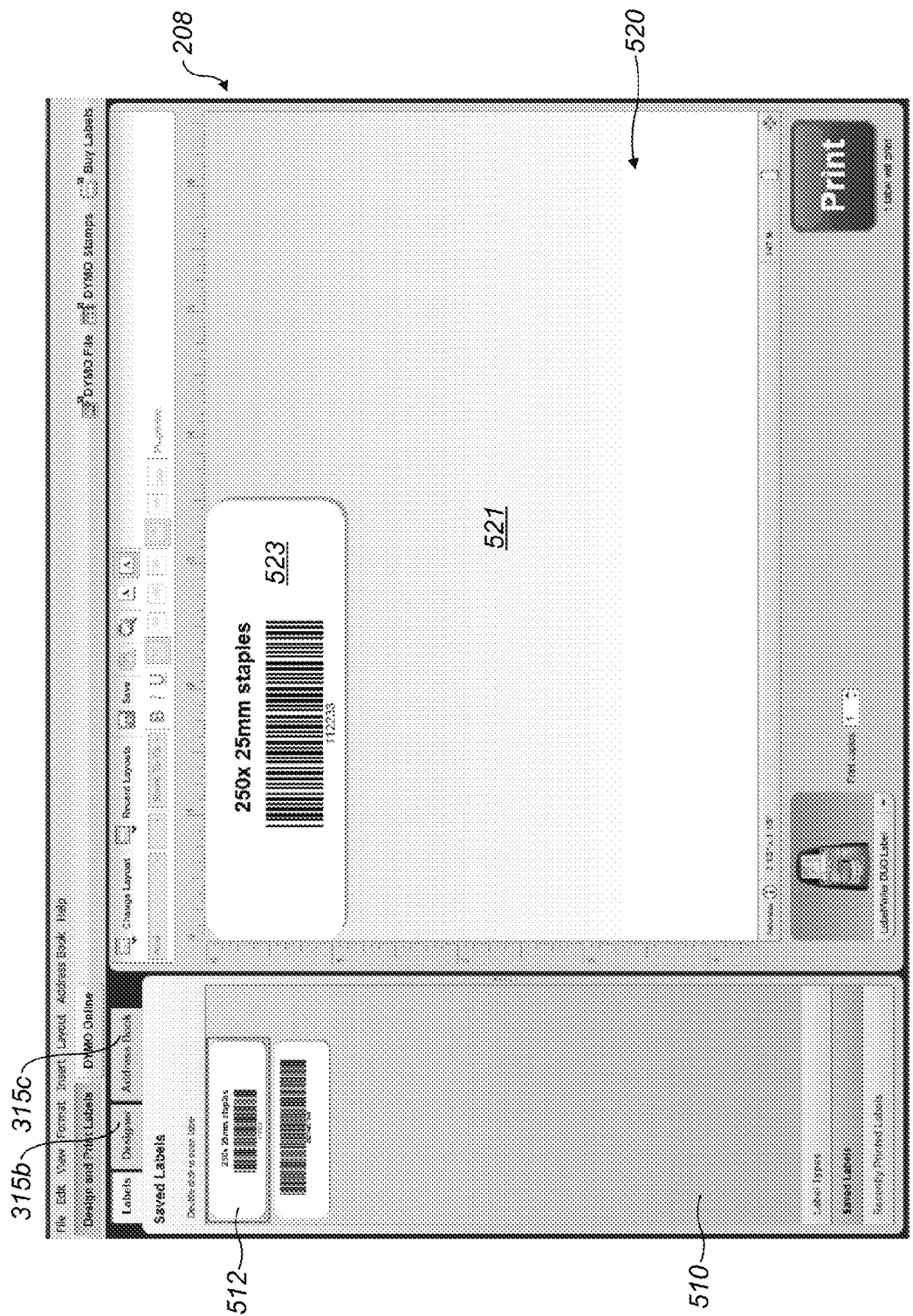
FIG. 22 is a representation of the contents of a further display shown on display of a printing apparatus embodying the present invention.

The controller 201, in response to receiving from the selector 205 information representative of an operation of the selector 205 by the user to select the label whose appearance is represented by the first image 512, causes the display 208 to display a second image 523, representative of the appearance of the label selected, in a revised version of the label design workspace 521 in the second area 520, as shown in FIG. 22. The information may be, for example, representative of a single click or a double click of a button (actuator) of a mouse, when the selector 205 is a mouse and the mouse is used to locate a cursor on the screen at a position corresponding to the first image 512 of the label to be selected. Again, this process is further illustrated in FIG. 35.

Thus, by this method the user can interrupt the creation or editing of a particular label, save the label, and come back to it at a later date without losing the work and effort already invested by the user in the design of the label.

By providing the saved labels in a single step operation in the first area 310 of the display 208, the user doesn't have to access a folder structure to find a saved label. He can simply select the saved labels button 519b and be presented with the saved labels in the first area 310.

When a user decides that they wish to order some label stock in order to print a desired label, embodiments of the present disclosure provide a feature that helps to ensure the user orders the correct label stock. For example, the user may decide they need to order some 3½"×1⅛" address labels. With reference to FIG. 6, below the image 312 representative of the appearance of an address label of the dimensions 3½"×1⅛" in the first area 310 of the display 208 of the user interface of the software application for designing labels is located an icon (a letter "i" in a circle) associated with the address label of the dimensions 3½"×1⅛". Indeed, below respective plural images corresponding to respective plural label types shown in the first area 310 are provided plural such icons. In other embodiments, an icon associated with only one of the labels may be displayed.

These icons are examples of images identifying selectable parts of the user interface. In other embodiments the selectable parts may comprise different images or alternatively or additionally text or a symbol.

Figure 23:
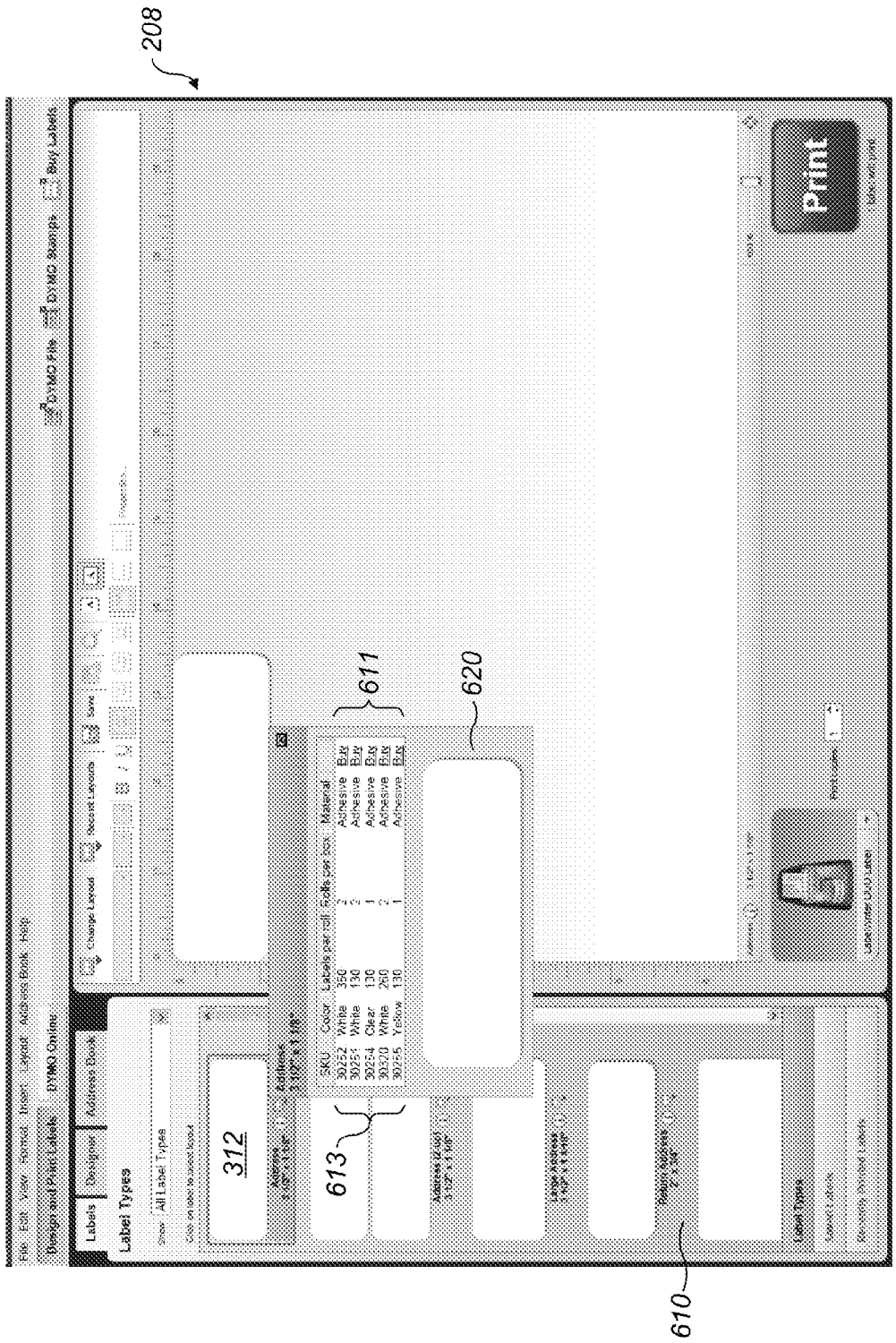
FIG. 23 is a representation of the contents of a further display shown on display of a printing apparatus embodying the present invention.
Figure 37:
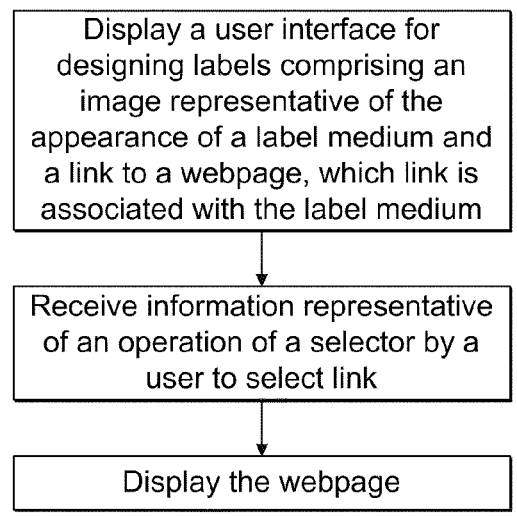
FIG. 37 shows a flow diagram illustrating the steps of a further method performed by a controller of a printing apparatus embodying the present invention.

The user can operate the selector 205 in a similar manner to that discussed above to click on the icon below the image 312. This causes information to be sent to the controller 201, which causes the controller 201 to output data to the display driver 209 to cause the display driver 209 to drive the display 208 to display an information page comprising links to associated webpages, wherein each of the links is associated with the label represented by the image 312, as illustrated in FIG. 23. In alternative embodiments, it is not necessary for the user to select an icon to display the links on the display 208. In such embodiments, the links may be displayed adjacent the image 312. In any case, this process is further illustrated in FIG. 37. In other embodiments, such links may not be displayed for each of the images in the first area 510, but only for one or at least one of the images.

In the illustrated embodiment, the links comprise a series of hyperlinks 611. Each hyperlink is associated with a different stock keeping unit (SKU) 613, but each of the hyperlinks is associated with address labels of the dimensions 3½"×1⅛", i.e. the type of label represented by the image 312. In this embodiment, each of the SKUs 613 represents a different quantity and/or colour and/or material of the label represented by the image 312. In alternative embodiments, there may be provided only one hyperlink per label represented by an image.

As can be seen in FIG. 23, the links are displayed in a second area 620 of the display, which second area 620 partially overlaps the first area 610 of the display 208. In alternative embodiments the first and second areas do not overlap and may be adjacent each other. In further embodiments, the second area 620 is within the first area 610. In that case, the links may be displayed within the image 312 representative of the appearance of the label medium.

When the user uses the selector 205 to select one of the hyperlinks 611 in the illustrated embodiment, the controller 201 receives from the selector 205 information representative of an operation of the selector 205 by the user to select the hyperlink. In response to this, the controller 201 outputs data to the driver 209 to cause the driver 209 to drive the display 208 to display a page (not shown) via which a user is able to order, from a trusted supplier, the label represented by the image 312 with which the hyperlink is associated. In this embodiment the page is a webpage on the internet which is displayed in the user interface of the label design software application. In alternative embodiments, the page may be a webpage accessible via a web browser that is not integrated with the user interface in this way, or a page on an intranet controlled e.g. by the user's employing company, via which page the user is able to order stocks of the labels from a stationery department within the company. Each of the hyperlinks may link to a different respective page or to a different respective location in a common webpage to which each of the hyperlinks links.

In some embodiments, the controller 201 is also configured to pass country and/or language information to server hosting the page requested. The server hosting the page can then use that information to ensure suitable data is sent to the controller 201 such that the user is presented with a page in a language the user would understand.

Thus, by this method the user can reorder a supply of labels, safe in the knowledge that the supplier is trusted. The apparatus also helps the user select the correct type of label by associating the links for a label with that label, and not requiring any transcription to be carried out.

In creating the label shown in FIG. 16, the user may decide that they wish to apply a different layout (or template) to the arrangement of the label data included in the image 323 representative of the appearance of the label being created. To do this, the user can use the selector 205 to select the button 324 labelled "Change Layout". The controller 201 then outputs data to the driver 209 to cause the driver 209 to control the display 208 to show the display illustrated in FIG. 24.

Figure 24:
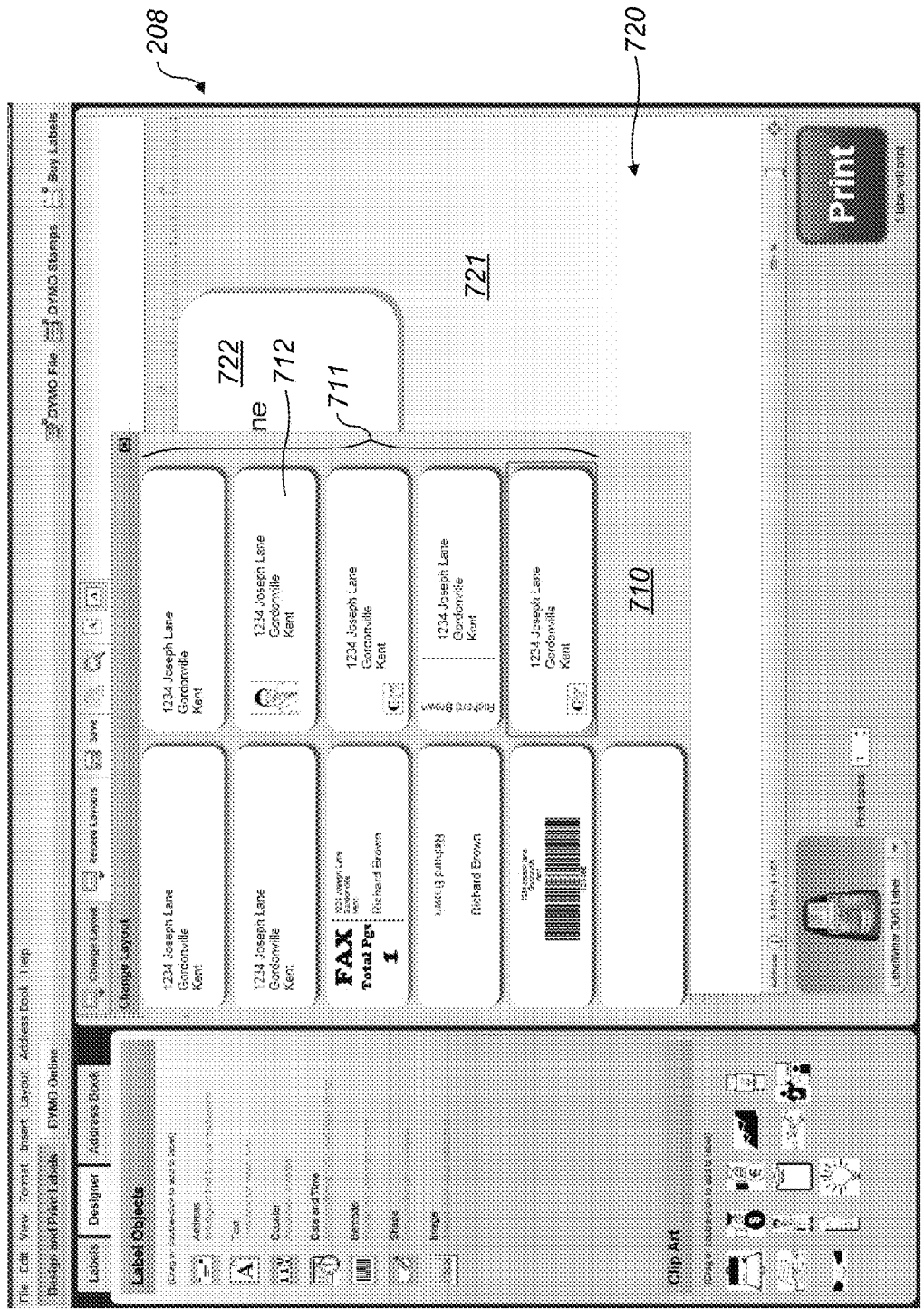
FIG. 24 is a representation of the contents of a further display shown on display of a printing apparatus embodying the present invention.

In FIG. 24, the display 208 displays in a first area 710 plural images 711 representative of the appearance of labels, including a first image 712 representative of the appearance of a label comprising first label data arranged according to a first template. The display 208 also displays, in a second area 720, the label design workspace 721 containing what will be termed a second image 722 representative of the appearance of a label comprising second label data. The label data fields or data objects in the second image are arranged differently to the label data fields or data objects in the first image. (In some embodiments the second label data is arranged according to a second predefined template, which is different from the first template). The first label data comprises at least some of the label data comprised in the second label data. The first label data in some embodiments comprises the same label data as the second label data, and in other embodiments the first label data comprises label data in addition to the second label data.

In this embodiment, most of the images 711 show data arranged according to different templates. In other embodiments, all of the images 711 may show data arranged according to different templates. The different templates each include one or more different types of label data field, such as address, text, counter, date and time, barcode, shape, and image data fields. The second label data in the second image 722 in this embodiment is also arranged in one or more types of label data field.

In this embodiment, the arrangement and content of data in label data fields included in the different templates in the images 711 of the first area is identical to the arrangement of data in a corresponding label data field of the same type in the second image 722. So, in this example, at least some of the first label data is arranged in a first type (in this case an "image" type) of label data field, and at least some of the second label data is arranged in the same way in the same first type of label data field.

However, some of the images 711 also show data provided in one or more data fields that are of a different type from the data fields comprised in the second image 722. In some embodiments, at least some of the first label data may be arranged in a first type of label data field, and none of the second label data is arranged in that first type of label data field.

Some of the images 711 also show a smaller number of data fields than the number of data fields comprised in the second image 722, and thus some of the images 711 do not include all the label data included in the second image 722. In this example, at least some of the second label data is arranged in a second type of label data field (in this case a "shape" type label data field), and none of the first label data is arranged in this second type of label data field.

Figure 25:
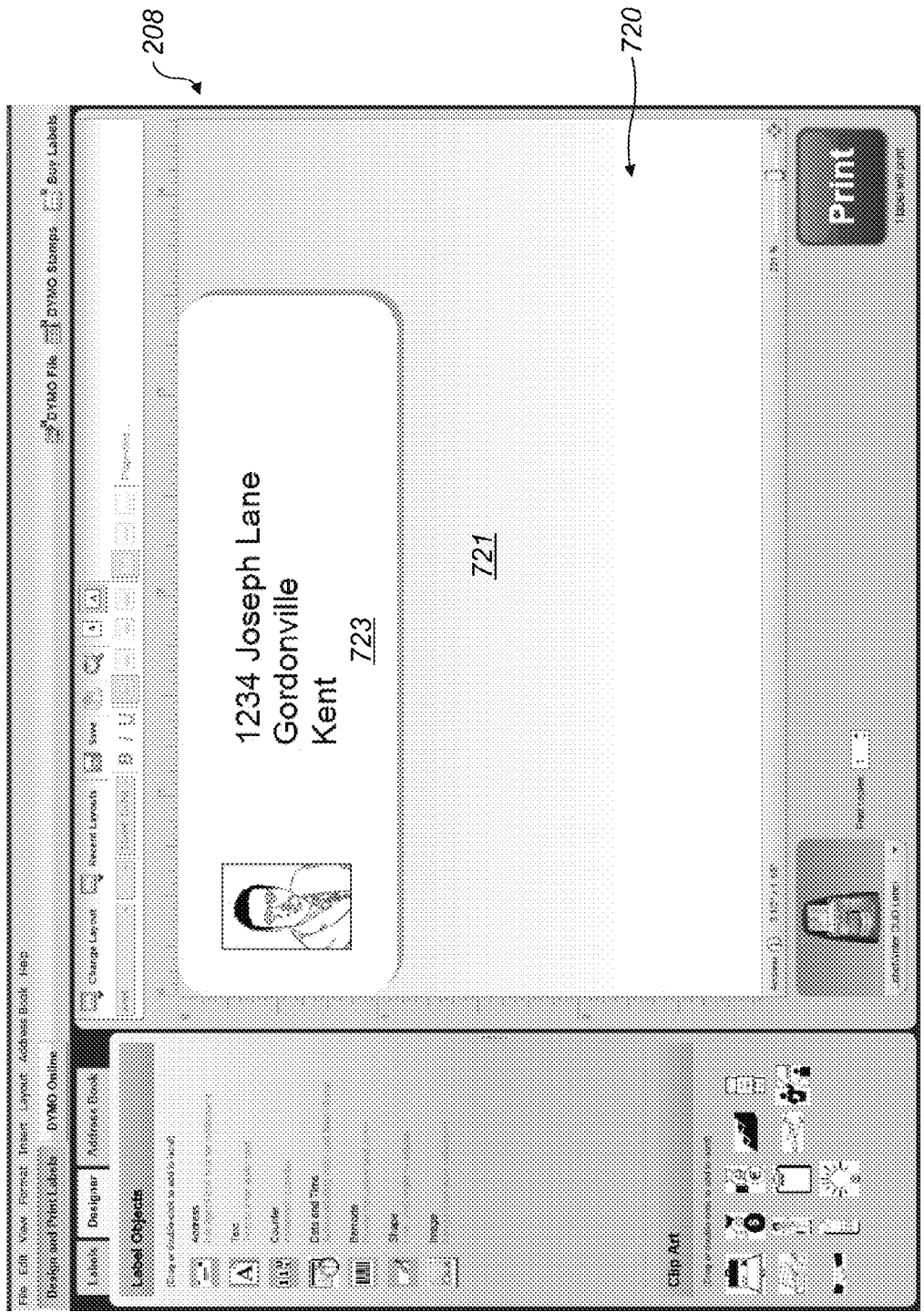
FIG. 25 is a representation of the contents of a further display shown on display of a printing apparatus embodying the present invention.
Figure 36:
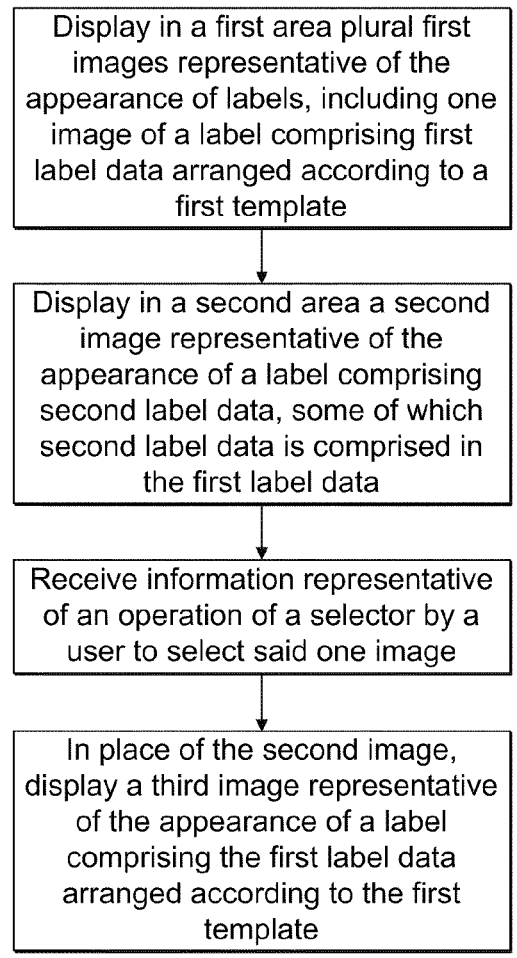
FIG. 36 shows a flow diagram illustrating the steps of a further method performed by a controller of a printing apparatus embodying the present invention.

The user can decide to apply the first template to label data comprised in the label represented by the second image 722, in order to arrange the label data of the label being created in a different manner relative to the image representative of the appearance of the label medium itself. Thus, the user uses the selector 205 to select the first image 712. This causes the selector 205 to send to the controller 201 information representative of an operation of the selector 205 by the user to select the first image 712 representative of the appearance of the label, which causes the controller 201 to output data to the driver 209 to cause the driver to drive the display 208 to display in the label design workspace 721a third image 723 representative of the appearance of the label selected, as shown in FIG. 25. The third image 723 representative of the label selected replaces the second image 722 representative of a label previously displayed in the label design workspace 721, and comprises the first label data arranged according to the first template. This process is further illustrated in FIG. 36.

It is to be noted that the third image 723 includes only the address data field and the image data field that were included in the second image 722. In other embodiments, applying a new template to an image representative of the appearance of a label may maintain all the existing data fields/objects and/or introduce new data fields/objects to the image and/or replace existing data fields/objects. In any case, at least one of the first label data and the second label data may comprise at least one of a text data field, an address data field, a barcode data field, a shape data field, and an image data field.

By the first image 712 in first area 710 the user is provided with an indication, before changing the layout, as to which label data fields will be the same, which will be removed and which will be added. This allows the user to make well-considered choices without unintentionally losing label data.

In this or alternative embodiments, the user may similarly be able to apply a "recently used" template to a label being created. To do this, instead of selecting button 324, they select button 325 illustrated in FIG. 16. The user could then be presented with one or more different images representative of the appearance of labels with templates that have been recently applied to images of labels, or printed by the printing apparatus, similar to the images 711 discussed above. The user can then select one of the different images to apply its template to the label currently being created. In the scenario in which the "recently used" templates are representative of the templates of recently-printed labels, multiple labels with the same layout may not be displayed. In other words, the images 711 may each be representative of the appearance of labels with label data arranged according to different templates. In some embodiments, each of the images 711 represents the appearance of a label with dimensions and/or colour that are different from dimensions and/or colour of labels whose appearance the others of the images 711 represent. So only one example of a template applied to each of the different sized recently-used labels may be displayed.

In the illustrated embodiment, the topmost one of the images 711 is a first image 712 which is representative of the template that has been most recently used in editing or creating a label. The images 711 are displayed in an order determined in dependence on the time since each of the respective templates was last applied to a label edited using the apparatus. Thus, the user would not necessarily need to scroll through all possible templates when looking for a template to apply. In other embodiments the images 711 may be presented in a different order in the first area 710, such as by frequency of use over a period of time, time since they were each last printed or time since they were each saved.

Thus, by either of these methods the user can easily change the arrangement of label data fields, without losing the work and effort already invested by the user in the design of the label.

One type of label that may be designed and printed using the present disclosure is an address label. Address labels are labels which may be adhered to an envelope or parcel for delivery to the address indicated on the label. The present disclosure may provide the user with a facility for checking the format and/or content of addresses, e.g. before they are printed onto address labels.

Figure 28:
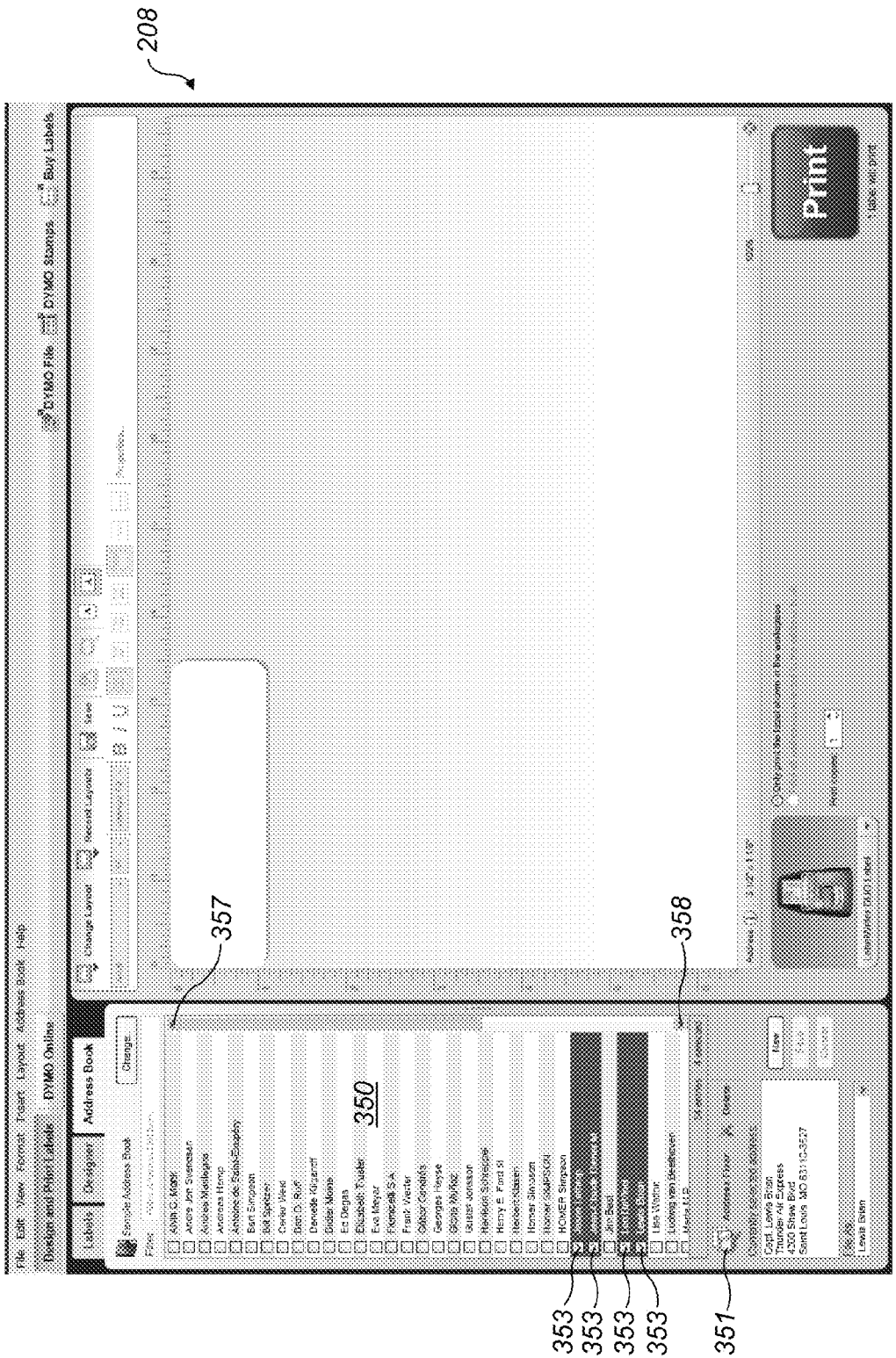
FIG. 28 is a representation of the contents of a further display shown on display of a printing apparatus embodying the present invention.

Starting e.g. from the display shown in FIG. 6, the user selects the "Address Book" tab 315c at the top of the first area 310 using the selector 205, which causes the controller 201 to cause the display 208 to display data 350 indicative of plural addressees 353 in the first area 310, as shown in FIG. 28. Plural items of data, each indicative of one of the plural addressees, are simultaneously displayed. However, only some of the available plural items of data are visible at the same time in the display 208 of FIG. 28. It will be noted that further items of data, each indicative of one of the plural addressees, are viewable by the user if the user operates the selector 205 to select one of the arrows 357, 358 to scroll up or down, respectively, through the data 350.

In other embodiments, all of the available plural items of simultaneously displayed data are visible in the display 208 at the same time, i.e. the user does not need to scroll up or down. In still further embodiments, only one of the items of data may be visible at a time, and the user then needs to operate the selector 205 to select one of the arrows 357, 358 to scroll up or down, respectively, through the data 350 to view other ones of the simultaneously displayed plural items of data. Generally speaking, one or more of the simultaneously displayed items of data indicative of respective addressees are visible at the same time. In preferred embodiments, two or more simultaneously displayed items of data indicative of respective addressees are visible at the same time.

The user can click on one, some, or all of the data indicative of the addressees to select addressees 353 for whom address labels are to be printed. In other words, the user performs a separate operation of the selector 205 to select each respective addressee for whom address labels are to be printed. The selected addressees 353 are highlighted.

The displayed data 350 in this embodiment is the name of the respective addressees. Each of the names of the plural addressees 353 has associated with it an address stored in a local database. In other embodiments, the data 350 may comprise at least a portion of each of the addresses stored in the local database, and the user may perform a separate operation of the selector 205 to select each respective address for which an address label is to be printed. The local database may be stored in the memory in the printer when the printer is a stand-alone device, in memory in a PC connected to a printing apparatus, or in other memory. In some embodiments the address information is stored in local memory without being stored in a database.

By using the selector 205 to select the "Address Fixer" button 351, the controller 201 causes contact to be made with a server or processor at an external organisation. In this embodiment, the external organisation is an entity that licenses address data from the US Postal Service, so contact is made via the internet. For this purpose, the printing apparatus needs to include a connection to the internet. In other embodiments, the external organisation may be reached without having a connection via the internet. In some embodiments, the external organisation may be a postal organisation, such as the US Postal Service itself, or a different entity that has access to suitable address data.

Figure 29:
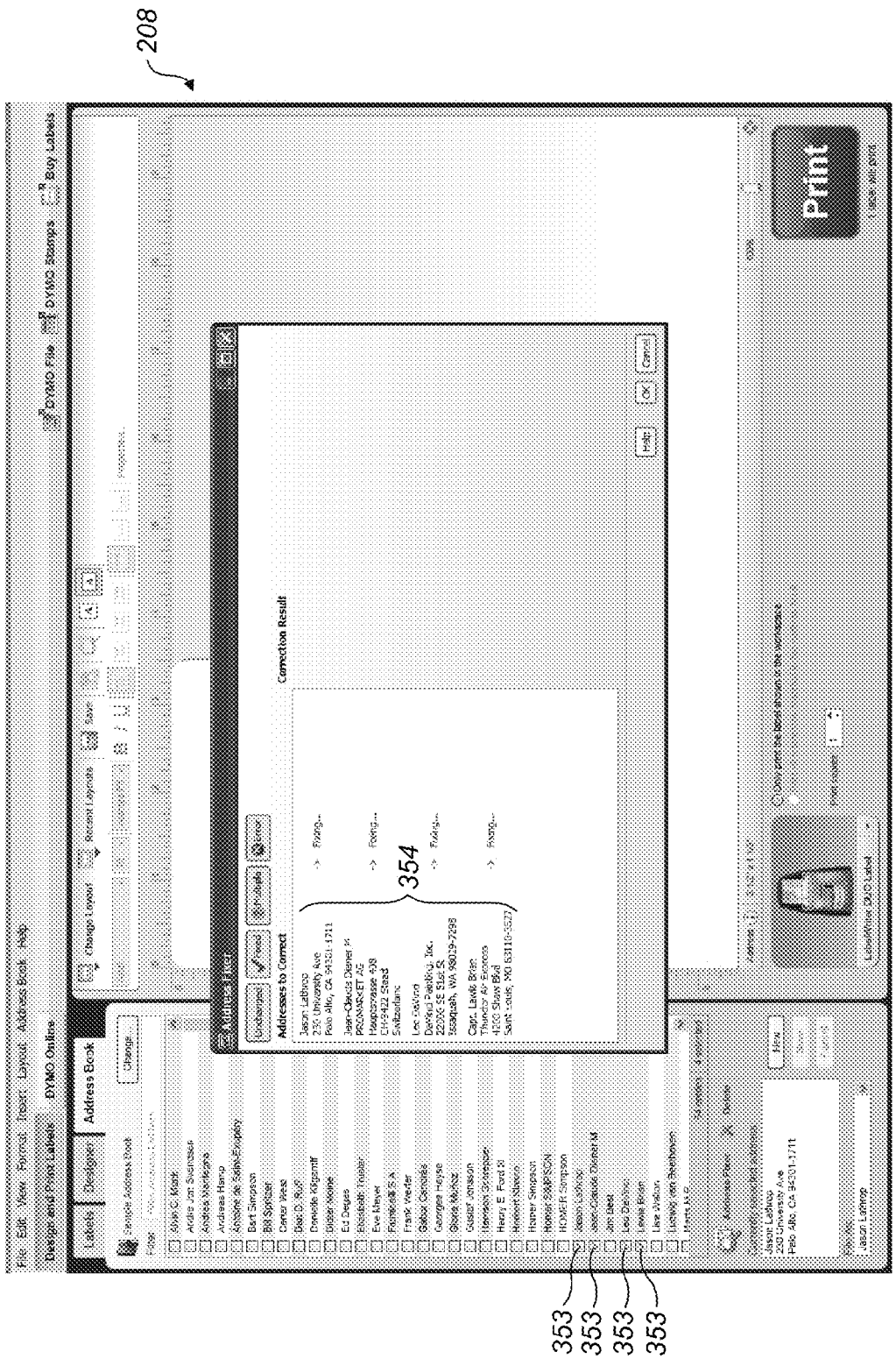
FIG. 29 is a representation of the contents of a further display shown on display of a printing apparatus embodying the present invention.

As contact with the server of the external organisation is being established, the controller 201 causes the display 208 to show the display illustrated in FIG. 29. The display 208 thus lists the addresses 354 associated with the selected addressees 353 in the address format in which they are stored in the local database. The printing apparatus is configured to send, to the server of the external organisation, information associated with the addresses 354 selected by the user. In this embodiment, this information comprises at least a portion of the selected addresses 354. In other embodiments it may comprise other data such as respective unique identifiers for the selected addressees 353, or respective unique identifiers for the respective addresses 354 of the selected addressees 353. The printing apparatus is further configured to receive revision data from the server of the external organisation. In this embodiment, the revision data comprises information indicative of one or more respective address formats associated with the addresses selected. These address formats are formats which are recommended or required by the postal organisation that will be responsible for delivering the mail to which the address label will be attached, to help them deliver the mail. Once the information indicative of the one or more respective address formats has been received, in this embodiment the printing apparatus is configured to compare the format of the selected addresses stored in the local database with the received information.

In other embodiments, the comparison step may be carried out at the external organisation, rather than in the printing apparatus. In that case, the printing apparatus may be configured to send information indicative of the respective addresses selected by the user to the external organisation. After receiving this information, the processor at the external organisation would then compare the received information with the respective one or more address formats or content required by the postal organisation, and then return to the printing apparatus revision data indicating or comprising a revised version of the addresses, for those addresses with a format or content that is currently not aligned with that required/preferred by the postal organisation.

Figure 30:
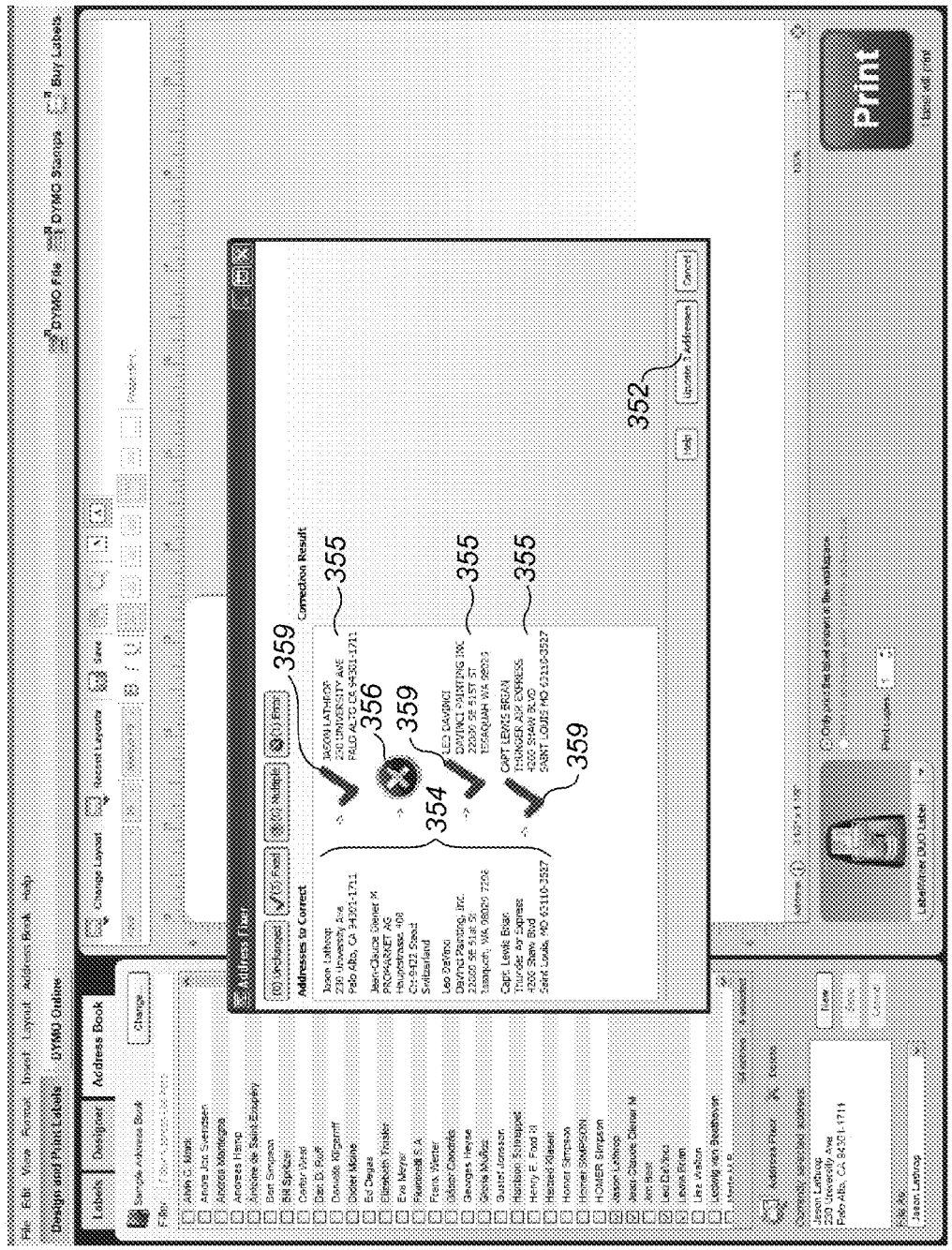
FIG. 30 is a representation of the contents of a further display shown on display of a printing apparatus embodying the present invention.
Figure 38:
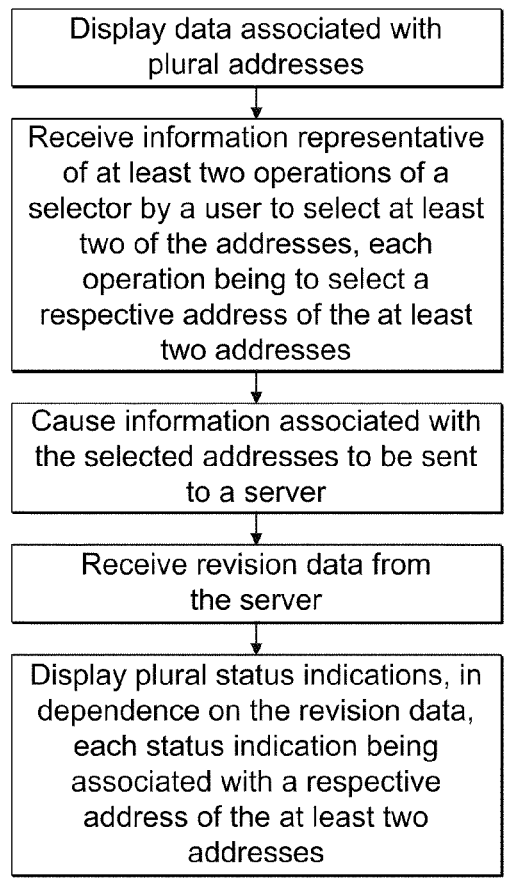
FIG. 38 shows a flow diagram illustrating the steps of a further method performed by a controller of a printing apparatus embodying the present invention.

For each selected address, the controller 201 is configured to output data to the driver 209 to cause the driver to drive the display 208 to display a status indication 355, 356, 359 associated with that address, in dependence on the revision data received. For each selected address which could be identified or recognised by the processor of the external organisation from the information sent by the printing apparatus, the controller 201 is configured to output data to the driver 209 to cause the driver to drive the display 208 to display a revised version of the address 355 in a format according to the format preferred or required by the postal organisation. So, as shown in FIG. 30, adjacent the first, third and fourth listed addresses 354, revised versions 355 of the addresses are displayed. This revised version of the address 355 is one example of such a status indication. In other embodiments the display 208 may be driven to display a revised version of the address 355 with content preferred or required by the postal organisation. A revised address may include additional data or less data than the originally-selected address, and it might include new data that replaces some of the data of the originally-selected address. For instance, an address without a ZIP code or including a 5-digit ZIP code might be revised to include a more accurate 9-digit ZIP code. A revised address may also include capital letters in place of previous lowercase letters, or additional or less punctuation. This process is further illustrated in FIG. 38.

For one or more of the selected addresses, the information sent to the server of the external organisation might be such that the external organisation returns to the controller 201 revision data associated with the format or content of more than one address, in the case where the above comparison step is performed by the printing apparatus. In the case where the comparison step is carried out at the external organisation, the external organisation might return to the controller 201 data indicative of or comprising more than one revised version of any one of the selected addresses. For example, the server might return information defining multiple destinations corresponding to the information sent to the server by the printing apparatus. In either case, the controller 201 outputs data to the display driver 209 to drive the display 208 to display two or more revised addresses that match the information sent to the server, and the user is able to operate the selector 205 to select which of the displayed two or more revised addresses is the one they desire to use. The user can also use their keyboard 206 and/or selector 205 to edit any of the revised addresses if they wish. These operations are further described below.

In this embodiment, the status indication displayed adjacent each of the selected addresses which the external organisation could recognise comprises a tick 359. Other embodiments may not include the display of a tick 359, and only the respective revised address(es) are displayed. For any selected addresses which could not be identified or recognised by the external organisation from the information sent by the printing apparatus, in this embodiment a suitable status indication is displayed on the display 208. So, again as shown in FIG. 30, adjacent the second listed address a cross 356 is displayed. In this embodiment, the second listed address does not have an associated revised address since the external organisation only has access to address format/content information for United States addresses. The non-revised address is an address in Switzerland, and Switzerland is clearly not in the US.

Of course the ticks 359, cross 356 and revised address(es) 355 discussed above are only examples of status indications that could be displayed. In other embodiments the status indications may comprise different symbols, characters, text or images. Each status indications may comprise one or more of: an indication that the external organisation recognises the selected address with which the status indication is associated, an indication that the external organisation does not recognise the selected address with which the status indication is associated, an indication of whether a revised version of the address with which the status indication is associated has been created (or may be created), an indication as to whether the address is incorrect, or an indication as to whether the address is correct (and thus may not need revising).

Although in the discussed embodiment a status indication is provided for all of the selected addresses, in other examples a status indication may only be provided for one or more of the selected addresses.

The user can use their keyboard 206 and/or selector 205 to edit e.g. the second listed address, in order to create an edited revised version of the second listed address. The user could edit more than one of the addresses. Once the edited revised version of the second listed address has been created, the user clicks on a "Fix Again" button, and the connection with the server is made again for the edited revised version and the process is repeated. So, information associated with the edited revised version of said address is sent to the server, further revision data is received from the server, and the controller is configured to output, to the display driver, data for causing the display driver to drive the display to display a further status indication associated with the second listed address, in dependence on the received further revision data.

The further status indication may take the form of any of the status indications discussed above. In this embodiment, the further status indication comprises a further revised version of said second listed address.

Again, the user could create edited revised versions of more than one of the addresses. In that case, clicking on the "Fix Again" button would cause information associated with each of the edited revised versions to be sent to the server. Further revision data for each of the edited revised versions would be received from the server, and the controller would cause the display driver to drive the display to display further status indications associated with at least one of the addresses, in dependence on the received further revision data.

Through this approach errors in address data can be reviewed and corrected both by the user and by the printing apparatus and/or server, and the process can be repeated until the user is provided with an address that is in the best manner for the appropriate postal organisation to deliver to the desired destination.

Of course, in other embodiments the external organisation may have access to address format or address content information for countries or regions other than the US, and may have access to address format/content information for the whole world or part of the world, such as Europe, Asia, Australasia, South America, North America or Africa. It may have access to address format/content information for certain countries, such as the UK, Germany, France, Belgium, Spain, etc. In further embodiments, the printing apparatus may have means for making contact with plural different external organisations. The choice of organisation contacted may be determined by analysing an address selected by the user to determine which country or region the address is in, and then contacting an external organisation with access to address format or content information for that country or region.

Once the revised address(es) have been displayed, the user is given the option of updating the addresses stored in the local database such that they have the format and/or content required/preferred by the postal organisation, by operation the selector to select the "Update X Addresses" button 352 (where X is the number of revised addresses), as shown in FIG. 30. Thus, when these addresses are later applied to a label to be printed, they will have an optimum format and/or content. The revised 355, or non-revised 354, addresses can be printed using the print head of the printing apparatus.

Thus, the present disclosure can make it easier for postal organisation(s) to determine the address to which mail is to be delivered, and the user can be more confident that the mail will be correctly delivered.

Some embodiments of the present disclosure include means for detecting the type of printer included in the printing apparatus. So, in the scenario in which the printing apparatus comprises a printer connected to a PC, a controller 201 of the PC may receive (either from the printer itself or by way of a printer driver being installed in the PC or by way of a user entering the information via an input device) information indicative of the type of connected printer. The controller 201 then outputs, to the display driver 209, data for causing the display driver 209 to drive the display 208 to display a user interface for designing labels, wherein the user interface comprises a link 326. In the present embodiment, this link is a button 326 labelled "DYMO Online", as shown in FIG. 16. The link could alternatively comprise text rather than an image.

When the user operates the selector 205 to select the button 326, the controller 201 receives from the selector 205 information representative of an operation of the selector 205 by the user to select the link. In response to this, the controller 201 causes data indicative of the type of label printer connected to the computer to be sent to a server. In this embodiment, data indicative of a language spoken in the user's location is sent to the server and in some embodiments data indicative of the location such as a country (instead of or as well as a language) is sent to the server. In response, the server sends data back to the controller 201. The data received at the controller is data suitable for that language and/or location. Having received this data, the controller 201 causes the display 208 to display printer information associated with the type of printer in a webpage, in dependence on the data received from the server. So the printer information is displayed in a language that the user at that location would understand.

Figure 39:
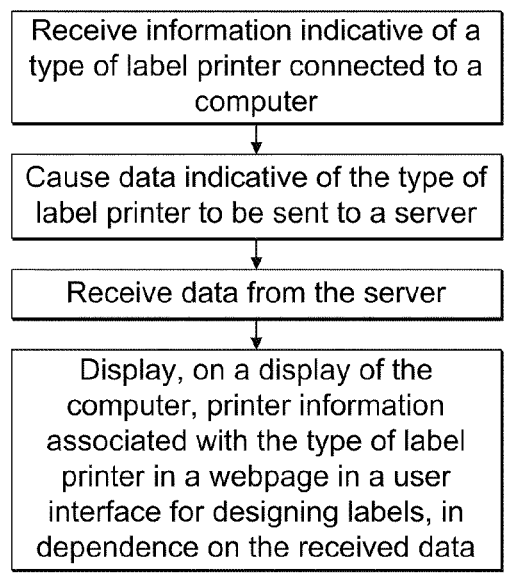
FIG. 39 shows a flow diagram illustrating the steps of a further method performed by a controller of a printing apparatus embodying the present invention.

The webpage is preferably displayed in the user interface of the software application for designing labels running at the printing apparatus. The webpage may thus replace the currently-displayed user interface in the window. Alternatively, the webpage could occupy a different window. Either way, the content of the page may be received via the internet or via an intranet. This process is further illustrated in FIG. 39.

Figure 31:
FIG. 31 is a representation of the contents of a further display shown on display of a printing apparatus embodying the present invention.

In FIG. 31 it is shown that the webpage includes information about a DYMO LabelWriter 450 Turbo printer, which is the printer connected to the PC with the display 208 in this embodiment. The page may comprise information such as technical support information for the printer, information relating to supplies of label media that may be utilised in the connected printer, contact details for sales and/or repair of the printer, printer-specific tips, printer-related news, special offers, or other information.

In some embodiments, the button 326 comprises a hyperlink including a variable which the controller 201 of the printing apparatus sets to a value indicative of the connected printer. The target page of the hyperlink may include code which detects this value such as to provide information relevant to the connected printer.

If plural different types of label printer are connected to the computer, then data indicative of at least two of the plural different types of label printer is sent to the server. This data may be in the form of a list. In response, the controller 201 receives, from the server, data associated with each of the at least two different types of label printer.

The resultant webpage displayed may include an identifier (such as an option in the drop down list 327 in FIG. 31) indicative of one of the plural different types of printer. If the user uses the selector 205 to select this data, then the page is refreshed to display information relating to the selected connected printer type. Alternatively, the information relating to the selected connected printer type may be shown in a separate window.

In alternative embodiments where plural different types of label printer are connected to the computer, data indicative of only one of the plural type of printer is sent to the server. In this case, the controller 201 receives information representative of an operation of the selector 205 by the user to select one of the plural different types of label printer. For example, the user might select one of several icons on the screen, where each icon is representative of a different one of the different types of printer. The controller 201 then causes data indicative of said one of the plural different types of label printer selected to be sent to the server. "Second data" is then received from the server at the controller 201, and the display is driven to display, in a webpage, printer information associated with the type of label printer selected, in dependence on the second data received from the server.

In any case, the user is able to find information relating to a type of label printer connected to the computer, without having to find the printer's product name or reference code which is needed to identify e.g. the page of the manufacturer's website relevant to that printer. The user also does not need to write down any information, and thus errors of transcription are avoided.

In some embodiments of the present invention, in which the printing apparatus comprises one or more printers connected to a PC, the display may comprise visually distinct images representative of the appearance of each of the printers that are connected (or connectable) to the PC, whether that be one printer or more than one printer, in the user interface of the software application for designing labels.

Figure 32:
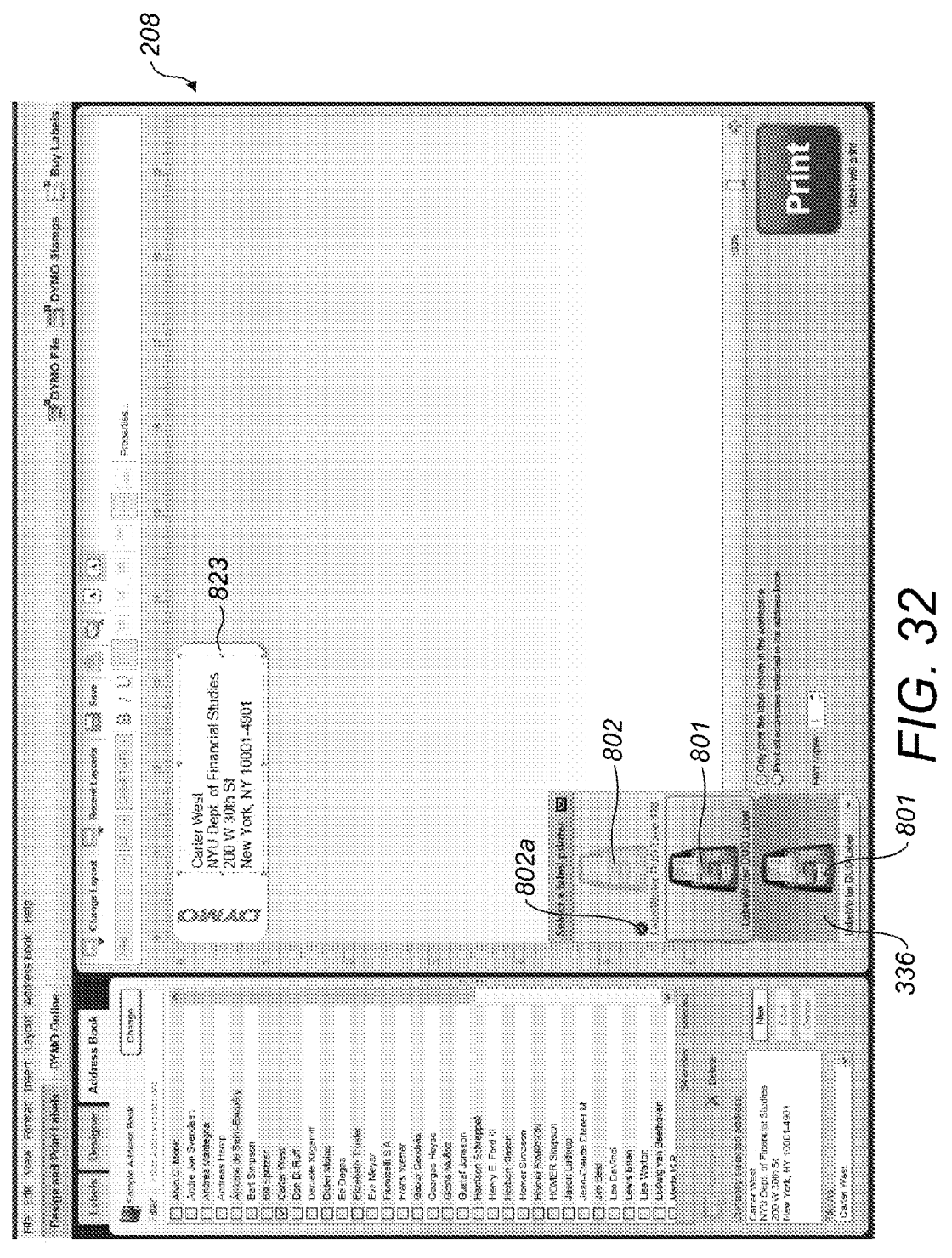
Figure 40:
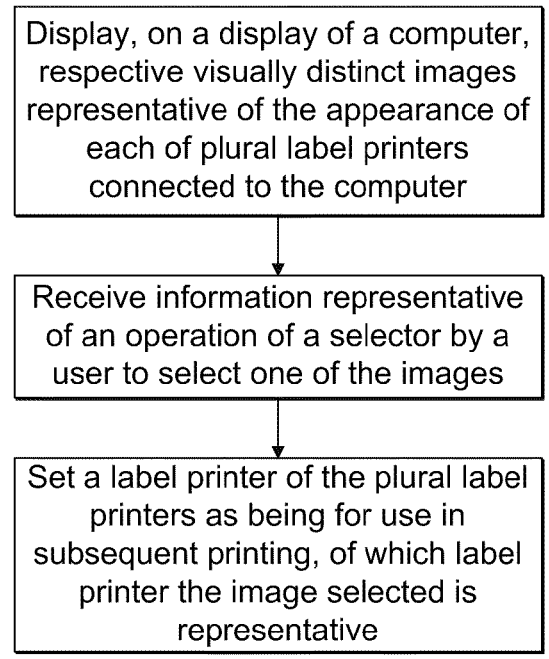
FIG. 40 shows a flow diagram illustrating the steps of a further method performed by a controller of a printing apparatus embodying the present invention.

So, as illustrated in FIG. 32, when the user has created a label to print they can operate the selector 205 to select button 336. Button 336 comprises an image 801 representative of the appearance (e.g. the external appearance) of a selected connected or connectable printer. When the user operates the selector 205 to select the button 336, the controller 201 receives from the selector 205 information representative of an operation of the selector 205 by the user to select the button 336. In response to this, the controller 201 outputs data to the driver 209 to cause the driver 209 to drive the display 208 to display the images representative of the appearance of each of the at least one printers connected or connectable to the PC. So, as illustrated in FIG. 32, in addition to the image 801 of the currently selected "LabelWriter DUO Label" printer, an image 802 representative of a "LabelWriter DUO Tape 128" printer that is also connected or connectable to the PC is displayed. The user can then use the selector 205 to select one of the displayed images 801, 802 to set the corresponding printer as being that to which subsequent print data is to be sent to print onto a label medium. This process is illustrated in FIG. 40.

In this embodiment, although additional printers beyond those illustrated in images 801 and 802 are connected to the PC, those additional printers are not suitable for printing labels using the software application. Thus, the plural images 801, 802 comprise only images representative of the appearance of respective label printers that are capable of printing based on printing instructions generated by the software application for designing labels.

The user interface displayed on the display 208 includes an image 823 representative of the appearance of a certain size or type of label medium. In some embodiments, plural images 801, 802 comprise only images representative of the appearance of respective label printers that are capable of printing onto that type of label medium. If the user uses the selector 205 to select a second type of label medium that is different from the label medium illustrated by image 823, then the controller 201 may be configured to output, to the display driver 209, data for causing the display driver 209 to drive the display 208 to display only images representative of the appearance of respective label printers that are capable of printing onto the second label medium.

In contrast, in the present illustrated embodiment, all printers capable of working with the software application are displayed, but the controller outputs to the display driver data for causing the display driver to drive the display to display an indication of which of the plural label printers indicated by images 801, 802 are capable of printing onto the label medium illustrated by the image 823. In this example, the image 823 in FIG. 32 is representative of the appearance of a certain size of address label. Therefore, image 801 (which is representative of a printer for printing onto that type of address label) comprises a full-colour image to indicate that that printer is capable and selectable for printing. On the other hand, image 802 (which is representative of a printer for printing onto a tape) comprises a greyed-out image to indicate that that printer is not capable of printing onto the illustrated label medium, and as such is not currently selectable for use in printing. The image 802 also includes a red "cross" 802a to further indicate the non-suitability of the printer (that image 802 represents) for printing onto the label medium, and in other embodiments the image 801 could include, say, a green "tick" to further indicate the suitability of the printer (that image 801 represents) for printing onto the label medium. Moreover, in some embodiments, when the user hovers a cursor over the image 802, a message reading: "current label type is not supported" is displayed to the user. Similarly, when the user hovers the cursor over the image 801, a message reading: "ready" is displayed to the user.

In the illustrated embodiment, if the user uses the selector 205 to select a second type of label medium that is different from the label medium illustrated in image 823, then the controller 201 is configured to output, to the display driver 209, data for causing the driver 209 to drive the display 208 to display an indication of which of the plural label printers illustrated by images 801, 802 are capable of printing onto the second label medium and an indication of which of the plural label printers illustrated by images 801, 802 are incapable of printing onto the second label medium. Thus, the user is aware of which of the connected or connectable printers supports the current label medium type that is being worked on.

Figure 33:
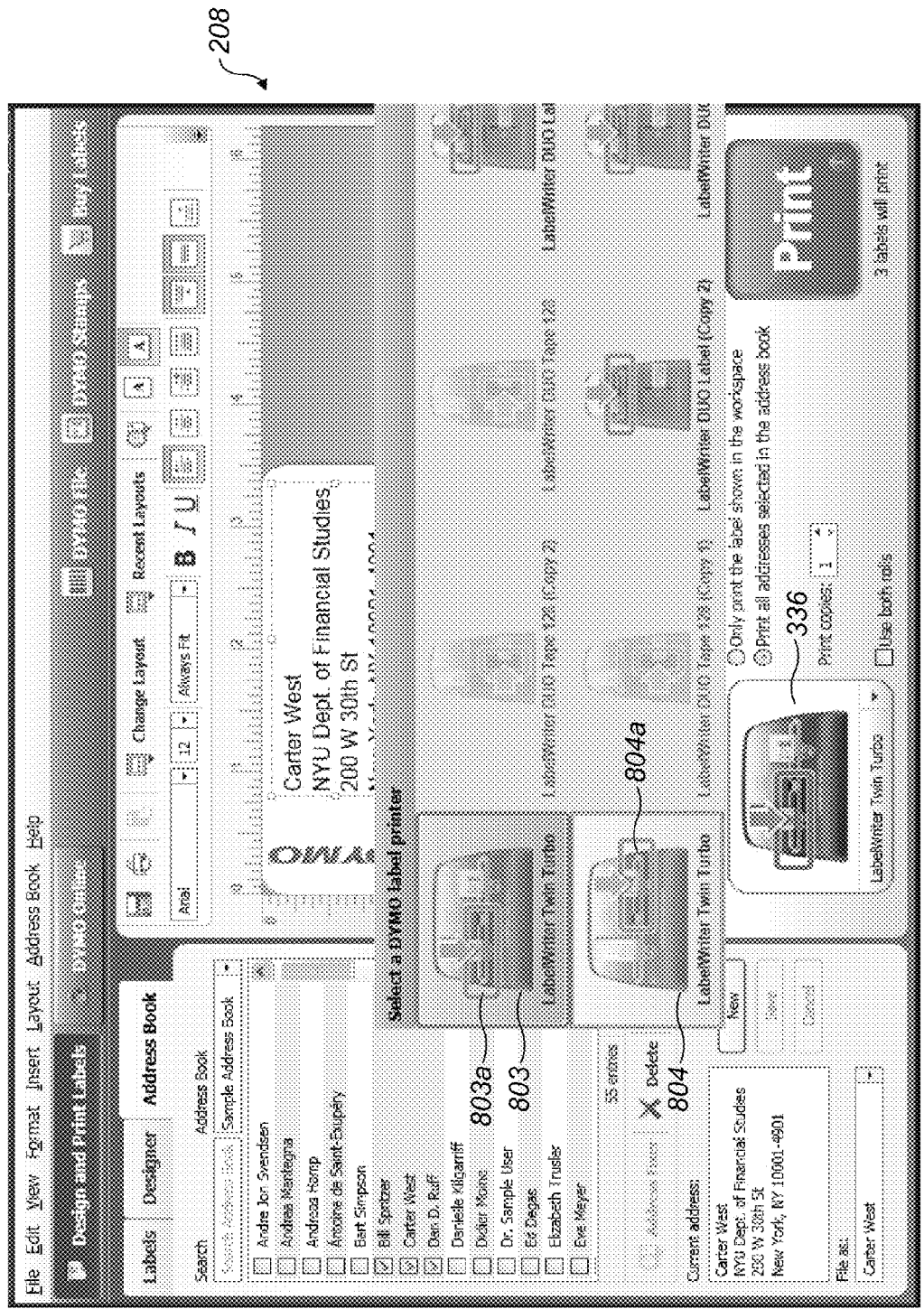
FIG. 33 is a representation of the contents of a further display shown on display of a printing apparatus embodying the present invention.

In some embodiments a selectable printer may include two or more selectable printing mechanisms, e.g. print heads and/or selectable sources of label media. FIG. 33 illustrates such an embodiment. After the user has selected button 336, the controller 201 causes the display 208 to display image(s) representative of the appearance of each of the at least one selectable print heads or label media sources connected or connectable to the PC. As illustrated in FIG. 33, selecting button 336 causes the display 208 to show images of all of the connected or connectable printers, including a first image 803 of a "LabelWriter Twin Turbo" with its left-hand selectable label media source or printhead 803a highlighted, and a second image 804 of the same type of printer with its right-hand selectable label media source or printhead 804a highlighted. The user can then use the selector 205 to select one of the displayed first and second images 803, 804 to select the left-hand printing mechanism or the right-hand printing mechanism, respectively, for use in the subsequent printing.

In an alternative embodiment, one of the images representative of the appearance of a printer with two printing mechanisms that is connected to the PC occupies a first area of the display. As the user moves a cursor over different parts of the image in the first area, the image changes to highlight different ones of the printing mechanisms. When the controller 201 receives, from the selector 205, data representative of an operation of the selector 205 by the user to select a certain position within the first area, then the controller 201 sets one of the two printing mechanisms for use in the subsequent printing in dependence on the position selected. For example, the image occupying the first area may be of a printer with a left-hand printing mechanism and a right-hand printing mechanism and the image may include a representation of each of those printing mechanisms. When the cursor is positioned over the representation of the left-hand printing mechanism, the representation of the left-hand printing mechanism may alter to highlight the left-hand printing mechanism. Also, if the user operates the selector 205 to select a position within the representation of the left-hand printing mechanism, then the controller 201 may set the left-hand printing mechanism for use in the subsequent printing. A similar operation is possible also for the right-hand printing mechanism.

In some embodiments, the controller 201 is configured to output, to the display driver 209, data for causing the driver 209 to drive the display 208 to display an indication of which of the connected plural label printers is online, and which is offline.

In some embodiments, data indicative of the last type of label printed is stored in the volatile or non-volatile memory 202, 204. The data may indicate the dimensions of the last printed label. When the user later begins editing or creating a different type of label (e.g. a label with different dimensions to the last printed label) then, when the user hovers the cursor over the print button 335, a message reading: "last printed label is different from the current" is displayed to the user. This message is an indication to the user that the currently-installed label medium installed in the connected printer may not be suitable for printing the label being designed.

In any case, the user thus may be provided with means for notifying them of the status and/or availability of the connected printer(s), and means for ensuring that a desired printer is selected for use in subsequent printing.

In the illustrated embodiments, the various images representative of the appearance of labels or label media each comprise an outline of the label or label media. In alternative embodiments, one or more of the images representative of the appearance of labels or label media comprises an image of a label or media with an appearance different from that of an appearance of a background within which the image is located. So, the image may be white and the background may be shaded, or vice versa, or the image may be plain coloured and the background patterned, or vice versa, for example. The term "image representative of the appearance of . . . " used in this application is preferably intended to mean that the image has the same proportions and possibly the same colouring or rendering as the real life label medium, label, or printer that it represents. The images are preferably sufficiently representative for a user of the printing apparatus to be able to visualise what the label medium, label, or printer would look like in reality.

If the printing apparatus of the present disclosure comprises a printer connected to a PC printer, rather than a stand-alone printer, the keyboard (data input device) and display means of the printer itself are not essential as the data may be input and displayed via the components of the PC. The PC then acts as an input device for the printer. Alternatively, other apparatus may be used to input data to the printer for printing. For example, in an embodiment of the invention a digital camera or a mobile phone may be used to input data to the printer for printing, possibly via the PC. Images may alternatively be input using a smart card, chip card, memory card or the like.

In some embodiments of the present invention, the printing apparatus comprises a printer connected to a PC. In those embodiments, the printer may not have a data input device or display. However, in some embodiments the printer will additionally have the display and data input device.

Figure 26:
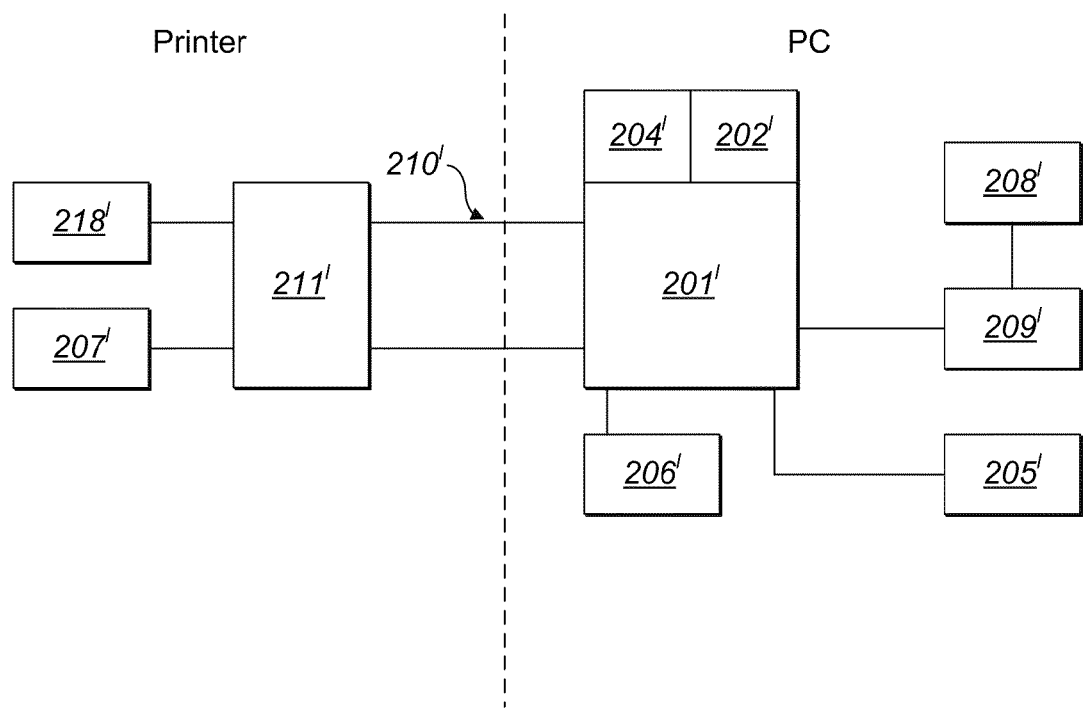
FIG. 26 is a diagrammatic sketch showing the control circuitry in a further embodiment of a printing apparatus embodying the present invention.

FIG. 26 illustrates a printing apparatus embodying the present disclosure in which the printhead 218' and motor 207' are included in a printer connected via a link 210' to a PC, and the display 208', display driver 209', selector 205', data input apparatus (e.g. keyboard) 206', controller 201', non-volatile memory 202', and volatile memory 204' are part of the PC. The printer may include a further controller or control means (illustrated as 211') for facilitating communication between the controller 201' of the PC and the printhead 218' and motor 207' of the printer. The link 210' may be a wired link, e.g. involving a parallel or serial connection or a USB interface, or a wireless link, e.g. involving Bluetooth technology or an infrared link. The printer and the PC together form a printing apparatus.

Figure 27:
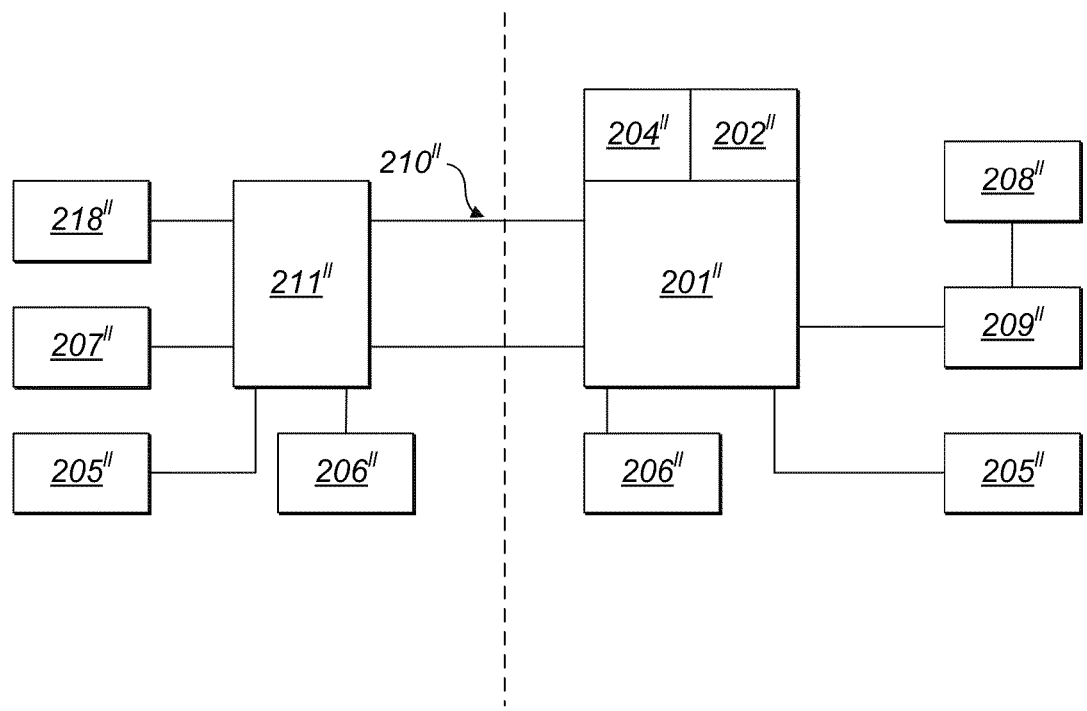
FIG. 27 is a diagrammatic sketch showing the control circuitry in a further embodiment of a printing apparatus embodying the present invention.

FIG. 27 illustrates a variation of the embodiment shown in FIG. 26, in which variation both the printer and the PC (together forming the printing apparatus) respectively include a display 208", display driver 209" and a data input apparatus 206".

While the term "controller" has been used extensively throughout this description, it is to be appreciated that different types of apparatus may be used to control the display. Such apparatus includes a processor, a chip, a set of chips (i.e. a chip set), or other form of control means. Such a controller or control means may be configurable to output data to a display driver on the same chip as the controller or on a chip separate from the controller. Thus the term "output" in this respect is intended to mean transferring the data from the controller to the display driver. Even when the display driver is comprised in the same chip as the controller, some degree of communication or "output" is carried out between the controlling part and the display driving part of the chip. This data is for causing the display driver to drive the display to display a certain image or images. The controller or control means may generate this data, or it may be generated elsewhere (e.g. on another chip or in a different part of a chip) and then provided to the controller for outputting to the display driver.

The display discussed in this description and illustrated in the accompanying figures is one example of display means. The display means may comprise one of an LCD display, a plasma display, a cathode ray tube, an OLED display or other form of display.

The keyboard discussed in this description and illustrated in the accompanying figures is one example of a data input device or data input means. The data input device or data input means may comprise one of a keyboard, keypad, touchpad, touchscreen, or other form of device for inputting data.

The skilled person would appreciate that any of the methods described herein may be implemented using a computer program embodied on a computer readable medium (such as a CDROM or memory within a computer or stand-alone printer) for controlling a controller (or other similar apparatus as discussed above).

The foregoing merely illustrates the principles of the invention. Various modifications and alterations to the described embodiments will be apparent to those skilled in the art in view of the teachings herein. It will thus be appreciated that those skilled in the art will be able to devise numerous techniques which, although not explicitly described herein, embody the principles of the invention and are thus within scope of the invention, as defined by the claims.

The invention claimed is:

1. A non-transitory computer readable medium configured to control a controller to:
output, to a display driver, data for causing the display driver to drive a display of a printing apparatus to display, in a first area of the display, a plurality of images including a first image, wherein the plurality of images are representative of a plurality of respective different types of label data field, and to display a second image representative of the appearance of a label medium occupying a second area of the display that is different from the first area; the label data fields comprising data fields insertable into the second image representative of a label medium; and
in response to receiving, from a selector, information comprising data representative of an operation of the selector by a user to select the first image, wherein the first image occupies a first region within the first area, and wherein the data representative of an operation of the selector by the user to select the first image comprises data representative of a first position within the first region, and wherein the information comprises data representative of operation of the selector by the user to perform a drag and drop operation on at least one of the plurality of images representative of the plurality of respective different types of label data field from said first position within the first region to a selected position within the second image representative of the appearance of a label medium occupying the second area;
output, to the display driver, data for causing the display driver to drive the display to display a revised version of the second image representative of the appearance of the label medium;
wherein the revised version of the second image comprises a first label data field of the type of label data field of which the first image is representative; and
wherein the first label data field comprised in the revised version of the second image is located at a location determined in dependence on said position within the second image representative of the appearance of a label medium occupying the second area, wherein the first label data field is empty;
and in response to receiving an operation of the selector by the user to perform a drag and drop operation of a further image from a further region within the first area to a further position within the second area, the further image representative of a second label data field that is different to the first label data field, display a further revised version of the second image in which the second label data field is located at a location determined in dependence on said further position within the second area, and wherein the second label data field is empty;
and re-position the first image and the further image relative to each other in the second image representative of the appearance of a label medium in response to at least one further drag and drop operation.

2. The non-transitory computer readable medium as claimed in claim 1, wherein the first label data field comprised in the revised version of the second image occupies a region that includes said position within the second area.

3. The non-transitory computer readable medium as claimed in claim 1, wherein the first label data field comprised in the revised version of the second image has an edge or a corner that occupies said position within the second area.

4. The non-transitory computer readable medium as claimed in claim 1, wherein the first label data field comprises at least one of a text data field, a barcode data field or an image data field, and the second label data field comprises a different one of a text data field, a barcode data field or an image data field.

5. The non-transitory computer readable medium as claimed in claim 1, wherein the first label data field comprises a text data field and a prompt for text to be entered in the text data field.

6. The non-transitory computer readable medium as claimed in claim 1 wherein the printing apparatus comprises a printer connected to a computer.

7. An apparatus comprising:
a controller configured:
to output, to a display driver, data for causing the display driver to drive a display of a printing apparatus to display, in a first area of the display, a plurality of images including a first image, wherein the plurality of images are representative of a plurality of respective different types of label data field, and to display a second image representative of the appearance of a label medium occupying a second area of the display that is different from the first area, the label data fields comprising data fields insertable into the second image representative of a label medium; and
in response to receiving, from a selector, information comprising data representative of an operation of the selector by a user to select the first image, wherein the first image occupies a first region within the first area, and wherein the data representative of the operation of the selector by the user to select the first image comprises data representative of a first position within the first region, and wherein the information comprises data representative of an operation of the selector by the user to perform a drag and drop operation on at least one of the plurality of images representative of the plurality of respective different types of label data field from said first position within the first region to a selected position within the second image representative of the appearance of a label medium occupying the second area;
to output, to the display driver, data for causing the display driver to drive the display to display a revised version of the second image representative of the appearance of the label medium;
wherein the revised version of the second image comprises a first label data field of the type of label data field of which the first image is representative; and
wherein the first label data field comprised in the revised version of the second image is located at a location determined in dependence on said position within the second area, wherein the first label data field is empty;
and in response to receiving an operation of the selector by the user to perform a drag and drop operation of a further image from a further region within the first area to a further position within the second area, the further image representative of a second label data field that is different to the first label data field; display a further revised version of the second image in which the second label data field is located at a location determined in dependence on said further position within the second area, and wherein the second label data field is empty;
and re-position the first image and the further image relative to each other in the second image representative of the appearance of a label medium in response to at least one further drag and drop operation.

8. A method, comprising:
outputting, from a controller to a display driver, data for causing the display driver to drive a display of a printing apparatus to display, in a first area of the display, a plurality of images including a first image, wherein the plurality of images are representative of a plurality of respective different types of label data field, and to display a second image representative of the appearance of a label medium occupying a second area of the display that is different from the first area, the label data fields comprising data fields insertable into the second image representative of a label medium; and
in response to receiving, at the controller from a selector, information comprising data representative of an operation of the selector by a user to select the first image, wherein the first image occupies a first region within the first area, and wherein the data representative of an operation of the selector by the user to select the first image comprises data representative of a first position within the first region, and wherein the information comprises data representative of operation of the selector by the user to perform a drag and drop operation on at least one of the plurality of images representative of the plurality of respective different types of label data field from said first position within the first region to a selected position within the second image representative of the appearance of a label medium occupying the second area;
outputting, from the controller to the display driver, data for causing the display driver to drive the display to display a revised version of the second image representative of the appearance of the label medium;
wherein the revised version of the second image comprises a first label data field of the type of label data field of which the first image is representative; and
wherein the first label data field comprised in the revised version of the second image is located at a location determined in dependence on said position within the second image representative of the appearance of a label medium occupying the second area;
and wherein the method comprises an operation of the selector by the user to perform a drag and drop operation of a further image from a further region within the first area to a further position within the second area, the further image representative of a second type of label data field that is different to the first label data field; and
displaying a further revised version of the second image in which the second label data field is located at a location determined in dependence on said further position within the second area, and wherein the second label data field is empty;
and wherein the method comprises at least one further drag and drop operation to re-position the first image and the further image relative to each other in the second image representative of the appearance of a label medium.

9. The method as claimed in claim 8, wherein the first label data field comprised in the revised version of the second image occupies a region that includes said position within the second area.

10. The method as claimed in claim 8, wherein the first label data field comprised in the revised version of the second image has an edge or a corner that occupies said position within the second area.

11. The method as claimed in claim 8, wherein the first label data field comprises at least one of a text data field, a barcode data field or an image data field, and the second label data field comprises a different one of a text data field, a barcode data field or an image data field.

12. The method as claimed in claim 8, wherein the first label data field comprises a text data field and a prompt for text to be entered in the text data field.

13. The method as claimed in claim 8, wherein the printing apparatus comprises a printer connected to a computer.

14. A non-transitory computer readable medium configured to control a controller to:

output, to a display driver, data for causing the display driver to drive a display of a printing apparatus to display, in a first area of the display, a plurality of images including a first image and a second image, wherein the plurality of images are representative of a plurality of respective different types of label data field, and to display a third image representative of the appearance of a label medium occupying a second area of the display that is different from the first area, the label data fields comprising data fields insertable into the third image representative of a label medium; and in response to receiving, from a selector, information comprising data representative of an operation of the selector by a user to select the first image, wherein the first image occupies a first region within the first area, and wherein the data representative of an operation of the selector by the user to select the first image comprises data representative of a first position within the first region, and wherein the information comprises data representative of operation of the selector by the user to perform a drag and drop operation at least one of the plurality of respective different types of label data field from said first position within the first region to a selected third position within the third image representative of the appearance of a label medium occupying the second area;

output, to the display driver, data for causing the display driver to drive the display to display a revised version of the third image representative of the appearance of the label medium;

wherein the revised version of the third image comprises an empty label data field of the type of label data field of which the first image is representative;

wherein the empty label data field comprised in the revised version of the third image is located at a location determined in dependence on said third position within the third image representative of the appearance of a label medium occupying the second area; and in response to receiving, from a selector, information comprising data representative of an operation of the selector by a user to select the second image, wherein the second image occupies a second region within the first area, and wherein the data representative of an operation of the selector by the user to select the second image comprises data representative of a second position within the second region, and wherein the information comprises data representative of operation of the selector by the user to perform a drag and drop operation on at least one of the plurality of respective different types of label data field from said second position within the second region to a selected fourth position within the third image representative of the appearance of a label medium occupying the second area;

output, to the display driver, data for causing the display driver to drive the display to display a revised version of the third image representative of the appearance of the label medium;

wherein the revised version of the third image comprises an empty label data field of the type of label data field of which the second image is representative;

wherein the empty label data field of which the second image is representative comprised in the revised version of the third image is located at a location determined in dependence on said fourth position within the third image representative of the appearance of a label medium occupying the second area;

and wherein the non-transitory computer readable medium is further configured to enable a user to subsequently re-position the empty label data fields relative to each other within the third image, using one or more further drag and drop operations.

* * * * *